United States Patent
Fox et al.

(10) Patent No.: US 9,654,357 B2
(45) Date of Patent: May 16, 2017

(54) TELECOMMUNICATION NETWORKS

(75) Inventors: David Andrew Fox, Newbury (GB); Youssef Chami, Newbury (GB); Neil Holmes, Newbury (GB)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 0 days.

(21) Appl. No.: 13/135,439

(22) Filed: Jul. 5, 2011

(65) Prior Publication Data
US 2012/0129517 A1  May 24, 2012

(30) Foreign Application Priority Data

| Jul. 2, 2010 | (GB) | 1011165.6 |
| Jul. 2, 2010 | (GB) | 1011167.2 |
| Jul. 2, 2010 | (GB) | 1011170.6 |
| Jul. 2, 2010 | (GB) | 1011172.2 |
| Jul. 2, 2010 | (GB) | 1011174.8 |
| Jul. 2, 2010 | (GB) | 1011178.9 |
| Sep. 13, 2010 | (GB) | 1015219.7 |

(51) Int. Cl.

| H04W 24/04 | (2009.01) |
| H04L 12/24 | (2006.01) |
| H04W 12/12 | (2009.01) |
| H04W 84/00 | (2009.01) |
| H04W 88/08 | (2009.01) |
| H04W 88/18 | (2009.01) |

(52) U.S. Cl.
CPC ...... H04L 41/5025 (2013.01); H04L 41/5035 (2013.01); H04W 12/12 (2013.01); H04W 24/04 (2013.01); H04W 84/00 (2013.01); H04W 88/08 (2013.01); H04W 88/18 (2013.01)

(58) Field of Classification Search
CPC .. H04Q 7/20; H04M 1/66; G06F 9/00; H04W 24/04
USPC .............. 455/425, 428; 370/328; 726/4
See application file for complete search history.

(56) References Cited

U.S. PATENT DOCUMENTS

| 6,069,881 | A | 5/2000 | Jiang et al. |
| 2003/0092390 | A1* | 5/2003 | Haumont ............... 455/67.1 |
| 2003/0149887 | A1 | 8/2003 | Yadav |
| 2004/0162781 | A1 | 8/2004 | Searl et al. |

(Continued)

FOREIGN PATENT DOCUMENTS

| EP | 2139278 A1 | 12/2009 |
| WO | WO0145276 A2 | 6/2001 |

OTHER PUBLICATIONS

3GPP2-Drafts, 2500 Wilson Boulevard, Suite 300, Arlington, Virginia 22201 USA, Nov. 30, 1999, XP040348641, chapters 6.5, 6.6.2.4, 6.6.3.2-6.6.3.7, 6.6.4.3-6.6.4.5.

(Continued)

Primary Examiner — Myron K Wyche
(74) Attorney, Agent, or Firm — Workman Nydegger

(57) ABSTRACT

A mobile telecommunications network includes a core and a radio access network having a radio for wireless communication with mobile terminals registered with the network. The radio access network includes a controller operable to control the use of network resources by the mobile terminals. The controller may include an application programming interface, API, which provides a consistent interface to a multiplicity of applications hosted on the control mean. The controller may be provided at an access node site and/or a gateway site.

21 Claims, 23 Drawing Sheets

(56) References Cited

U.S. PATENT DOCUMENTS

| | | | |
|---|---|---|---|
| 2006/0053491 A1 | 3/2006 | Khuti et al. | |
| 2006/0128406 A1 | 6/2006 | Macartney | |
| 2006/0272025 A1 | 11/2006 | Mononen | |
| 2006/0276173 A1* | 12/2006 | Srey | H04W 12/08 455/410 |
| 2007/0089165 A1* | 4/2007 | Wei et al. | 726/4 |
| 2007/0173251 A1* | 7/2007 | Vikberg | H04W 12/08 455/428 |
| 2007/0206546 A1 | 9/2007 | Alberth, Jr. et al. | |
| 2007/0214351 A1* | 9/2007 | Niemela | G06F 21/57 713/2 |
| 2008/0114888 A1 | 5/2008 | Bhatt et al. | |
| 2008/0148407 A1 | 6/2008 | Katkar | |
| 2008/0161054 A1* | 7/2008 | Kallio et al. | 455/560 |
| 2008/0289040 A1 | 11/2008 | Ithal | |

OTHER PUBLICATIONS

3GPP TS 05.08 V8.23.0 (Nov. 2005), Technical Specification, 3rd Generation Partnership Project; Technical Specification Group GSM/EDGE Radio Access Network; Radio subsystem link control (Release 1999), 100 pp.

3GPP TS 25.304 V9.2.0 (Jun. 2010), Technical Specification, 3rd Generation Partnership Project; Technical Specification Group Radio Access Network; User Equipment (UE) procedures in idle mode and procedures for cell reselection in connected mode (Release 9), 50 pp.

Etsi TS 125 331 V9.3.0 (Jul. 2010), Technical Specification, Universal Mobile Telecommunications System (UMTS); Radio Resource Control (RRC); Protocol specification (3GPP TS 25.331 version 9.3.0 Release 9), 100 pp.

U.S. Appl. No. 14/509,104, filed Oct. 8, 2014, Fox et al.

* cited by examiner

| Correct | Erroneous |
|---------|-----------|
| Field C1 | Field E1 |
| Field C2 | Field E2 |
| ... | ... |
| Field Cn | Field En |

Fig. 13

TELECOMMUNICATION NETWORKS

TECHNICAL FIELD

This application relates to a mobile telecommunications network including a core and a radio access network having a radio that wirelessly communicates with mobile terminals registered with the network, and to a method of operating such a mobile telecommunications network.

BACKGROUND

Recently, a dramatic rise in sales of both smart-phones and laptop data cards has resulted in a substantial increase in the amount of data communications passing through mobile telecommunications networks. This volumetric increase can also be attributed to enhancements made to the capabilities of the networks. In fact it has been reported that mobile data growth grew 30 percent over the course of the second quarter of 2009. The most popular use for mobile data was HTTP browsing, although usage of HTTP streaming is growing considerably. Other mobile data uses include HTTP downloading and Peer-to-Peer (P2P) activities such as file sharing.

This ability to use the cellular networks for mobile data services, such as Internet browsing, is resulting in subscribers treating their mobile networks in much the same way as they treat their fixed networks. That is, users are tending to expect the same service from the Internet, irrespective of their access method. However, mobile networks have a more restricted capacity and are more costly to operate, as compared to fixed networks.

In this regard, from the network operator's viewpoint, as the mobile broadband traffic volume carried over 2G, 3G and HSPA (High Speed Packet Access) networks continues to grow, the cost of supporting this data volume is becoming more and more expensive based on the current network architecture and deployments. In fact, access and data volumes are likely to rise faster than the revenue used to build and maintain the networks. This cost differential is exacerbated by one of the current business models being utilised, whereby operators charge a flat rate for unlimited amounts of data.

The increased usage is also unfortunately likely to result in an increase of data traffic jams, and hence a degradation of service for mobile users if not properly managed.

It has been proposed to control data-heavy users by "choking" the bandwidth available to them when a maximum data volume limit is exceeded. Whilst this addresses the problem on an individual level, it does not address the network capacity problem as a whole.

It is therefore apparent that mobile broadband is at a crossroads as networks and business models are strained by bandwidth demand that is unmatched by revenue generation.

These problems may only get worse with moves to position mobile data as a replacement for fixed DSL (Digital Subscriber Line) access and with the advent of higher radio access speeds with the proposed 4G LTE/SAE (Long Term Evolution/System Architecture Evolution) network. A large percentage of this traffic may consist of data which is destined for the public Internet, a significant proportion of which mobile operators may not be able to add value to, despite carrying the data on their own backhaul transport, core transport or cellular core infrastructure.

In addition to the problems discussed above, conventional mobile telephone communications networks have architectures that are hierarchical and expensive to scale. Many of the network elements, such as the BTS, routers, BSC/RNC etc are proprietary: devices of one manufacturer often do not interface with devices from another manufacturer. This makes it difficult to introduce new capabilities into the network as a different interface may be required for devices from each manufacturer. Further, conventional base stations are not capable of intelligent local routing or processing. Furthermore, the capacity of existing networks is not always used effectively. For example, many cell sites are under used, whilst others are heavily used.

The current network architecture has the following disadvantages: —
- Hierarchical and expensive to scale
- Backhaul is a major problem
- Proprietary platforms: BTS, BSC/RNC, SGSN etc
- Closed nodes and interfaces
- Very limited application or customer awareness (except for QoS priority)
- No intelligent local routing or processing
- Inefficient use of installed capacity There is therefore a need to overcome or ameliorate at least one of the problems of the prior art. In particular there is a need to address the needs of both the network operators and the users in improving the provision of mobile broadband data services.

SUMMARY OF THE INVENTION (P100936-GB-PSP)

According to the system described herein, there is provided a mobile telecommunications network including a core and a radio access network having a radio for wireless communication with terminals registered with the network, wherein the radio access network includes a controller operable to control the use of network resources by the mobile terminals, and wherein the controller is operable to detect the likely malfunctioning of at least one of the mobile terminals and to take action to reduce the affect of the malfunctioning on the network.

A malfunctioning mobile terminal may be one that is operating in an unexpected manner or that has abnormal behaviour.

The controller may be a virus detection entity provided on a "platform" of the type described in detail below.

The controller may be provided at an access node site (where it is connected to the radio frequency part of a base station) or at a gateway site (where it is provided at the Radio Network Controller, RNC).

The controller may be operable to detect the likely malfunctioning of at least one of the mobile terminals that impacts or potentially impacts the ability of the network to control the mobile terminals (such as control plane data) and/or the ability of the network to allow user data to be transmitted to or from the mobile terminals (such as user plane data).

The controller may be operable to detect uncharacteristic populations of specific mobile terminal models or model types that would potentially impact the ability of the network to control the mobile terminals (such as control plane data) and/or the ability of the network to allow user data to be transmitted to or from the mobile terminals (such as user plane data).

The controller may be operable to compare measured characteristics relating to the at least one of the mobile terminals with reference characteristics (sets of definitions in the embodiment to be described) to detect the likely malfunctioning of the at least one of the mobile terminals.

The controller may be operable to compare measured characteristics relating to numbers of mobile terminal of specific types with historic trends in populations of mobile terminals accessing the network.

The definitions may describe how a malfunctioning or incorrectly operating terminal (or terminal/application combination) might behave. The definitions may describe how a correctly operating mobile terminal or terminal/application combination may operate. The definitions may include definitions of both types, and the controller may only refer to the definitions corresponding to malfunctioning or incorrectly operating terminals/applications once it has been determined that the device or terminal/application combination has deviated the definitions for a correctly operating terminal. If the controller identifies that a terminal or terminal/application combination has deviated from the correct operational definitions and is operating in accordance with the incorrect or malfunctioning definitions, the controller may start recording the operation of the terminal or terminal/application combination, for example for more detailed analysis such as manual evaluation.

The controller may be operable to obtain the reference characteristics by calculating them based on previously measured characteristics, or by receiving them from the core or a third party. In the embodiment, the reference characteristics may be obtained by receiving definitions from the core (from central network functions managed by the network operator), or the definitions may be provided by one or more third party applications (provided via the core by another route).

In the embodiment, if the controller calculates the reference characteristics based on previously measured characteristics, the controller may include artificial intelligence capability to perform such an analysis to derive appropriate definitions. In the embodiment the controller may push definitions that it creates to other controller in the radio access network (which may correspond to different base stations and/or RNCs) or to distribution functions.

The measured characteristics and/or the reference characteristics may relate to a specific one or the terminals, a specific terminal type or a specific application run by one of the terminals. In the embodiment the definitions may describe the usage patterns of a single terminal or terminal/application combination or a group of terminal/application combinations. That is, a separate set of definitions may be provided for each terminal or a group of terminals that might be linked by some common characteristic, such as having the same operating system, the same subscription type or the like.

The reference characteristics/definitions may represent usage patterns of terminals/applications over a period of time such as one hour or twenty four hours, and the measured characteristics of a terminal or a group of terminals over such a period of time may be compared to these reference characteristics/definitions to determine whether the terminal is malfunctioning or whether a group of terminals are acting in an unexpected manner.

The controller may identify the need for new reference characteristics/definitions and may retrieve these from the core (central network functions) or elsewhere, such as a third party application. The controller may identify the need for new reference characteristics/definitions automatically. For example, it may receive information from a particular terminal type for which it has no appropriate reference characteristics/definitions, and in response to this may attempt to obtain appropriate reference characteristics/definitions from a suitable source.

In response to the detection of a likely malfunctioning of at least one of the mobile terminals, or the unusual behaviour of a group of mobile terminals, the controller may trigger a management event for reducing the impact on the network. For example, the controller may detect a misbehaving terminal that potentially impacts network control, user plane or customer resilience.

The management event may cause the controller to redirect/hotline service requests from a terminal/application to a managed webspace associated with the controller (controlled by the same "platform" in the embodiment).

The management event may trigger the Radio Resource Management (RRM) of the controller to move the misbehaving terminal to a subset of available network resources where the terminal is quarantined.

The management event may trigger the limiting of radio resources to which the terminal is scheduled to the bare minimum to allow connectivity.

The management event may trigger the rejection of the misbehaving terminal from accessing the network and/or barring future access to the network.

The management event may trigger the introduction or modification of specific firewall settings for the misbehaving terminal (reducing the effect of any virus, for example).

The management event may trigger an alarm or alert to a customer service person or engine, or technical engineering functions to disinfect or disconnect the misbehaving terminal.

The malfunctioning or misbehaving terminal may be one that has a virus but may also be a terminal that is malfunctioning in some other way—such as having a corrupted or out-of-date operating system.

The system described herein also provides a method of operating a mobile telecommunications network as defined in the claims.

According to a further aspect of the system described herein, there is provided a mobile telecommunications network including a core and a radio access network having a radio for wireless communication with terminals registered with the network, wherein the radio access network includes a controller operable to control the use of network resources by the mobile terminals, and wherein the controller is operable to detect the likely presence of a misbehaving mobile terminal which is characterised by the network operator and to take action to reduce the impact on the network.

In another aspect the system described herein provides a mobile telecommunications network including a core and a radio access network having a radio for wireless communication with mobile terminals registered with the network, wherein the radio access network includes a controller operable to control the use of network resources by the mobile terminals, and wherein the controller is operable to detect the likely presence of a virus on one of the mobile terminals and to take action to reduce the affect of the virus on the network.
(P100940-GB-PSP)

According to a further aspect of the system described herein, there is provided a mobile telecommunications network including a core and a radio access network having a radio for wireless communications with terminals using the network, wherein the radio access network includes a controller operable to control the use of network resources by the terminals, and wherein the controller is operable to monitor data received from the terminals to identify interruption of the radio access network.

The data received from the terminals may be signals, such as control signalling, or data containing content.

The terminals may be terminals registered with the network, for example by having a subscription with the network. The terminals may also be terminals that are not registered with the network but which nevertheless are capable of interrupting the proper operation of the network. Such terminals may be jamming devices: devices configured to deliberately disrupt the network. The terminals may also be non-telecommunications devices which are sources of interference, causing disruption or performance implications to the operation of the network.

The controller may be provided on a novel "platform" of the type described in detail below.

The controller may be operable to monitor and analyse data received from other controller relating to other terminals (terminals served by the other controller). The controller may communicate with neighbouring controller of neighbouring radio sites/base stations to retrieve radio performance metrics measured at their geographic location. The neighbouring controller may retrieve performance measurements from terminals in the creation of radio performance metrics. The neighbouring controller may aggregate and analyse the distributed radio performance across the geographical area covered by the controller. Controller may aggregate and analyse the radio performance across the geographic areas covered by the controller and the neighbouring controller. The controller may use the data that itself gathers, and that obtained from other controllers to build the database of historical performance across the geographic area served by each controller (which area may overlap to a greater of lesser extent).

The controller may be operable to measure a characteristic radio link to/from the terminals. For example, the controller may measure the network performance of the uplink in each of the cells. The network performance of the uplink may be assessed by measuring the receive interference, the transmit power of the terminals, the cell throughput, the aggregate cell/site throughput, the dropped call rate and/or the H-ARQ rate. The characteristic of the radio is advantageously an indication of radio quality between a mobile terminal and a base station associated with the controller.

The controller may be operable to compare the data with interruption criteria to identify the interruption of the radio access network. Interruption may be caused by a modified or malfunctioning terminal registered with the network. The interruption may be caused by a device that is not registered with the network but which is (deliberately) configured to jam or interrupt the network. The controller may also obtain information indicating the location of, of may calculate the location of, the mobile terminals providing data.

The controller may be operable to additionally use measurements from a fixed telecommunications network to identify interruption. For example, if it is detected that there is interruption/jamming of the radio access network, the status of the fixed network at the same location may also be checked.

The location of the terminals providing the data may be compared to historic average radio performance at that location, as collected previously by the controller (or by any other mechanism). The controller may compare the measured performance against a predefined set of jamming criteria to identify attempts to interrupt the radio access network.

The controller may be operable to provisionally identify interruption of the radio access network and, in response thereto, to control the collection of further data from the terminals. For example, the controller may analyse the initially provided data for a particular geographic area against interruption/jamming criteria to determine whether additional information is required. The initial analysis may indicate the likelihood (or otherwise) of interruption/jamming occurring, and additional data may be determined to be required if it is indicated that interruption/jamming is a possibility.

If additional information is determined to be required, then the controller may instruct terminals to provide further performance measurements. The controller may trigger a dummy paging procedure to wake up additional terminals from the idle/inactive state to the active/connected state, for example to allow further performance measurements to be provided by, these additional terminals. This dummy paging procedure may be triggered by the injection of dummy data packets into the system, or triggering data delivery or retrieval associated with other services for the terminal, or scheduling an SMS. The controller may trigger terminals to provide performance measurements at their geographic location. The terminals may be instructed to report performance measurements for a fixed duration or periodically. The controller may instruct neighbouring controller to increase the granularity of the performance measurements. The controller may instruct additional neighbouring controller to provide radio performance metrics measured at their geographical location.

The controller may be operable to identify the terminals in the location of the interruption source. The controller may contact these terminals. The controller may instruct these terminals to operate in a predefined manner for a period of time whilst a controller performs diagnostics. The predefined manner may be a reduction in data rate, a limitation on the maximum transmit power, a predefined scheduling pattern for the terminal and/or predetermined times and durations when the terminal cannot transmit or receive. The identified terminals may simply be all the terminals in the location of the interruption source, or may be each terminal in turn which is thought to be the interruption source itself.

The controller may be operable to take action in response to any of the terminals causing the interruption. For example, the controller may include information identifying such a terminal on a network performance blacklist, such identification information being an IMSI and IMEI combination, for example. The network and/or controller may restrict service for terminals that are on the blacklist. The controller may notify the service operator or customer service function of the offending terminal and its location. The controller may contact the offending terminal by SMS, email or any other suitable message to notify it or its user that its performance is being temporally compromised.

Controller may trigger an alarm when the controller identifies that the source of the degraded network performance is not a terminal connected to the operating network (that is, registered with the network or used with the network). An alarm may also be triggered when the controller identifies that the source of the degraded network performance is a terminal and is registered with a network (that is, a terminal with a legitimate subscription with a network). The criticality of the alarm may be dependent on the size of the impacted geographical region, dependent on the assessed impact on network performance and/or dependent on the predicted number of the impacted terminals. The alarm may trigger the controller to modify the cell reselection and/or handover criteria to change the mobility and selection process to preference another network technology or frequency layer. The terminal may be informed through system information or through the inability to connect to the operator network that it cannot use the network, and the terminal may be configured to automatically change the handover/reselection parameters to prefer different network technology (e.g., switching from 3G to 2G, 3G to Wifi, or 3G to Ethernet), or frequency layer or network operator. The terminal may be configured to store network outage or performance degradation against it location locally, reporting this information to the network or application in the network at a later time when connectivity is restored.

The controller may use the information gathered from the terminals in conjunction with information received from other external sources; e.g., loss of DSL/Fibre (i.e. Wireline technology) connectivity with the location or customer.

The controller may trigger communication with terminals with specific applications at specific geographic locations, when network performance issues have been resolved.

The detection of interrupting the network may be particularly advantageous when the network is being used to monitor a premises (or other entity). Interruption of the radio access network in the location of the monitored premises may be an indication that security at this premises is being breached. Identification of the interruption attempt can alert security personnel to take appropriate action.

The controller may be operable to identify the location of a device that interrupts the radio access network.

The controller may be operable to re-route communication from terminals if it detects interruption of the radio access network. The controller may also be operable to insert or change information that is broadcasted by the network to inform customers in the impacted area of consequences and any actions to be performed by the customers. The controller may also be operable to modify the properties or configuration of the network, e.g., increasing transmit power, or increasing coding protection.

In another aspect, the system described herein provides a mobile telecommunications network including a core and a radio access network having a radio for wireless communication with terminals registered with the network, wherein the radio access network includes a controller operable to control the use of network resources by the terminals, wherein some of the terminals are security terminals arranged to monitor security, and wherein the controller is operable to receive data from the security terminals, and to monitor signals received from the terminals, including the security terminals, to identify attempts to interrupt the radio access network. The controller may identify the location of a device that interrupts the radio access network. The controller may re-route communications from the security terminals if it detects interruption of the radio access network.

(P100934-GB-PSP)

The system described herein also provides a mobile telecommunications network including a core and a radio access network having a radio for wireless communication with mobile terminals registered with the network, the radio including a plurality of radio frequency parts and a plurality of baseband parts, and wherein the network includes a controller operable to control the use of the baseband parts.

For example, a nodeB or Femto (base station) of the radio access network can be considered to comprise two main parts: a radio frequency part and a baseband part. The radio frequency part may handle the transmission of radio frequency signals between the antenna of the nodeB or Femto and the mobile terminal, and the converting of radio frequency signals into digital baseband signals (and vice versa). The baseband part may be responsible for controlling and managing the transmission of the baseband signals to other components of the mobile telecommunications network.

The controller may be operable to temporarily disable selected baseband parts that are underused and to enable equivalent functions of the disabled baseband parts to be provided by alternative ones of the baseband parts.

In the embodiment each of the baseband parts corresponds to a respective one of the radio frequency parts, and a respective one of the controller is provided in the radio access network for each of the baseband parts.

In the embodiment the controller may be provided in the novel "platform" which is described in more detail below. Such a platform also provide the baseband part corresponding to the radio part which is provided by a base station associated with the platform.

In the embodiment the controller determines at least one efficiency characteristic of its associated baseband part. The efficiency characteristic may include, but is not limited to: (hardware) load, power consumption, (optical) bandwidth, cell outage, hardware resilience, heat production, power sources, spectrum efficiency, number of supported devices, number of connected devices and the location of devices. The controller may assess load and determine whether to power down a baseband part. The controller may assess whether to use pooled resources from a centralised baseband pool. The controller may assess whether to use resources from another neighbouring baseband part. The controller may temporarily enable selected baseband parts based on efficiency characteristics/criteria within the controller.

In the embodiment each of the baseband parts provides a plurality of baseband functions. Respective baseband functions may include communication in different radio access technologies, such as 2G, 3G, 4G etc.

In the embodiment the controller temporarily disables selected baseband functions of its associated baseband part that are underused and enables equivalent baseband functions to the disabled baseband functions to be provided by alternative ones of the baseband parts that are associated with other controller. In this way, a baseband function that is operating inefficiently may be shut down, and instead equivalent functionality may be provided by another baseband function that is associated with another radio frequency part.

The controller may be operable to dynamically control the allocation of resources within a baseband part between radio access technologies such as 2G, 3G and 4G (LTE) technologies. The controller may disable a radio access technology to reduce load in the baseband part. The controller may reconfigure the baseband part controlling a specific spectrum allocation to offer a different radio access technology on that spectrum.

The controller may be provided at a gateway node and/or an access node.

In one arrangement a gateway node controls the sharing of baseband functions between respective baseband parts. Alternatively the controller may control the sharing of baseband functions between respective baseband parts. The controller and/or gateway node may dynamically manage the routing of information/optics between the access nodes to enable hosting of baseband parts on other nodes.

The gateway node or the controller may be operable to disable selective baseband functions, typically those baseband functions that are not operating efficiently and which can be performed by sharing the capacity of the baseband function provided elsewhere.

The gateway node or controller may be operable to share or disable baseband functions in dependence upon the efficiency characteristic thereof.

The system described herein also provides a method of operating a mobile telecommunications network as defined in the claims.

(P100941-GB-PSP)

According to a Another Aspect of the System Described Herein, there is Provided a mobile telecommunications network including a core and a radio access network having a radio for wireless communication with mobile terminals registered with the network, wherein the radio access network includes a controller operable to control the use of network resources by the mobile terminals, and wherein the controller is operable to collect information relating to the mobile terminals and to control the operation of an external resource in dependence on the information.

The information collected by the controller may provide an indication of the location of the mobile terminals. Such information might be the time it takes for a data packet sent to a mobile terminal to be acknowledged by that mobile terminal. It could be other timing information. For example, the location of the mobile terminal could be determined by cell triangulation or any other suitable technique. Information from a GPS receiver of the mobile terminal may also be used to determine the location of the mobile terminal.

The controller may be operable to instruct the mobile terminals to move from an idle communication state to an active or connected communication state in order to obtain the indication of the location of the mobile terminals. This may be performed if, for example, it is necessary to send a data packet to the mobile terminal, and wait for acknowledgement of receipt of the data packet from the mobile terminal, in order to identify its position. The terminal may be moved from the idle communication state to the active/connected communication state my any suitable technique, including: modification of network measurement parameters (e.g., the measurement period); by the controller transmitting dummy paging messages to a paging group of mobile terminals; and by the controller modifying the cell identification parameters (e.g., tracking area identifier).

The controller may be operable to analyse the collected information to determine at least one of the speed, direction, velocity and indoor/outdoor status of the mobile terminals. The speed, direction or velocity may be determined by measuring the location of a mobile terminal at spaced apart time intervals.

The controller may be operable to analyse the collected information to determine the density of the mobile terminals at a particular position. If the location of each mobile terminal served by the controller is known, then the density of mobile terminals at any particular position can be calculated.

The controller may be operable to determine linkage/relationship of movement between mobile terminals used by public and mobile terminals tied to a vehicle.

The controller may be operable to predict future location of mobile terminals based on measured location, or linkage of mobile terminal and known route of vehicle.

The controller is in the embodiment to be described is operable to provide the information to the external resource. That is, the external resource may use the location, speed, direction or velocity information to adjust the way that it functions.

The external resource may comprise street furniture, such as street lights, electronic displays, security cameras, and may also comprise human resources such as street cleaners and security personnel.

For example, if the external resource is street lights in an area served by the controller, then the location, speed and density information of the mobile terminals may be used to selectively deactivate or dim street lights in areas where there is a low density of terminals in order to save energy. Other examples of the use of the information by different external resources are described in the detailed embodiment.

In a further aspect the system described herein provides a method of operating a mobile telecommunications network as defined in the claims.

The system described herein, in another aspect, provides a mobile telecommunications network including a core and a radio access network having a radio for wireless communication with mobile terminals registered with the network, wherein the radio access network includes a controller operable to control the use of network resources by the mobile terminals, wherein the controller is operable to measure the movement of the mobile terminals and to control the operation of street furniture in the vicinity of the each of the mobile terminals in dependence of the movement.

The system described herein, in a further aspect, provides a mobile telecommunications network including a core and a radio access network having a radio for wireless communication with mobile terminals registered with the network, wherein the radio access network includes a controller operable to control the use of network resources by the mobile terminals, wherein the controller is operable to measure the location and movement of the mobile terminals and to control the operation of street furniture in the vicinity of the each of the mobile terminals in dependence of the device measurements.

The street furniture may include street lights, electronic displays, security cameras, and/or human resources such as street cleaners and security personnel.

(P100939-GB-PSP)

According to an Aspect of the System Described Herein, there is Provided a mobile telecommunications network including a core and a radio access network having a radio for wireless communication with terminals registered with the network, wherein the radio access network includes a controller operable to control the use of network resources by the terminals, wherein the terminals include at least one application, and wherein the controller is operable to control the application and to control transmission of data relating to the application.

The controller may be a novel "platform" which may be provided at an access node site (for example, a base station) or at a gateway site (for example Radio Network Controller—RNC).

The data may include signalling.

The controller may be operable to analyse the data and to control the application of the terminal in dependence on the analysis. The controller may store content received in the data from the terminals. The controller may analyse the content to determine how critical it is that the content is delivered onwardly, such as to a data analyser. The controller may analyse the content to assess whether there is potential for optimisation and transcoding before the content is delivered onwardly, and may then perform appropriate optimisation/transcoding.

The controller may receive content from a plurality of the terminals, and may aggregate this content prior to transmission onwardly.

The (on-terminal) application may be operable to control the capture of information relating to the area around the terminal, the aforementioned data being derived from this information. The application may take sensor measurements of its environment local to the terminal. The information relating to the area around the terminal may be the geographic location of the terminal determined by any suitable means, such as cell triangulation, GPS etc. The information may also be capturing of movement, variation of lighting and/or variation of temperature in the locality of the terminal. The application may prioritise from which sensor of the terminal data are stored. The application may prioritise from which sensor data are transmitted to the controller. The application may differentially optimise the measurements made by each sensor. The controller may control the electronic storage of the terminal and the data held within the electronic storage. The controller may control the quality and compression of the stored data.

The information relating to the area around the terminal may include an image. The image may be a visible light image, an infra red image or an image taken using any other part of the electromagnetic spectrum. The information captured may be a sequence of images (e.g., film/video). The image or images may give an indication of the variation of lighting. If the image or images they provide an indication of the temperature.

The information captured may include audio information.

The controller may be operable to modify the resolution of the image or the type of image. The image may be stored on the terminal. The image may be compressed by an amount depending upon the available storage capacity on the terminal. The controller may also modify the type of information obtained from image sensors and other types of sensors The controller may control the application on the terminal to translate the collected data before transmission of the data to the network. The controller may control the application on the terminal to translate the collected information before transmission to the network.

The controller may be operable to analyse external resource availability, or predicted availability, and to control the application in dependence thereon. The controller may be operable to control the form in which the application transmits the data to the controller. For example, the controller may instruct the application to adjust how information is captured—such as by modifying the resolution or type of captured information based on the external measurements. Additionally or alternatively the controller may instruct the application to modify the resolution or type of data that is stored in the electronic storage of the terminal prior to transmission of this data to the controller. The external resource may be the available storage capacity in the terminal or in the controller. The external resource may additionally or alternatively be radio capacity/capability availability (for example, depending upon radio interference and cell congestion). The resource availability may include radio load of cell, radio resource available to the terminal; the resources available on backhaul or application servers in the network. The external resource may be predicted future radio capacity. The controller may schedule the transmission of data from the electronic storage of the terminal to the controller in dependence upon the external resource availability, or predicted availability. For example, data may be transmitted when there is significant spare radio capacity.

The controller may instruct the terminal to optimise the data from/in the electronic storage before transmission to the controller. The external resource may also include information about the subscription of the terminal with the network (such as subscription priority), the charging rate of the terminal (for example, the tariff that the owner of the terminal plays or an associated service level agreement between the network operator and the owner of the terminal). These factors may be used to adapt the optimisation level and transmission priority given to the transmission of the data from the terminal to the controller.

The controller may be operable to control the form in which the application transmits the data. The form may depend upon the external resources. The external resource may also include the quality and capacity of the backhaul connection between the controller and the data analyser. The form may also depend upon the available resources on the data analyser or on any element in the data path between the controller and the data analyser.

In another aspect the system described herein provides a mobile telecommunications network including a core and a radio access network having a radio for wireless communication with terminals registered with the network, wherein the radio access network includes a controller operable to control the use of network resources by the terminals, and wherein the terminals include cameras, and wherein the controller is operable to analyse images obtained from the cameras, and to control transmission of data relating to the images to the core in dependence on the analysis. The controller may be provided at an access node site and/or a gateway site.

(P100938-GB-PSP)

The System Described Herein Provides in One Aspect a Mobile telecommunications network including a core and a radio access network having a radio for wireless communication with mobile terminals registered with the network, the radio including macro base stations and access points, the latter connecting to the core via an IP link, wherein the radio access network includes a controller operable to control the use of network resources by the mobile terminals, and wherein the controller is operable to provide services to one of the mobile terminals irrespective of whether the mobile terminal communicates via one of the macro base stations or one of the access points.

The access point may be a femto cell, which connects to the core via a DSL link.

The controller may be operable to control handover of the mobile terminal from one of the macro base stations or one of the access points.

In the embodiment the controller is operable to host access point concentrator functions that are capable of supporting access points.

The access points hosted by the controller may share a common interface for access points and macro base stations, between the controller and the core network or between the access point and macro base stations.

In the embodiment the controller is operable to provide services, optionally including applications and/or network functions, to the mobile terminals served through the access point architecture.

The controller may control whether the mobile terminals receive services via one of the base stations or one of the access points.

In the embodiment the controller may cause the mobile terminals to handover/or reselect between one of the base stations and one of the access points, or between respective ones of the access points. This may be achieved by varying the handover and/or reselection criteria, or by varying the system information broadcast by the or each access point.

In the embodiment the controller modifies handover parameters and cell reselection parameters for a mobile terminal based on a measured characteristic of the mobile terminal (e.g., radio conditions), in one example. The handover parameters and cell reselection parameters may alternatively or additionally be dependent upon the location and speed of the mobile terminal in relation to the known geographic location of an access point. The handover parameters and cell reselection of parameters may alternatively or additionally be dependent on user subscription information, historic measurements of a target access point quality and reliability, and predicted user experience on the macro base station or access point.

The handover procedure may be initiated and cell reselection parameters may be modified based on the service requirements of the services and applications used by the mobile terminals.

Advantageously, the controller configures the parameters of the or each access point in real time.

The controller may power up/down the radio of an access point depending on the measured geographic position of devices in the macro base station coverage area.

The controller may manage the configuration of the access point based on detected power and interference at the macro base station or mobile terminals connected to the macro base station.

The controller may reconfigure the (frequency) spectrum allocation and (radio access) technology (e.g., between GSM, HSPA or LTE) of the access point depending on measured geographic position of mobile terminals served by the macro base station, the geographic coverage/quality of the access point, and the respective capability of the mobile terminals.

The system information parameters broadcast by the access points may be modified based on interference measured on the macro base station and the mobile terminals connected through the macro base station and access point.

The controller may configure the broadcast system information parameters of the macro base station as a consequence of the access point performance within the coverage area of the macro base station.

The access point performance may be determined across a cluster of access points within the coverage area of the macro base station.

The system information parameters may be modified based on interference load of the macro cell on macro base station.

The controller may differentially charge the users of the mobile terminals for connectivity and service access from the controller whilst using the access points. For example, there may be a lower charge for communicating via an access point rather than via the macro base station.

Other optional and advantageous features of the invention are disclosed in the dependent claims.

The system described herein also provides a method of operating a mobile telecommunications network, as defined in the claims.

In the claims, the reference to features or steps in the alternative should not be interpreted as indicating that those alternatives are equivalent or provide similar functions or advantages.

BRIEF DESCRIPTION OF THE DRAWINGS

Embodiments of the system described herein will now be set forth in more detail with reference to the accompanying Figures in which:

FIG. 13 shows the structure of the definitions used by the virus detection entity according to an embodiment of the system described herein;

DETAILED DESCRIPTION OF VARIOUS EMBODIMENTS

Certain elements of a 3G mobile telecommunications network, and its operation, may now briefly be described with reference to FIG. 1.

Each base station (e.g., Node B 1 and Femto 2) corresponds to a respective cell of the cellular or mobile telecommunications network and receives calls from and transmits calls to a mobile terminal (not shown) in that cell by wireless radio communication in one or both of the circuit switched or packet switched domains. The mobile terminal may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
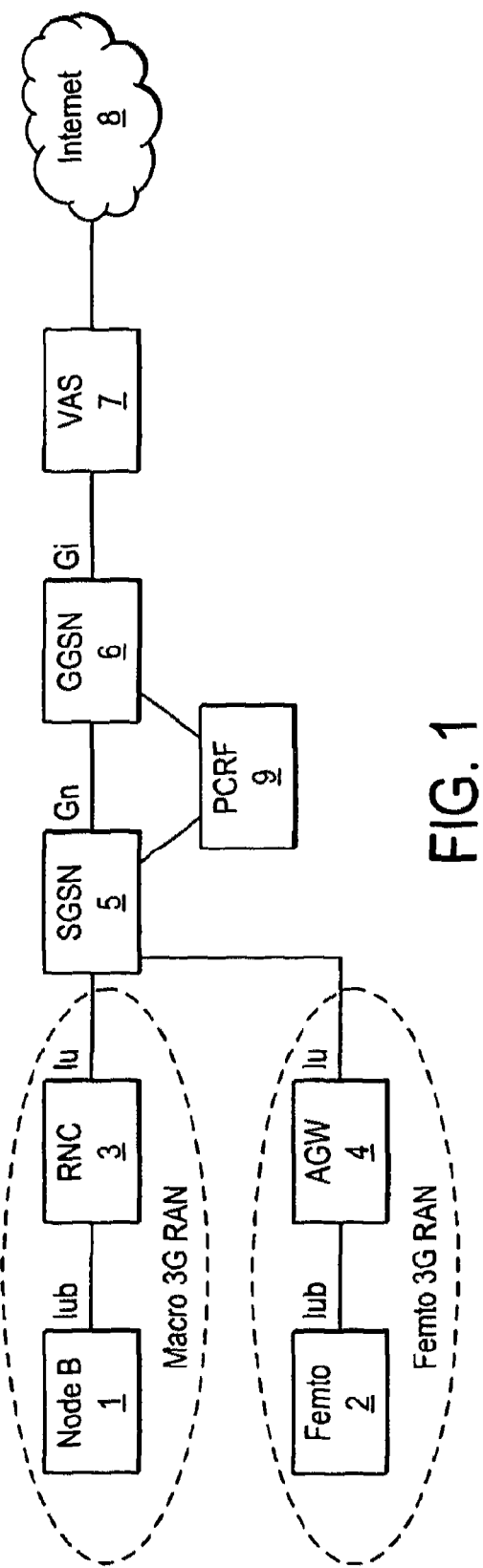
FIG. 1 illustrates a high level packet data network architecture, useful for explaining the prior art and embodiments of the system described herein.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used, including home access points (HAPs), access points (APs) and femto-base stations, but all names refer to the same apparatus.

The radio link between the Femto 2 and the mobile terminal uses the same cellular telecommunication transport protocols as Node B 1 but with a smaller range—for example 25 m. The Femto 2 appears to the mobile terminal as a conventional base station, so no modification to the mobile terminal is required for it to operate with the Femto 2. The Femto 2 performs a role corresponding to that of Node B 1 in the macro 3G RAN.

The Femto 2 would typically be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN is responsible for the delivery of data packets from and to the mobile terminals within its geographical service area. It performs packet routing and transfer, mobility management (attach/detach and location management), logical link management, and authentication and charging functions. A location register of the SGSN stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW to the PSTN, and data is transmitted there-between by IP transport/DSL transport. The Femto or AGW converts the cellular telecommunications transport protocols used between the mobile terminal and the Femto 2 to the appropriate IP based signalling.

The femto 2 may be connected to the AGW by means other than a DSL cable and the PSTN network. For example, the femto 2 may be connected to the AGW by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g., the Internet. The GGSN enables the mobility of mobile terminals in the networks. It maintains routing necessary to tunnel the Protocol Data Units (PDUs) to the SGSN that service a particular mobile terminal. The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN. For this purpose, the GGSN stores the current SGSN address of the user and their profile in its location register. The GGSN is responsible for IP address assignment and is the default router for the connected mobile terminal. The GGSN also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network.

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g., arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Data in a mobile telecommunications network can be considered to be separated into "control plane" and "user plane". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

In addition to the elements and functions described above, mobile telecommunications networks also include facilities for transmitting SMS messages. SMS messages are transmitted over the control plane only (and not the user plane).

This architecture is what currently is being used to carry all packet data to and from mobile terminals. That is, in today's implementation of the Packet data architecture, user plane traffic traverses across all the network elements shown between the Node B or Femto on which the user is camped and the Internet. That is, all data is directed from the applicable RAN through the core network components SGSN, GGSN and VAS before reaching the Internet. All PS traffic accordingly follows the same path and therefore has the same network costs. All applications are processed on the client (on the mobile device) or on the server (which is connected to the Internet), and the network core therefore acts like a bit-pipe in the current architecture. For data, where the mobile network operator cannot add any value by carrying it on its own backhaul transport, core transport or cellular core infrastructure (the core network), such as data destined for the public Internet without required intervention from the core network, there is no benefit to routing this data via the core network.

However, a large percentage of this traffic can be handled in a more intelligent manner for example through content optimisation (Video & Web), content caching, or locally routed or directly routing content to the public Internet. All these techniques reduce the investment required by a mobile operator to carry the data on its own backhaul and core transport or cellular core infrastructure.

In order to offer low cost packet data, to support new services and to manage customer expectation, a step-change reduction in the end-to-end cost per bit is required.

Mobile operators want to reduce their packet data handling costs through alternate network architectures based on commoditised IT platforms, breaking away from the traditional architecture based on their voice legacy. These new network architectures overcome the Access architecture issues of today In order to successfully offer cheap packet data and be able to compete with the fixed broadband offers (flat fee) a solution is proposed which focuses on the reduction of the end-to-end cost per bit, especially for Internet access service.

This enables mobile operators to reduce packet data handling costs by means of an alternative network cost model architecture, which breaks out of the traditional network architecture and nodes and utilises lower cost transport networks to optimise the data flow.

Figure 2:
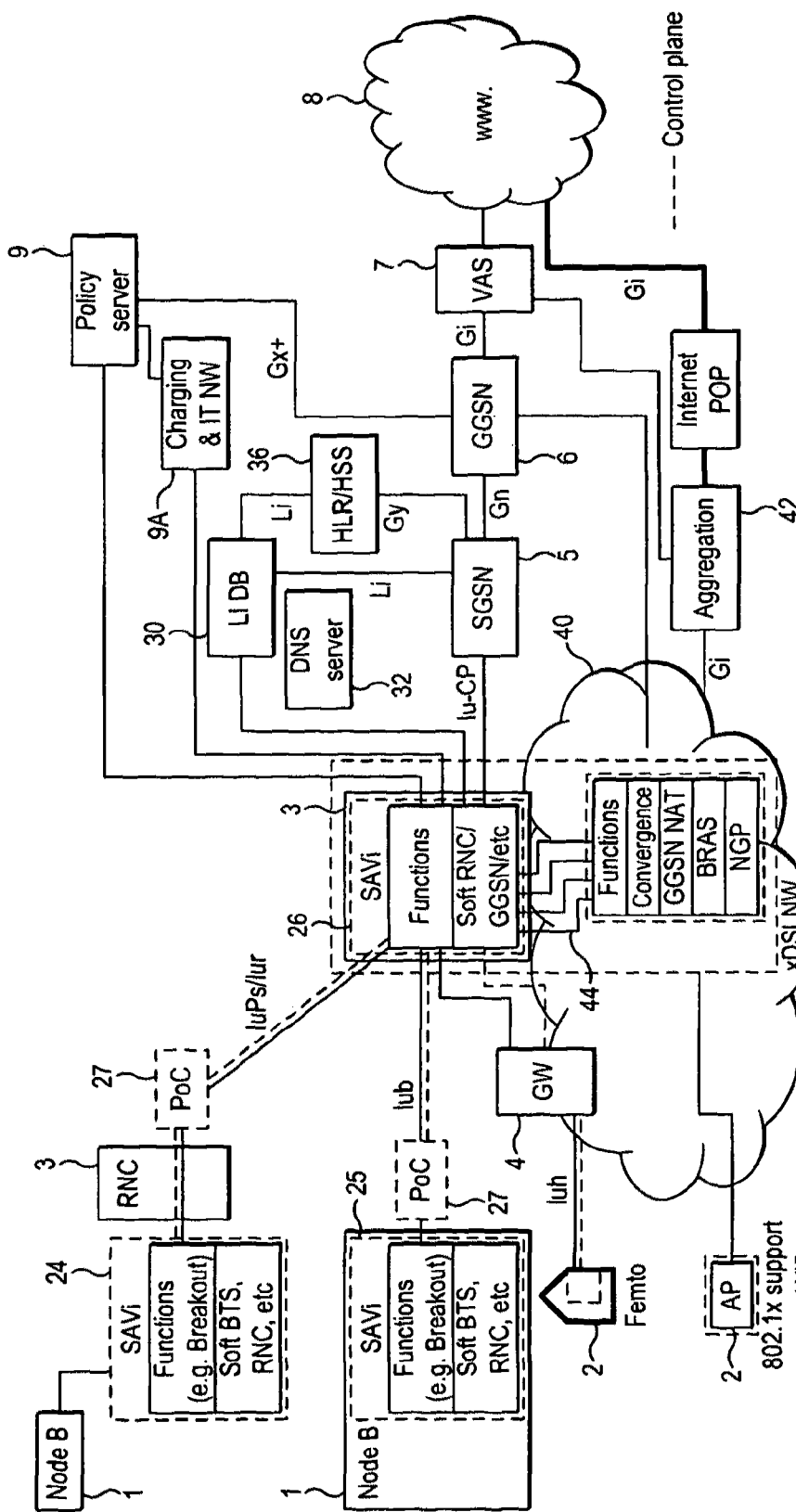
FIG. 2 illustrates the introduction of a new functional "platform" in a 3G network according to an embodiment of the system described herein.

In this regard, FIG. 2 shows a high level description of the architecture that may be adopted to deploy this on a 3G network.

According to this arrangement, novel "platforms" 24, 25, 26 for performing functions such as caching, routing, optimisation and offload/return decision functionality are integrated into the network. This decision functionality may be incorporated in the radio architecture. In this regard, the platforms 24, 25, 26 may be incorporated into the NodeBs 1 (25), RNCs 3 (26) or exist as separate physical entities (24). It is these platforms 24, 25, 26 that, for example, determine the path of communications originating from the mobile terminals.

The exact placement of the platform 24, 25, 26 is not essential, and, for a macro 3G network, it can be placed at or between the Node Bs and the RNCs, and also between the RNCs and the SGSNs (or any combination thereof). It would also be possible to place the platform 24, 25, 26 at the GGSN (although not the SGSN as this does not control user data, only control data).

In the 3G Macro network, the aim is to offload a high percentage of the macro network traffic from the core and transport (IuPS, Gn, etc) by diverting specific traffic type for certain user(s) class directly to the Internet.

Where the platform 24, 25 is located, in the Node Bs (or on the Iub interface), it may be possible to redirect the data from all the remaining mobile network elements (e.g., the RNC, SGSN, GGSN and VAS for macro 3G), and sending the data directly to the Internet 8. In a similar manner, where the platform 26 is located at the RNC (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell may have at least one RNC 3 and a plurality of Node Bs, so where the decision blocks are situated at or in the vicinity of the Node Bs, for instance, there may be a plurality of links which should ideally be aggregated before being passed to the Internet 8. At the point of this aggregation 42, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module. In FIG. 2, this returning of data is only shown to the VAS 7, but the data may be returned to one or more of the other core network elements.

Each of the NodeBs 1 is connected to the mobile network core through a Point of Concentration (PoC) 27. All traffic from the NodeBs 1 which is to be routed through the core mobile network is routed to the PoC 27. This includes both user plane and control plane data. On the control plane level, the PoC 27 routes data to and from the SGSN 5 and the GGSN 6. Control data is also sent to and from other core network components, including the Lawful Interception Database (LI DB) 30, DNS Server 32, Policy Server 9 (including Charging rules and IT Network 9A) and Home Location Register/Home Subscriber Server (HLR/HSS) 36 (which contains subscriber and device profile and state information).

User plane data is transmitted by the PoC 27 to the SGSN 5 and the GGSN 6. From the GGSN 6, data is routed across a VAS 7 node to the Internet 8. In 3G this is the standard data path from the mobile terminals to the Internet.

To implement an advantageous feature, an alternative path on which to re-route certain data to the Internet 8 is provided, whereby, each NodeB 1 and Femto 2 may be connected to a fixed line connection 40 (e.g., xDSL) which is directly connected to the Internet 8. These xDSL connections may be made directly to the NodeB and/or Femto or made to the NodeB/Femto via other components, such as the PoC 27. In FIG. 2, the xDSL Network 40 may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each Node B 1 and/or PoC 27 is associated with a platform 24, 25, 26, for each data packet request originating from a mobile terminal, a decision at the platform 24, 25, 26 is made as to whether the traffic may bypass the core mobile network entirely or may be passed into the core mobile network. The location at which the traffic is routed towards the Internet is preferably at the platform 24, 25, 26; however, it may alternatively be routed out from the core network towards the Internet at a different component. Traffic offloaded from the macro network is routed by the platform 26 to the xDSL network 40 by link 44 (the decision to offload this traffic may have been made at platform 24, 25 or 26—although the decision is implemented at platform 26)

Figure 3:
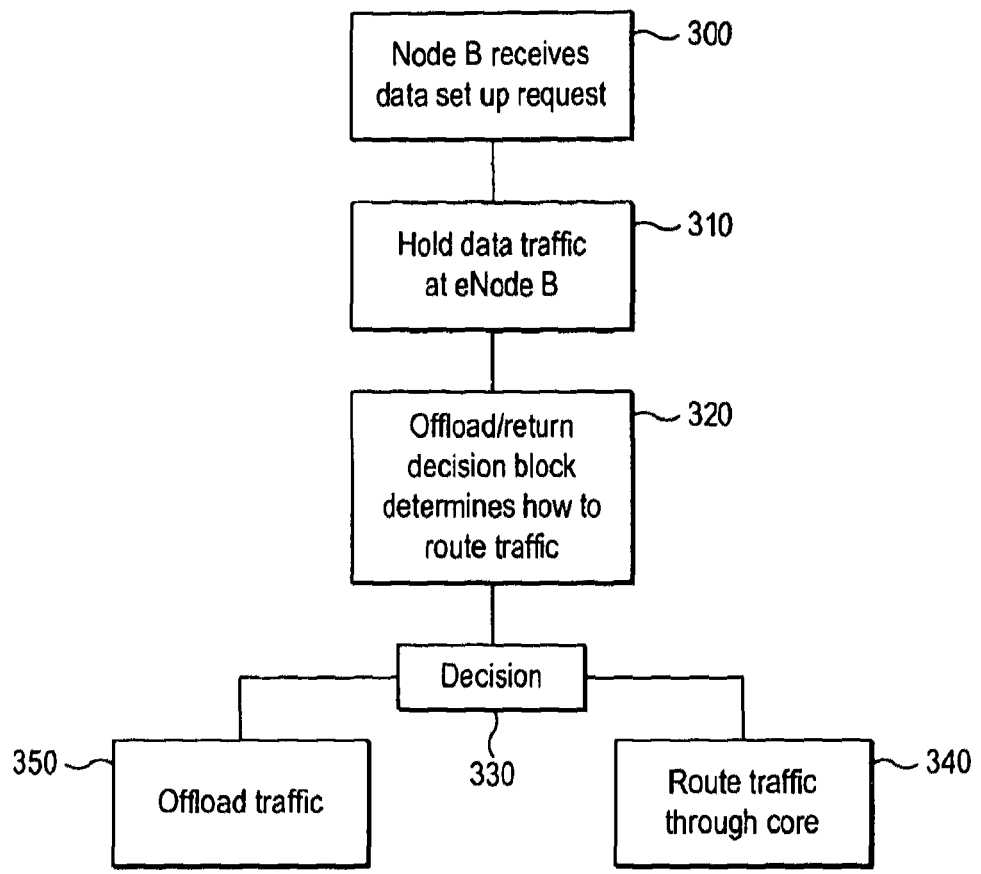
FIG. 3 illustrates a flow chart of an example offload decision process as implemented in the 3G network of FIG. 2 according to an embodiment of the system described herein.

Preferably the Offload/Return decision is dependent upon the type of data or user. To exemplify this feature of the embodiment, FIG. 3 is a flow diagram showing the steps taken when deciding how to route the traffic in the architecture of FIG. 2. For instance, consider an NodeB receives a request to set up a data call from a user device which is camped on the NodeB at 300. Once the NodeB has identified the request as a data call and the type of traffic/user, rather than automatically routing the data traffic to the core network, the data request is held at the NodeB at 310 until a decision has been made as to how to route the data, in particular whether to offload the traffic directly to the Internet or whether to return the data through the core mobile network. Typically, the signalling (control plane) for the connection may continue through the normal route but the user data traffic may be held at the NodeB, this is possible by virtue of the separate user and control planes, as shown in FIG. 2.

The decision as to whether or not to use the Core mobile Network to route the data traffic can be based on various aspects, particularly relating to the properties of the data being routed and/or status of the user routing the data.

The Mobile Network may add value to traffic by providing a number of services, such as compressing the user data to speed-up the data transfer while downloading (if this functionality is not already supported by the platforms 24, 25, 26). These different services can be broken up into groups and provided by different entities (e.g., this enables greater flexibility in the provision of the services, such as the mandated Internet Watch Foundation—IWF—requirement, which can only be supported by the mobile operator). The platforms 24, 25, 26 therefore make a decision on whether to service the data locally through caching, fetch the data from other node or from the Internet via offload functionally or whether to route the traffic through the core network, based on the applicability of one or more of the services to the traffic. That is, platform 24, 25, 26 decides when data traffic requires one or more of the services and when it can do without them.

It should also be noted that these services are ones that could be provided without using the core network. These are services that add value to the customer, and which subscribers may pay for (explicitly or implicitly).

Referring again to FIG. 3, the platform 24, 25, 26 decides at 320 what to do with the traffic (from coming for the network/Internet or orientated by the device). This decision may be made by interrogating certain servers or databases stored centrally within the core network which can compare the type of service, type of user etc with criteria which identifies the type of action shall be considered, e.g., whether the traffic is suitable for offloading directly to the Internet (at 330) from the NodeB or whether the traffic should be routed through the core (at 340). Examples of some of the considerations used in influencing the decision of whether to offload the traffic are discussed below in more detail. The implementation of this data offload technique needs to be carefully considered, as it places additional constraints on the network design.

The following is a non-exhaustive list of examples of challenges that have to be considered when implementing the data offload technique:
  a) maintaining Customer Services provided by the core network or otherwise;
  b) maintaining Network Services (e.g., Charging Rate Limiting/application control); and c) maintaining Regulatory Services (e.g., to enable Lawful Interception and Regulatory Content Filtering).

Some specific examples of Customer Services that can be taken into account by the offload decision module include:

i) Parental Control: A service which customers subscribe to that filters content in order to shield children from unwanted websites and programs. Whether traffic from a given user needs to be filtered can be determined by a Common User Repository (CUR) lookup, where the CUR stores user profile information, such as whether the user is an adult or a child etc. If traffic needs to be filtered, then either the traffic cannot be offloaded or it needs to be filtered somewhere other than the core network.

ii) Traffic Optimisation: Optimisation is only required for low bandwidth connections (2G). By looking at the Radio Access Type (RAT) and the International Mobile Equipment Identity (IMEI) it can be determined whether or not a subscriber needs these services. Where traffic optimisation is not required, the traffic can be offloaded iii) Marketing Proposition: The mobile network is typically setup to provide full mobility with acceptable Quality of Service (QoS). A further option could be to offer best effort QoS without guaranteed full mobility. As an example, for when a heavy user has exceeded their fair usage limit, their traffic could be designated as low priority traffic and offloaded.

The Network Services that can be taken into account by the offload decision module are typically those that the network operator needs to manage its network. Some examples include:

i) Charging: The charging plan that a user subscribes to can be used to determine whether or not to offload that user's data. For instance, it is most easily avoided when the customer has a flat rate plan. That is, users on flat rate plans do not need their usage tracked for charging purposes in real time and so can be offloaded onto the alternative route. For users who are roaming or whose charging plan depends upon usage, then, the operator/supplier needs to track their total usage in real-time, and so their data needs to be maintained on the core network route so that rate-limits and data usage can be accurately tracked and alarms/alerts activated when usage exceeds allowances. This is because, if this is not avoidable then Call Data Records (CDRs) need to be generated by the module for the real time charging.

ii) Rate-limiting/application control: This is currently used to manage the traffic flow according to a certain usage policy. Excessive bandwidth usage or controlling P2P applications are common reasons to rate limit users. Therefore, where a user transmitting data is determined to be under a rate restriction (i.e. throttling) or the data they are transmitting has an application restriction (i.e. the application is blocked), then that data can be offloaded. This exceeded allowance information would typically be communicated to the decision module (24, 25, 26) by the HLR/HSS. This traffic management enables the total traffic volume to be reduced and is typically fully managed by the network operator.

iii) QoS: The network uses QoS to manage traffic during high load situations and to support marketing propositions. To enable QoS considerations to be enforced by the offload decision module, a connection is established between the offload module and the Policy and Charging Rules Function (PCRF) entity. This enables decision criteria to be dynamically fed to the offload module, for instance to maintain high priority users on the core network path and/or high priority application types, such as VoIP. It is to be appreciated that the connection to the PCRF is not essential, and alternatively, static or semi-static rules, pre-stored with the offload module, can be considered.

iv) Mobility: Mobility, such as cell handover, is an issue that needs to be managed by the core network. Therefore, terminals that are in motion should not be offloaded. The mobility of a mobile terminal could be determined by querying the Node B. Some users could be provided with a contract that allows only fixed or limited mobility use, so that the service provided was equivalent to a fixed broadband package. Different charging tariffs could be applied depending on whether a user was at a fixed location or mobile. Two ways the offload decision module can handle a mobile terminal's mobility are as follows:

1. The offload decision module can have the capability to characterise the radio link between the device and the network by monitoring the number of handovers implemented for the mobile terminal. If a certain number of handovers occur over a fixed duration, the mobile terminal can be classified as in motion, and any data from the mobile terminal can thereafter be routed back into the core network to avoid any further packet data delay. This of course assumes that the mobile terminal had been designated for data offload on the bypass link.

2. The offload decision module is situated on the IuPS for the 3G network (i.e. between the RNC and the SGSN) or S1 for the LTE (i.e. between the eNode B and the PoC), and checks the Iur or X2 signalling information (i.e. between a set of RNCs controlled by a given 3G SGSN and between a corresponding set of eNode Bs for LTE). If this monitoring shows that a mobile terminal is hopping between cells one of which is not connected to (and therefore managed by) the offload decision module, any data from the mobile terminal can thereafter be routed back to the legacy path through the core network.

Regulatory Services are services that are mandated by legislation, and are typically provided to all traffic. Some specific examples of Regulatory Services that can be taken into consideration by the offload decision module include:

i) Lawful Interception (LI): The ability to provide Lawful interception may be maintained in any offload or local breakout plans. The options for offload are:

Maintain the evaluation of LI in the core network, and not offload users whose traffic needs to be intercepted (e.g., where the user has been tagged by the police for communication interception). Since the LI functionality is handled by the core network, the core network accordingly cannot be bypassed;

Add LI capability to the offload decision module, which may require a local LI interface with a dedicated database identifying the users to be intercepted. With this option, upon identifying traffic from a user on the list, a copy of the data can be made at the local LI interface and the traffic offloaded. The copied data can then be reported to the appropriate authorities; or Alternatively, LI may be performed at the Internet Service Provider (ISP). With this option, since LI is considered at the ISP it is not a consideration at the offload decision engine, and so the data may be offloaded, where possible. However, to effect this option, a Service Level Agreement (SLA) with relevant ISP providers may need to be amended in order to include the support of LI in the ISP network rather than in the mobile network infrastructure.

ii) Regulatory Content Filtering (e.g., for Internet Watch Foundation (IWF)): This required functionality blocks illegal websites. This functionality could easily be added to the offload decision module as it is not processor intensive. An http proxy server, for instance, could be used to support this functionality. Otherwise, the traffic may be returned back to a dedicated core node(s).

A further criterion that the platform (24, 25, 26) module may consider is the priority of the customer. In this regard, a network operator may wish to prioritise traffic across its network based on the priority level of the customer. For example, a high value customer (e.g., a corporate customer or a subscriber with on a high tariff contract) may be given priority over a low value customer. In this situation, a network may decide to offload lower value customers directly to the Internet. This is related to the QoS criterion mentioned above, although the QoS criterion is generally linked to traffic management to maintain a balanced network, whereas the priority referred to can be used to ensure subscribers get a level of service commensurate with their service agreement.

The embodiment of FIG. 2 is in relation to a 3G network. Embodiments of the invention are equally applicable to 4G (LTE/SAE) networks.

The LTE/SAE macro network includes eNode Bs which make up the RAN. The eNode Bs effectively combine the functionality of the node B and the RNC of the 3G network. These eNodeBs are the network components which communicate with the mobile communication devices. It is envisaged that the eNodeBs may be arranged in groups and each group controlled by a Mobility Management Entity (MME) and a User Plane Entity (UPE).

The MME performs many of the mobility functions traditionally provided by the SGSN. The MME terminates the control plane with the mobile device. It is responsible for terminating NAS (Non Access Stratum) Signalling such as MM (Mobility Management) and SM (Session Management) information as well as coordinating Idle Mode procedures. Other responsibilities of the MME include gateway selection inter MME Mobility and authentication of the mobile device.

The UPE manages protocols on the user plane such as, storing mobile terminal contexts, terminating the Idle Mode on the user plane, and PDP context encryption.

The platforms would operate in the same manner as described in relation to the 3G network. The platforms may be located at many different locations in the 4G network.

Figure 4:
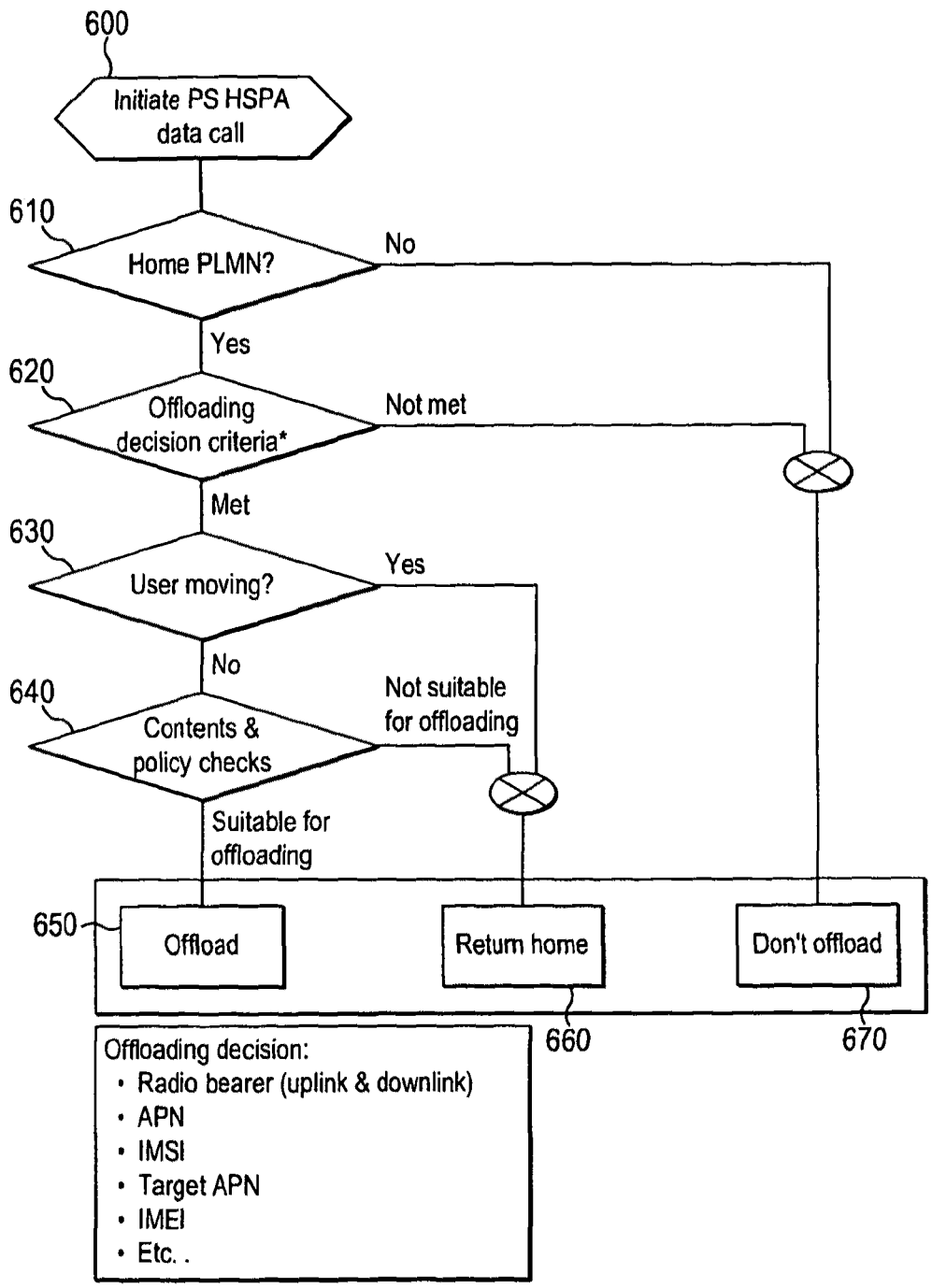
FIG. 4 illustrates a flow chart of an example offload decision making process that may be implemented by a redirection module according to an embodiment of the system described herein.

A more specific example of how the platform 24, 25, 26 may be implemented is described in relation to FIG. 4. FIG. 4 is a flow diagram illustrating a preferred method for deciding whether to offload data traffic to the Internet. The decision structure is composed in a hierarchical form in order that certain types of user or data are always directed through the core network. The example of FIG. 4 is described for a 3G network but it will be clear to those skilled in the art that these decisions could be applied to any type of radio access technology.

Once a PS HSPA data call (or other connection) is made and received at the Node B at 600, a primary consideration by the platform 24, 25, 26 at 610 is whether the device is operating on its home network or whether it is roaming. If the device is roaming then all traffic is automatically routed through the core network. The reason for this is that the home network would want to guarantee the security and accurate billing (due to different charging principle between home and visited operator) of the user's traffic. The platform 24, 25, 26 at 610 may also consider other factors, such as what application types running on the mobile terminal require connections. If the mobile device is operating on its home network at 610, or if the applications do not require a connection to the core network, the platform 24, 25, 26 considers secondary offloading criteria at 620. Examples of secondary criteria may include the functions required by the device, the radio bearer currently used by the device, the APN, or the priority level of the customer identified, for example, through IMSI, IMEI or the target subscriber. If the offloading criteria are met at 620, the decision moves to the tertiary criteria, otherwise, the traffic is not offloaded.

At 630, the system checks the mobility of the user. If the user is moving, he is considered not suitable for offload due to an expected interruption delay of the user data when moving between source and target cell.

Finally, at 640 the system conducts a contents and policy check to confirm whether the user is suitable for offload. If it is determined that the user is suitable for offload to the Internet, the eNodeB offloads the traffic to the Internet at 650. If it is determined that the user is not suitable for offloading to the Internet at 640 then the procedure returns "home" at 660. A connection is provided by a network core in a conventional way and the tests of the flowchart shown in FIG. 4 are repeated periodically to determine whether offloading directly to the Internet becomes possible subsequently.

If the device is determined to be roaming at step 610, then the device is not offloaded directly to the Internet, but remains connected via the network core in a conventional way at 670. Similarly, if the offloading criteria are not met at steps 620, the mobile device remains communicating via the network core in the conventional way, again at 670.

The hierarchical decision method is useful because it reduces the number of challenges across the network. It will be evident to those skilled in the art that different hierarchical structures may be appropriate for different networks, different conditions etc and that the example of FIG. 4 is just one way the decision could be made.

For instance, whilst arrangements have chiefly been described in relation to transmitting data traffic from a mobile terminal to a data network, the principles may also be applied to transmissions from a data network towards a mobile terminal.

In the arrangements described above the decision regarding the route is said to be made at call set-up. However, it should be appreciated that a decision to change the routing of data may be made at the beginning of a communication session (for example establishment of a PDP context), or during a communication session. The routing of data may change several times during a single communication session. For example, when a communication session is initiated it may be detected that the user is not moving, in which case a decision may be made to offload the data over the alternative data route. Subsequently it may be detected that the user is moving, and at this point a decision may be made to beginning routing data for the communication session via the mobile network. During the communication session, the mobile terminal may become stationary for a prolonged period of time again, and at this time a further decision may be made to send subsequent data during the communication session via the alternative data route. Subsequently again, the user may then attempt to access age-restricted content, and it may be detected that parental control is required. In response for the requirement for parental control, a decision may be made to redirect subsequent data during the Communication session via the core network so that core network parental controls can be applied.

It is to be appreciated that the present embodiments of the invention are to be distinguished from HSDPA offload, a technique used on the Iub interface between the Node B and the RNC. HSDPA offload which serves to separate data traffic from voice traffic, so that non-real time data traffic is sent down a less expensive backhaul to complement or replace the expensive E1/T1 TDM backhaul link between the two. Once this diverted traffic reaches the RNC, however, it is returned to the cellular and transport core networks and there is no differentiation made based upon data traffic type.

In the arrangement described above the platform 24, 25, 26 primarily handles data offload decisions. As described below, the platform can perform may other functions.

Embodiments of the invention in which the Radio Access Network controls the use of resources by mobile terminals will now be described.

Platform Architecture

Figure 5:
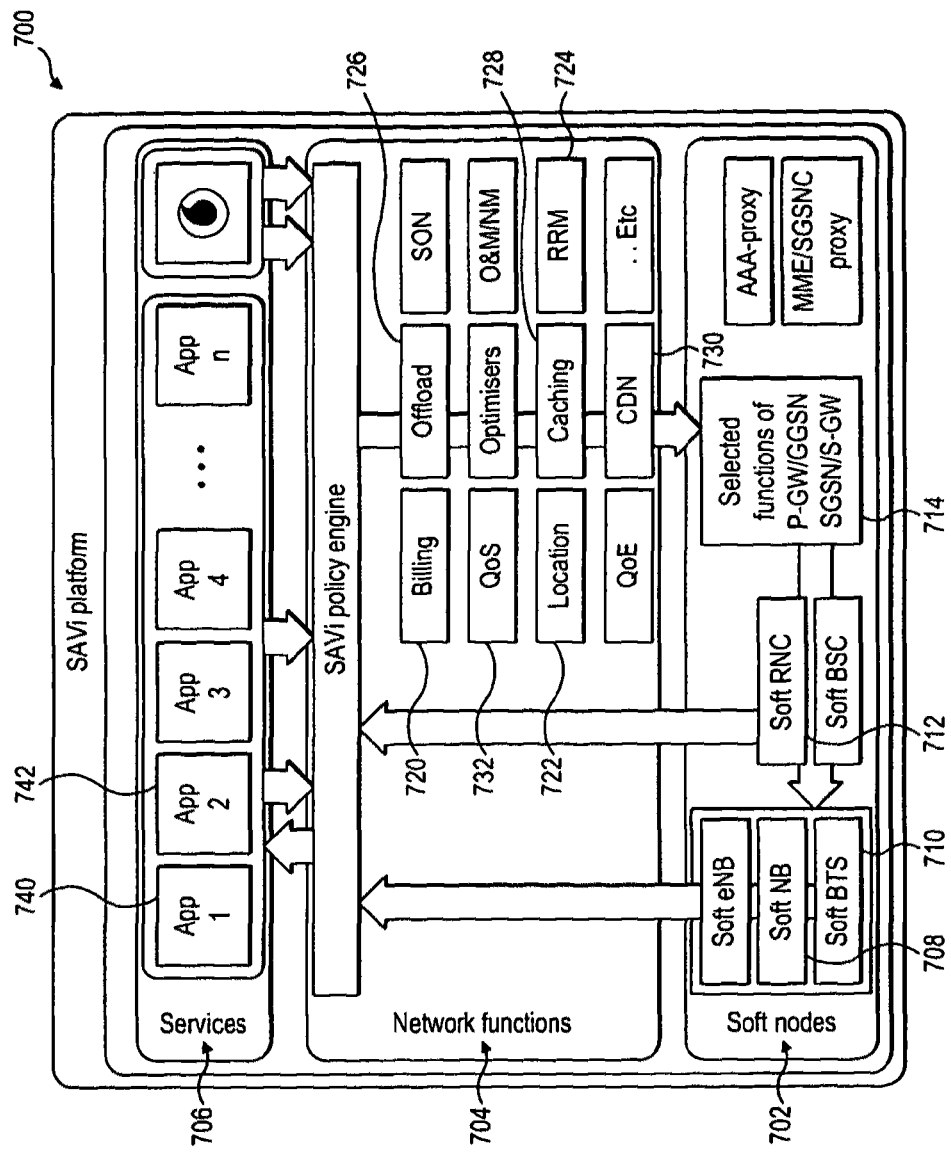
FIG. 5 shows the novel "platform" in more detail provided in the Radio Access Network according to an embodiment of the system described herein.

As discussed above, a mobile telecommunication network is modified by the introduction of a "platform" 24, 25, 26. Such a platform is shown in more detail at 700 FIG. 5 and which includes three principal parts: soft nodes 702 (physical/transport layer), network functions 704 and services 706 (application layer).

The platform 700 communicates with the radio frequency (RF) part of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

The network functions part 704 of the platform 700 includes modules for performing functions similar to those performed by the core network of a mobile telecommunications network, such as billing 720, location tracking 722 and the radio resource management (RRM) 724. The network functions may further comprise an offload decision module 726 that performs a function similar to the offload decision modules 24, 25 and 26 described above. The network functions part 704 may further comprise a caching function 728 and Content Delivery Network function 730.

The network functions parts 704 of the platform 700 provides an Application Programming Interface (API) framework to the services part 706 of the platform 700. The services part 706 of the platform supports a plurality of applications 740, 742 etc.

The network functions fall into three main categories, those that enable the network operation (e.g., charging, O&M), those that support service operation (e.g., Location) and those that optimise the usage of the network by certain applications and services (e.g., Caching, Video Optimisation).

The applications supported on the Platform 700 are the entities that supply or demand the flow of data on the network, akin to a server on the Internet, e.g., gaming server, navigation server.

The API is implemented by a software program running on the network function part 704 which presents a novel standardised interface for the applications 740, 742 etc of the services part 706. The novel standardised API provides a consistent interface, defining communication protocols, ports etc. Full details of the API may be published to allow a multiplicity of applications to be developed for the platform 700 by multiple developers. This should be contrasted with prior art arrangements where each component of a mobile telecommunications network (such as BTS, BSC/RNC, SGSN etc) is proprietary and tends to have a unique interface, meaning that a different application must be written for each node of a conventional network.

The applications 740, 742 etc may provide services to users of the telecommunications network by co-operating with other parts of the platform 700.

The details of the use of each application used by the a user of the mobile telecommunications network is stored in an application context/container. The Application context contains application names, protocol used to carry such application, their characteristics that are measured/reported over period of time and some statistical information about these applications (volume, number of users using these applications, etc.).

Figure 6:
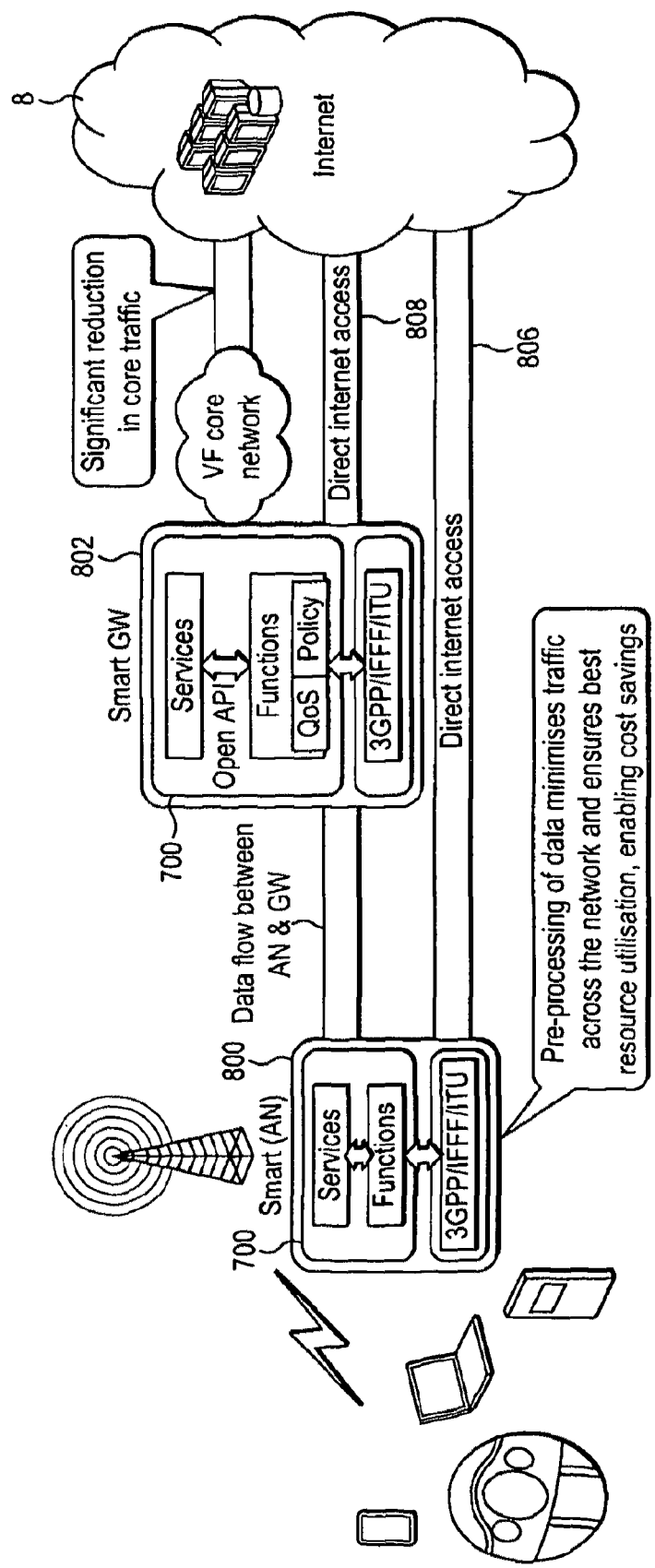
FIG. 6 shows possible locations of the platform within a mobile telecommunications network according to an embodiment of the system described herein.

As shown in FIG. 6, a platform 700 may be provided at each base station of the mobile network (where it is connected to the radio frequency part of the base station—NodeB 1 in FIG. 2), forming an access node 800. Platform 700 may also be provided at the RNC (item 3 in FIG. 2) where it forms a gateway 802. The access node 800 and the gateway 802 are both configured to communicate directly with the network core 804 (for example, comprising the SGSN 5, GGSN 6 and VAS 7 (as shown in FIG. 4)). The access node 800 and gateway 802 may also be connected to the Internet 8 for direct Internet access via direct links 806 and 808, respectively, such that at least a portion of the core network 804 is bypassed in the manner described above.

Figure 7:
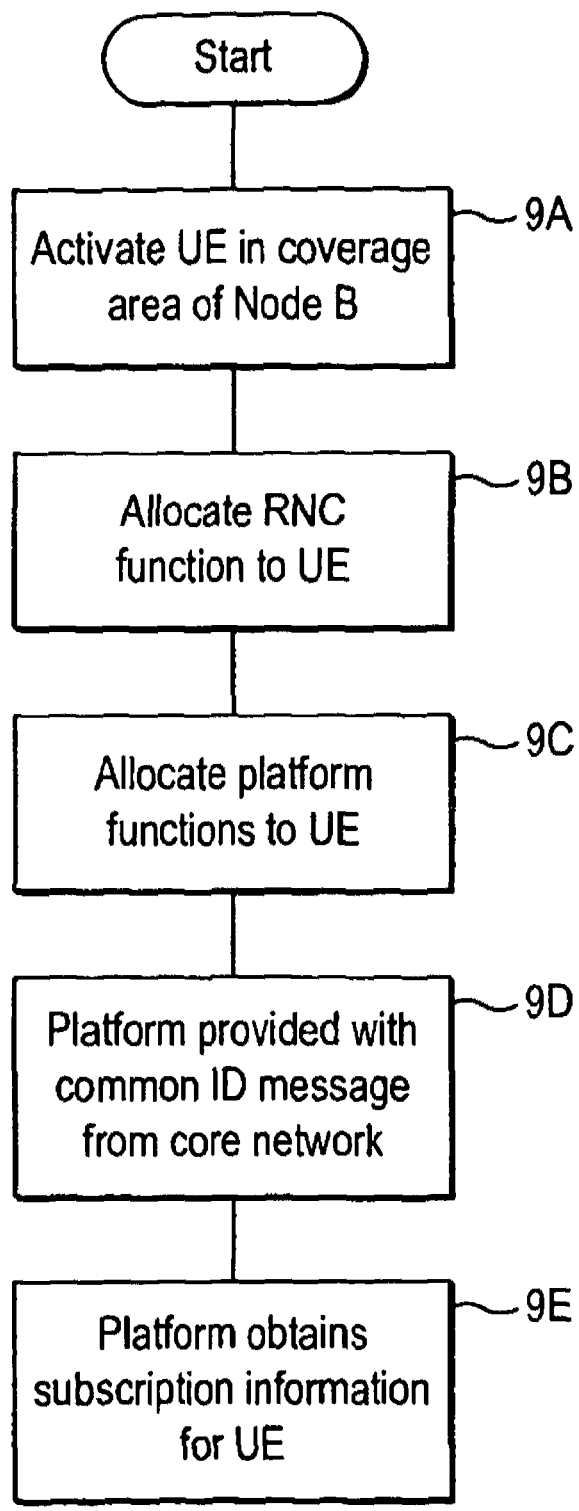
FIG. 7 is a flow chart showing the steps performed when a mobile terminal is activated according to an embodiment of the system described herein.

The following are examples of access technologies that can be provided within the access node 700:
3GPP: GSM/GPRS, UMTS/HSPA & LTE
IEEE: 802.11 family & 802.16 family
ITU: DSL, ADSL, VDSL, VDSL2
Allocation of Functions to Platforms The steps performed when a mobile terminal is activated at a NodeB, at the Femto or at the Access Point (AP) of the network which includes the novel platform 700 will now be described with reference to FIG. 7. At step 9A the mobile terminal (UE) is activated within the coverage area of a particular NodeB, at the Femto or at the AP. The access part of the NodeB, at the Femto or at the AP communicates information from the mobile terminal to the platform 700 associated with the NodeB, at the Femto or at the AP. At step 9B the platform 700 then allocates the baseband NodeB, at the Femto or at the AP function and the RNC or BRAS (Broadband Remote Access Server) function either at access node 800 at the NodeB at the Femto or at the AP site or at the gateway 802 at the RNC or BRAS site of the network or even from neighbouring nodes that have spare resources to pull. The decision as to whether the RNC or BRAS function is allocated at the platform 700 of access node 800 or the gateway node 802 may be made depending on various criteria, including:

The device type—for example this decision can be based on the radio access capabilities that the mobile terminal indicates upon activation, such as whether it is operating in the circuit switched or packet switched domains.

The location of the mobile terminal. If the mobile terminal is near the edge of the cell (which can be determined by network power measurements or neighbour cell measurements from the mobile terminal, within a plus or minus 3 dB range for the RACH).

The establishment cause of the connection request: such that the NodeB can filter the unnecessary signalling information from the mobile terminal which is not critical—for example periodic routing area update messages.

Upon allocating the baseband NodeB at the Femto or at the AP and the RNC or BRAS function, the NodeB at the Femto or at the AP may allocate the mobile terminal to a particular carrier dedicated to the RNC or BRAS function.

Once the RNC or BRAS function is allocated to either the access node 800 or the gateway 802 at step 9C, other functions performed by the platform 700 at the access node 800 (or other access node) and the gateway 802 (or other gateway) are allocated to the mobile device. All other platform functions may be provided by the platform where the RNC or BRAS function is allocated to the mobile terminal. However, a platform at a different location to that which provides the RNC or BRAS function to the mobile terminal may provide some or all other functions.

At step 9D the platform which is allocated the RNC or BRAS function is provided with a Common ID message from the core network 804.

At step 9E, this message is used by the platform 700 to look up the complete subscription information for the mobile terminal, as well as the resource requirements (QoS) of the services required and negotiated PDP context, this information being provided by the core network 804.

The subscription information relating to the device that is obtained from the central nodes (e.g, core network) 804 is used to allocate the other functions at access node 800 and/or the gateway 802 in dependence upon various factors, including:

Detailed information regarding the mobile terminal type obtained from the core network.

The subscription characteristics of the mobile terminal.

The applications previously used most frequently by the mobile terminal.

The characteristics of the applications previously used by the mobile device and the performance requirements thereof.

The historic mobility of the mobile terminal (speed, connection, distance travelled etc).

The location of the mobile terminal and the likely destination of traffic from the mobile terminal based on historic usage patterns.

The load of the NodeB providing RF services to the mobile terminal, and the historic traffic trends at that NodeB at Femto or at AP.

The characteristics of the NodeB at the Femto or at the AP providing RF services (for example, the location, what other devices are connected through the NodeB at the Femto or at the AP, the number of machine to machine devices being attached and served by the NodeB, etc).

As mentioned above, a single mobile terminal may have platform functions/applications allocated on a plurality of platforms. Generally, when a mobile terminal is near-stationary it is most efficient for its functions/applications to be served from an access node 800 (i.e. distributed), whereas mobile terminals with greater mobility (or lower anticipated cell hold times) may be most efficiently served by having fewer or no functions/applications served from the access Node 800, and more or all functions/applications served from a gateway 802 (i.e. centralised). The assignment of functions/applications to a mobile terminal between an access node 800 and a gateway 802 may also depend upon the characteristics of the service type provided by the application (for example, the average IP session duration, the popularity of the particular application, the average mobility of mobile terminal using the service provided by the application etc).

Traffic management may be performed at the access node 800, where there is access to real-time radio information from the radio frequency part of the NodeB, the Femto or the AP serving the mobile device.

Centralised Radio Resource Management (RRM) may be provided at the gateway 802, and maintains performance across different access modes 800, which may have different radio access technologies, frequency bands, coverage etc. The RRM function 724 of the platform 700 of the gateway 802 may obtain information regarding radio traffic management from each access node 800 to dynamically position subscribers to particular radio technology. This technique may be used to allocate network resources based on the resource availability, application used and user mobility, For example, the traffic management information may be provided by the soft NodeB 708, Femto or AP of the platform 700 at the access node 800. This soft NodeB 708 obtains radio information relating to the mobile terminal from the radio frequency part of the NodeB to which the mobile terminal is wirelessly connected.

For a particular mobile terminal, functions provided by an access node 800 and gateway 802 may be coordinated to work together in an advantageous manner (i.e. a hybrid or distributed arrangement). For example, the gateway 802 may set operating limits or ranges within which functions performed by the access node 800 may be performed, without reference to the gateway 802. When the functions move outside the ranges set, control of those functions may be passed to the gateway 802.

Further, the access node 800 and the gateway 802 may cooperate to advantageously optimise content delivery to a mobile terminal.

Figure 8:
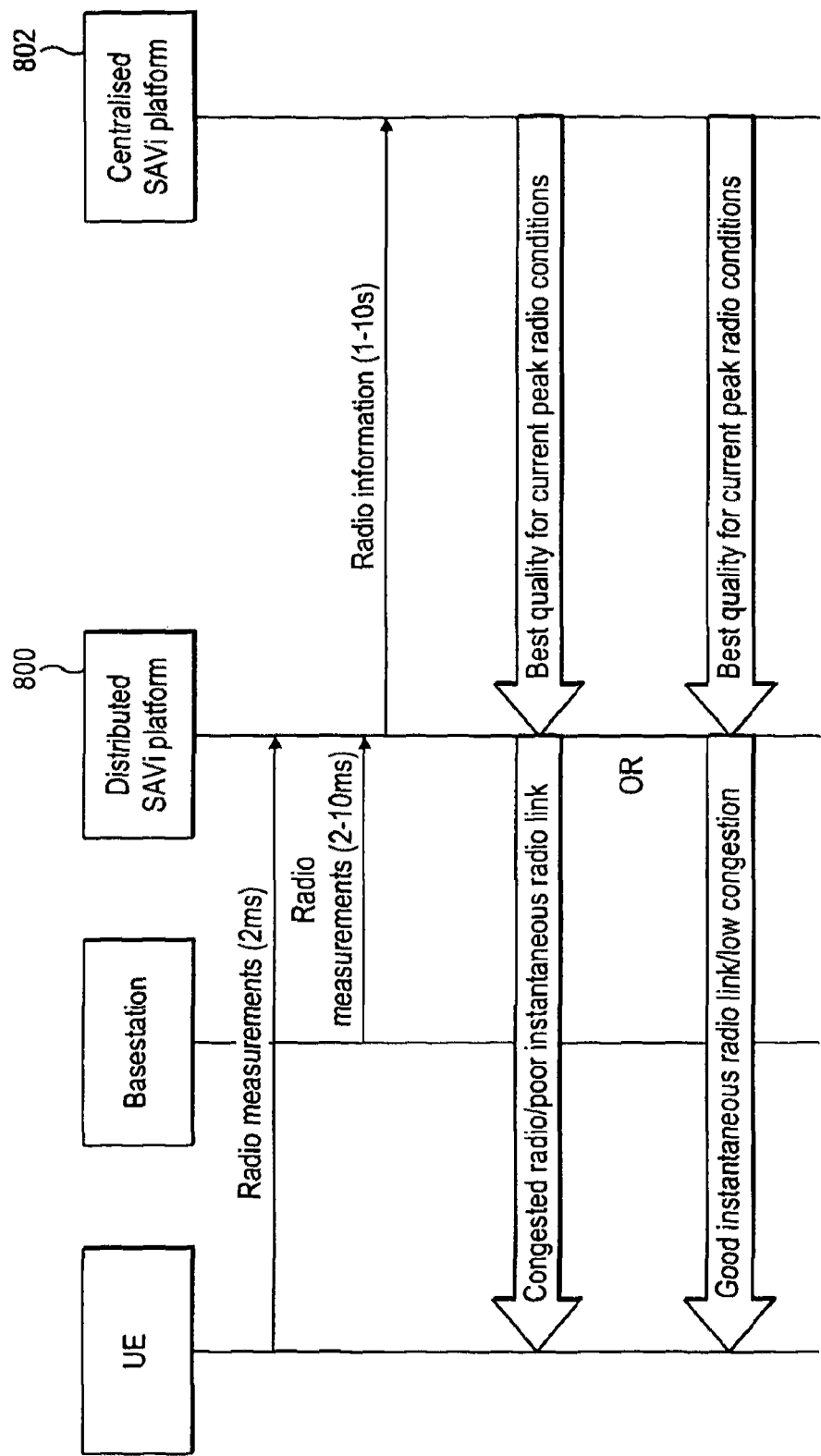
FIG. 8 shows the optimisation of content delivery to a mobile terminal according to an embodiment of the system described herein.

The optimisation of content delivery will now be described with reference to FIG. 8 of the drawings. Content may be optimised at gateway 802 and at an access node 800. The gateway 802 may serve multiple access nodes 800, and my distribute content to those multiple access nodes 800, for onward transmissions from each of those access nodes 800 to a mobile terminal via the radio frequency part of NodeB, the Femto or the AP serving that node. Radio quality measurements are reported by the mobile terminal to the access node 800 at regular intervals, such as 2 millisecond intervals. Radio quality measurement relating to that mobile terminal are transmitted between the radio frequency part of the NodeB, the Femto or the AP serving the mobile terminal to the access node 800 at regular intervals, such as between 2 and 10 millisecond intervals. These radio measurements are received at the soft nodes 702 and are passed to functions 704 (e.g., to QoS function 732 for analysis). These radio frequency measurements from the mobile terminal and the NodeB are reported by the access node 800 to the gateway 802 (e.g., to QoS function 732 of the gateway 802 for analysis) at regular intervals, such as intervals of between 1 and 10 seconds. The gateway 802 may receive radio information from multiple access nodes 800. The radio measurements received by the gateway 802 may be analysed over a relatively long period, such as between 1 and 2 minutes. The radio quality measurements may be averaged (for example, the arithmetical mean of the radio quality may be determined) over this time period. The transmission of content from the gateway 802 may then be optimised according to this calculation. Where the content is distributed by the gateway 802 to a plurality of access nodes 800, the content distribution may be based on the analysis of the radio quality indicators from all of the access nodes 800. The analysis may consider the maximum or peak radio performance over the time period of between 1 and 2 minutes.

When the content is received by each access node 800, the access node 800 then distributes the content to each mobile terminal. This distribution is optimised based on real-time network mode and mobile terminal specific radio link quality, as determined over a period of, for example, between 1 and 10 milliseconds. That is, content delivered to a mobile terminal that has high radio link quality may be optimised in a different manner to a mobile terminal that had poor radio link quality.

Figure 9:
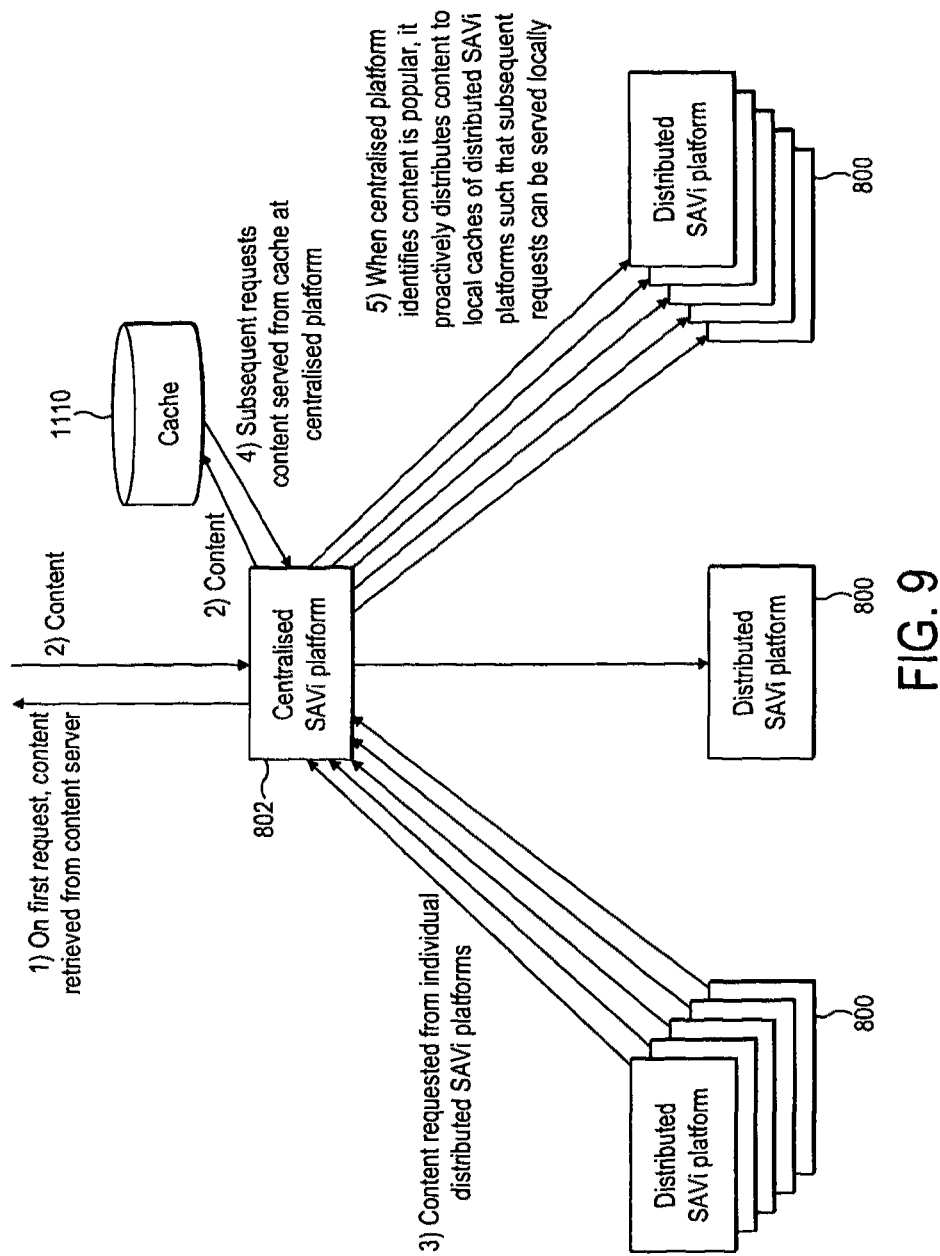
FIG. 9 shows a further optimisation of content delivery to a mobile terminal according to an embodiment of the system described herein.

The co-operation between access nodes 800 and gateways 802 may further enhance the distribution of content in a manner now to be described with reference to FIG. 9.

When a mobile terminal requests a particular content item, this request is transmitted to the access node 800 serving that mobile terminal, assuming that this is the first request for this content item to the access node 800, the access node 800 passes this request to the gateway 802 serving the access node 800. Assuming that this is the first request for this content item from the gateway 802, the gateway 802 retrieves the content from a content server. The content is then provided by the content server to the gateway 802, and from there is distributed to the access node 800, and onwardly to the requesting mobile terminal. Advantageously, the gateway 802 maintains a record of content items that are requested frequently. When a content item is determined by the gateway 802 to be requested frequently, this is stored in a cache 1110 associated with the gateway 802 (which may be the cache 728 of the platform 700). Subsequent requests for that content item from access nodes 800 to the gateway 802 can then be serviced by retrieving the content item from the cache 1110 and distributing the content item to the requesting access node 800, and thus avoiding the need to request the content from the content server.

The gateway 802 may be further configured to identify popular content items that are likely to be requested by a large number of access nodes 800. When it is determined that a content item is popular, the gateway 802 may push these content items to each of the access nodes 800 associated therewith (so that this content is hosted at the access node 800, using Content Delivery Network (CDN) function 730 of the network functions 704 of the gateway 802 and the access node 800). The content is then available at the access node 800 for transmission to any mobile terminal that requests it, without having to retrieve this content from the gateway 802 or the content server. Advantageously, the distribution of such content items is performed in a manner which takes into account the capacity or the congestion of the link between the mobile terminal and the gateway 802 and the nature of the content. For example, typically a link between a mobile terminal and the gateway 802 may experience very little usage and congestion in the early hours of the morning. The content item can be advantageously transmitted in between the gateway 802 and the access node 800 at this time, when there is spare capacity. The gateway 802 may determine whether the content item is suitable for transmission on this basis, for example, by taking into account a number of times that the content item has been requested, the size of the content item and the storage space at the access node 800. If a content item is relatively small and is time-critical, such as news headlines, then such a content item may be distributed frequently throughout the day, as such content is not suitable for transmission once a day at early hours of the morning, as it becomes quickly out of date.

Relocation of Mobile Terminal

Figure 10:
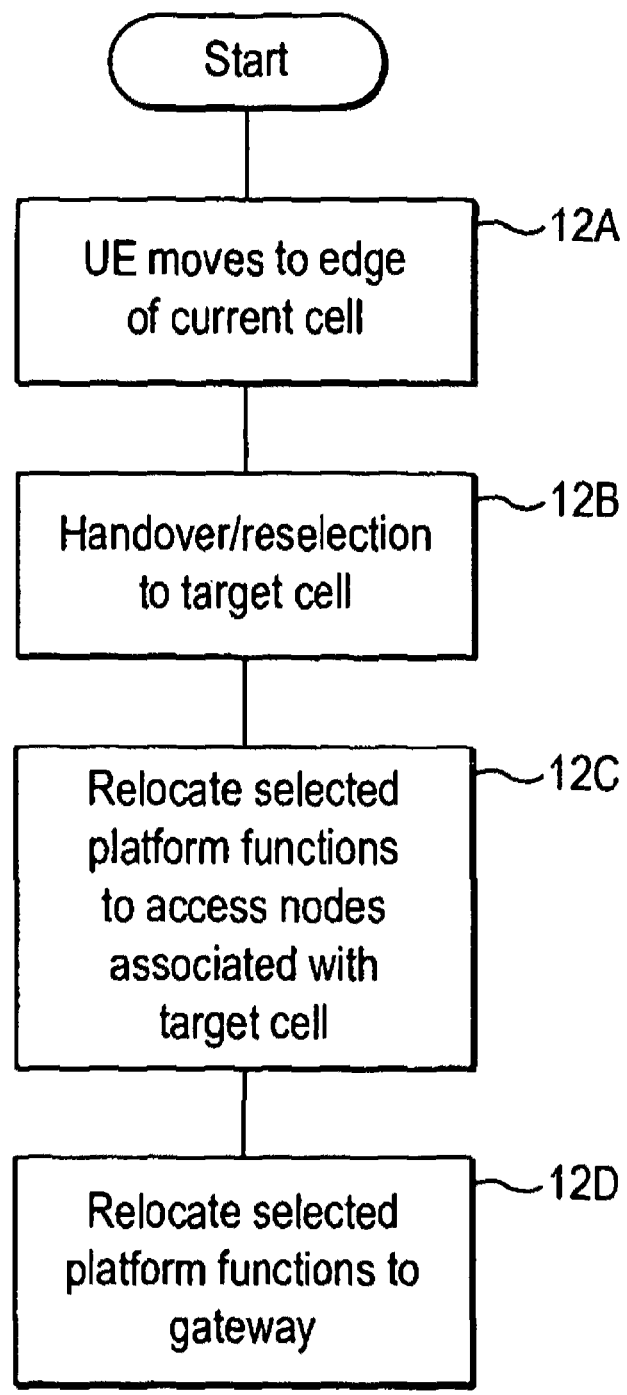
FIG. 10 is a flow chart showing the procedures performed when a mobile terminal moves within the network according to an embodiment of the system described herein.

The procedures performed when a mobile terminal moves between cells in the mobile telecommunications network will now be described with reference to FIG. 10. In the conventional manner at step 12A, when the mobile terminal moves to the edge of its current serving cell, the radio measurements reported from the mobile terminal and the radio frequency part of the NodeB, the Femto or the AP serving that mobile terminal are used by the core network to determine when to perform a handover and to which target cell the handover should be performed. When the best target cell has been identified, handover to that target cell from the serving cell it is performed at 12B in a conventional manner.

At step 12C selected platform functions may be relocated from the source access node (that served the old cell) to the destination access node (that serves the new target cell).

When the source and destination access nodes are served by the same gateway, only base station function (such as soft NodeB functions 708) may be relocated to the destination access node.

The relocation of functions of the access nodes is performed independently to the radio handover, so for some time after the radio handover, the source access node continues to serve content to the mobile terminal through the destination access node. The routing of data packets for the 3G network between the destination and the source access nodes may be performed using an Iu interface between the RNC or BRAS function 712 of the destination access node and the SGSN/GGSN function 714 of the source access node. Alternatively, the routing of data packets between the destination and the source access nodes can be completed by the SGSN/GGSN function 714 of the destination access node connecting directly to functions of the source access node through an IP interface.

After handover has been completed at step 12B, the access node controlling the mobile terminal may be relocated from the source access node to the destination access node in coordination with the gateway. the standardised handover decisions (mainly based on coverage, quality, power, interference, etc.) for 2G, 3G, LTE & fixed network are used to move the mobile from one node or system to another. However, the platform 700 introduces new opportunity to make the handover decision based on type or characteristics of the certain application, type of user and the QoS requirements.

The timing of the relocation of access node functions from the source to destination platform may be dependent on the following:

the duration of the current connection/communication of the mobile terminal the speed of movement of the mobile terminal the characteristics of the applications being used by the mobile device, the quality of service, the predicated type and amounts of transmission ongoing.

The radio resource allocations status at the mobile terminal

The respective node of the source and destination and access nodes.

At step 12D, optionally, some functions may be reallocated from the access nodes to the gateway. For example, if the destination access node is heavily loaded and is congested, or has a lower capability then the source access node, or the mobile terminal is determined to be very mobile, it may be advantageous to transfer functions to the gateway. Functions are reallocated from the access node to the gateway by, for example, a Serving Radio Network Subsystem (SRNS) relocation between the RNC function 712 of the access node and the gateway. Alternatively the functions may be reallocated by performing a radio reconfiguration of user connection to the mobile terminal.

The reallocation of functions from an access node to the gateway may be performed at call/communication sessions set-up. At call/communication session set-up, further subscriber information may be provided, which may be used by the access node or gateway to be determine whether it would be advantageous to reallocate functions from the access node to the gateway. Reallocation of functions from the access node 800 to the gateway 802 may be performed during an active connection when a requirement of the communication sessions has been modified, or where the required resource is not available at the access node 800.

According to the same principles, applications may be (re)located (or distributed) between access nodes 800 and for gateways 802 to provide optimised application delivery/ best use of the communication resources.

As mentioned above, information about each application used by the user at the mobile terminal is stored in an application context. The application context is shared between each access node 800 and gateway 802 that control the user connection for that mobile terminal. One of the access nodes 800/gateways 802 may be the "master" for that particular application, and that may also be the master of an application specific record in the application context. The application context is advantageously periodically synchronised between the access node 800 and the gateway 802.

The application information is the application context specific to a particular mobile terminal, and this is passed between access nodes and gateways during reallocation for a mobile terminal, enabling the application to be seamlessly passed access nodes/gateways, avoiding impacts to the user experience.

Figure 11:
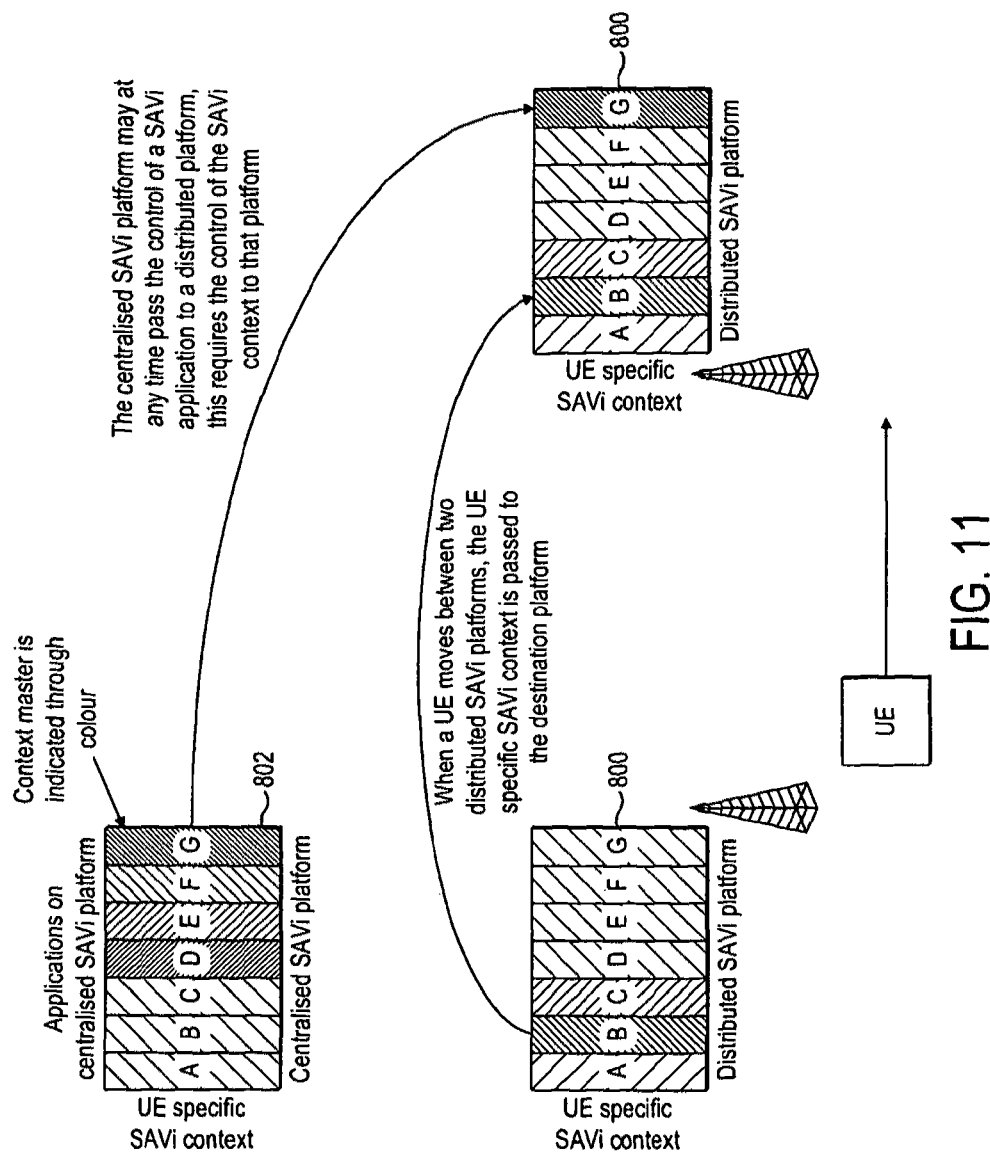
FIG. 11 shows the transfer of information between platforms according to an embodiment of the system described herein.

FIG. 11 shows the transfer of application information between access nodes and gateways.

Tailoring Bandwidth to Application

Radio measurements received from the radio frequency part of the NodeB, the Femto or the AP serving the mobile terminal are passed to the soft nodes 702 of the platform 700 (of the access node 800 or gateway 802 serving the mobile terminal), and are passed to the network functions 704 of the platform 700, which then distributes the measurements to where necessary within the platform 700. The platform 700 has access to the subscriber information from the core network, which allows the network functions 704 to deliver data traffic in a manner that is optimised for radio conditions as indicated by the radio measurements. The data traffic may also be optimised according to the subscription of the user of the mobile terminal available radio resource, mobile terminal capability, and/or for the class of the terminal (e.g., access technologies used). This optimisation allows bandwidth usage to be balanced with customer experience. The subscriber information may include information about the price plan of the user of the mobile terminal. The mobile network operator may track the type of application used by the user, the total data usage of the user, and may differentially target radio resources the highest data value stream of users.

By hosting applications 740, 742 in the services part 706 of the platform the access node 800 (or at least the gateway 802), the point of the network that is aware of the application being used by the user of the mobile terminal closer in the link between the mobile terminal and the core network to the NodeB serving the mobile terminal. This enables the sharing of network resources to the most appropriate data streams, such as the most profitable data streams. Such awareness of the application to which a request for data transmission relates allows the use of low value data streams, such as peer-to-peer file sharing, to be allocated only limited bandwidth, so that remaining bandwidth can be targeted to particular users. In the uplink, transmission of data can be controlled by the access node 800 (or gateway 802) hosting the application to control data flow appropriately before data is onwardly transmitted towards the core of the network (which was not possible with conventional arrangements).

Application Programming Interface (API)

As mentioned above, a novel API is provided which defines the language that each of the software modules 740, 742 of the platform 700 use to communicate to coordinate to optimise application delivery to users. The platform 700 negotiates which each application 740, 742 the specific resource and performance requirements based on the application characteristics, allowing the application to directly communicate the scheduling performance requirements, rather than using a predefined set of quality of service parameters. This negotiation between the platform 700 and the applications 740, 742 is facilitated by the API.

The API may also facilitate the provision of radio link quality information (e.g., from QoS function 732) to applications 740, 742.

The API may further enable the platform 700 to control use of the applications 740, 742—e.g., to allow, disallow or adapt the applications.

By way of example, the application 740 may be a Voice over IP (VoIP) application. The nature of Voice over IP communications is that there is a virtually continuous succession of small data packets in which voice data is communicated. The voice data must be communicated with no or minimal latency in order that a two-way conversation can be performed successfully. The Voice over IP application 740 is able to compress voice data before transmission using a variety of techniques/CODECs. The compression techniques/CODECs may range from a relatively low compression technique, which provides high quality voice reproduction but requires a large bandwidth, to a much higher compression technique which provides reduced voice quality and which requires a much lower bandwidth.

The API is operable to provide details of the application characteristics to the network functions part 704 of the platform 700. This makes the network functions part 704 of the platform aware of the characteristics of the application. In the present example, as the application is a Voice over IP application, the network functions part 704 may be made aware that the application may tend to transmit continuous successions of small data packets that require transmission with no or low latency. The network function 704 may then be configured appropriately.

The API may further be operable to allow the network functions part 704 to communicate radio link quality information to the application 740. For example, when the network functions part 704 received information regarding the application characteristics (via the API), it may allocate radio link resources to that application 740. This allocation of radio link resources may be communicated by the network functions part 704 to the application 740 (via the API). The application 740 may then select an appropriate compression technique/CODEC in dependence upon the radio link quality available. During a Voice over IP call, the available radio link quality may be communicated regularly from the network functions part 704 to the application 740 (via the API) to allow the application 740 to vary the compression technique/CODEC used in accordance with changes to the radio link quality.

The network functions part 704 may control how the applications 740, 742 work (via the API). The network functions part 704 may allow, disallow or adapt the applications 740, 742 hosted in the services part 706 of the platform 700. For example, the network functions part 704 may require the Voice over IP application 740 to use a particular compression technique/CODEC if radio link bandwidth is restricted.

Another example of how the network functions part 704 may advantageously provide radio link quality information to an application (via the API) is when the application 742 is a gaming application used by several users. If the radio link quality information received by the application 742 indicates that bandwidth is restricted, the application 742 may adapt is communications to the users such that latency of the communications is increased uniformly for all of the users (so that they all experience the same delay), in order that each of the users is provided with the same gaming experience.

In the embodiments described, the devices that connect to the platforms 700 are mobile devices that connect to the platforms via the radio access network of a mobile/cellular telecommunications network. It should be appreciated that non-mobile (fixed) devices may be connected to the platforms 700, for example by a wired or cable connection.

Allocation of Services

The controller is responsible for allocating the service instance for each UE, based on the UE locations and the controller capacity, capability and available resources to host another instance of a service.

For certain low popularity services or where the available serving controller capacity or capability is limited, the service can be hosted from a central controller, or from a neighbouring distributed controller.

For some services/functions, where the source and destination client applications are in the same geographical region, being served by the same site (e.g., BTS location) or site cluster (e.g., finite number of sites), the access node 800/gateway 802 ensures that the server for the service is located close to both users, and the traffic is routed between the users within the site.

Virus Aware Edge (P100936-GB-PSP)

As mobile terminals become more and more complex and the application environments of the terminals become increasingly open to third party application developers, the barrier to development and spread of high impact viruses/worms/DDoS (Distributed Denial of Service) applications on devices may diminish.

Such an attack could be used to disrupt a mobile network, by triggering infected devices to perform repetitive tasks at key sites and locations, to cause the great disruption to the network, and with enough devices it may cause the network (or that portion of the network) to collapse.

As discussed above, the platform 700 allows application environments to move closer to the radio site. This enables more complex functions to be moved to the Radio Access Network and for them to be hosted on the platform 700. That is, the services part 706 of the platform 700 may host applications (e.g., 740 and 742). The applications may be hosted by a platform 700 at access node 800 at the NodeB, or at the Femto or at the AP site, or at the gateway 802 at the RNC or BRAS site of the network Also, as devices such as telephones and laptops become increasingly more advanced, additional functionality can be implemented in the application and operating system environment of these devices, allowing the devices to play a greater role in the end-to-end data pipe.

In the embodiment now to be described, the platform 700, in the services part 706, hosts the virus detection entity 1440. The virus detection entity 1440 has an associated electronic store (memory) 1212.

The platform 700 may:
Make measurements of the radio load;
Identify the frequency and technology layer each terminal is currently using;
Make measurements of 2G/3G/4G user coverage/distance from the site per technology, and the overlapped coverage areas;
Makes measurements of Quality of the radio link to the subscriber;
Identifies the terminal type used;
Assess the properties of that technology/frequency in a specific cell/location.

These and other measurements/information may be received at the soft nodes 702 (e.g., eNodeB 711) and passed to functions part 704 (e.g., QoS function 732). The platform 700 is also operable to receive other measurements/information, discussed below.

The functions part 704 (e.g., QoS function 732) may then pass required parts of these measurements/information to the virus detection entity 1440 hosted on the platform 700.

In accordance with an embodiment of the invention, as mentioned above, the platform 700 is modified to introduce functionality (Virus Detection Entity 1440) into the access node 800 (or gateway 802) where it can monitor the traffic on the radio site and target actions depending on detection of an attack.

Attack on the Control Network (Network Control)

Attack aimed at bringing down an Operator's control network, for instance by:
Devices frequently attaching to and detaching from the network;
Devices frequently transitioning from idle to active;
Devices frequently attempting to send USSD, SMS or establish "paging" calls;
Uncommonly high numbers of devices attaching/transitioning to active state on the network in a short period of time;
Sending too many requests to the DNS of the operator.

Attack on the Data Network (User Plane)

Attack aimed at bringing down an Operator's data network through sheer traffic volume; this for instance may be determined by:
An uncommon proportion of traffic of a particular type being transmitted/requested;

Too much traffic being sent to a specific address, or an unusual port number.

Attack on the Service Network (Customer Resilience)

Attack aimed at bringing down an Operator's service network, for instance by:

A synchronised attempt by large number of devices to send USSD, SMS, MMS, establishing a voice call, establish connections mail servers, etc.

The Virus Detection Entity 1440 is configured to detect these attacks, and may then take appropriate action.

Action by the Virus Detection Entity

The Virus Detection Entity 1440 can:

Redirect/hotline the requests at the platform 700 to a managed web space at the platform 700, protecting the service architecture of the operator;

Shift all offending devices to a single data carrier minimising their impact to the rest of the customers;

Limit the radio resources the device is being scheduled to the bear minimum to allow connectivity;

Allocate the device to specific core network resources, network nodes;

Reject them from the system barring future access until the device has been power cycled;

Modify the device's cell reselection parameters to ensure the next access attempt occurs on a specific frequency layer and technology;

Introduce a specific firewall for the device blocking specific destination port numbers and addresses to avoid impact to central servers;

The network can slow the transmission of the signalling/control messages by the device through delaying the acknowledgements (on purpose);

On identifying an attack, inform the other Virus Detection Entities in other platforms 700 in the vicinity such that they can increase their alert level; making them more vigilant and reactive to any attack;

Log the pattern and method of the attack such it can be analysed at a later date to reduce the time required to detect and defeat such an attack in the future;

Refer them to a customer service representative such that their device can be disinfected.

Figure 12:
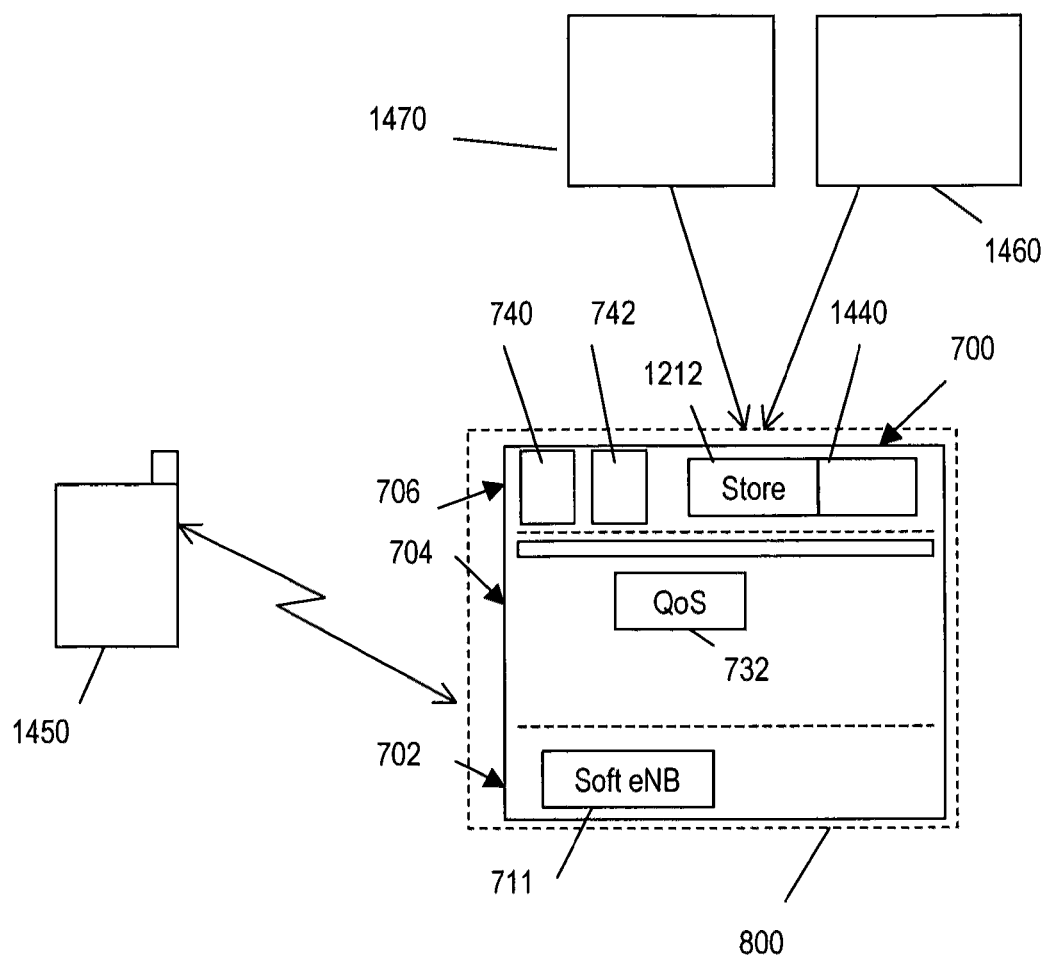
FIG. 12 shows the novel "platform" for detecting malfunctioning devices according to an embodiment of the system described herein.

FIG. 12 shows the virus detection entity 1440 present in the services part 706 of the platform 700 of access node 800 (although the virus detection entity 1440 could also be provided in a gateway node 802). The access node 800 communicates wirelessly with the mobile terminal 1450 using the radio part of the base station with which the platform 700 is associated. The access node 800 is connected to network core 1460 via a backhaul connection and may also be connected to a third party application 1470 either via the core 1460 or independently of the core 1460.

The store 1212 associated with the virus detection entity 1440 includes definitions (or reference characteristics) that allow the virus detection entity 1440 to detect the likely presence of a misbehaving mobile terminal or groups of terminals. An example of the definitions is shown in FIG. 13. In this example, the store 1212 stores a set of definitions which correspond to devices operating correctly, and devices operating in an erroneous manner or abnormal manner. This set includes a plurality of fields (C1 C2, ..., Cn) for the definitions of a correctly operating device and a plurality of fields (E1 E2, ... En) for an incorrectly operating terminal. Each field relates to a particular characteristic of the mobile terminals. For example, field C1 may indicate the range of frequencies with which (i.e. how often) a correctly operating device may attach to the network, and field E1 may indicate the range of frequencies with which (i.e. how often) an incorrectly operating device may attach to the network. These ranges may not be contiguous. For example, there may be a range of attach frequencies outside the normal correct range (C1), but that is not so far removed from the correct range that it can be concluded with certainty that the terminal is operating incorrectly. In such an instance, the measured frequency of attaches may be outside the correct range defined in field C1 and the erroneous range defined in field E1. Other fields, such as C2 and E2 may be a range of frequencies with which (i.e. how often) terminals transition from the idle to active state, or any other characteristic related to network control. Similarly, the fields may contain characteristics relating to the operation of the data network or user plane, such as the proportion of traffic of a particular type being transmitted/requested by a terminal. Further, the fields may include ranges of frequencies with which a correctly operating terminal may send USSD messages, SMS messages etc, and a range of frequencies for such messages that an incorrectly operating terminal would use in order to detect an attack on the service network.

In an alternative arrangement, the store 1212 may only include definition fields relating to either correctly operating mobile terminals or incorrectly operating mobile terminals, and not both.

The definitions may apply to all the mobile terminals registered with the network, in which case only one set of definitions may be required (the set in the primary embodiment including the "correct" and "erroneous" definitions). Alternatively, a plurality of sets definitions may be provided, which are for use with different terminals or groups of terminals. For example, each individual terminal may have its own set of definitions. A particular terminal model may have its own set of definitions. Each mobile terminal type may have its own set of definitions (for example, mobile terminals with an Android operating system may use one set of definitions and mobile terminals with a Windows operating system may have a different set of definitions). A set of definitions may be applied to a collection of mobile terminals in other ways—such as, smart phones that have a contract with unlimited data usage may have a particular set of definitions, whereas smart phones which have a contract where data is paid for per megabyte may have a different set of definitions. Further, mobile terminals running a particular application may have a set of definitions applicable thereto—for example, mobile terminals running a video streaming application may have a particular set of definitions, and mobile terminals running an email application may have a further set of definitions. More than one set of definitions may be applicable to a particular terminal—for example, the terminal running both the video application and an email application.

The virus detection entity 1440 is operable to receive and interpret data from the platform 700 to allow it to determine which set or sets of definitions are applicable to a particular terminal or group of terminals in respect of which measurements or information are received. For example, the virus detection entity 1440 may be provided with the IMEI of a terminal. If necessary, the virus detection entity 1440 may contact the core 1460 to obtain information about the terminal represented by the IMEI in order to select the appropriate set or sets of definitions to apply to that terminal.

The sets of definitions may generally indicate the type of usage pattern over a predetermined period of time (such as one hour or twenty four hours) that a correctly operating terminal or group of terminals are expected to follow and an incorrectly operating terminal is expected to follow. The definitions may be created by the virus detection entity 1440 based on measurements/information gathered over a period of time (historical measurements), preferably when the network has been verified by the core 1460 that the network operating correctly (for the "correct" definitions). For the incorrect/"erroneous" definitions, these may be created by the virus detection entity 1440 during intervals when it is determined that the network is not operating correctly. Alternatively, the "erroneous" definitions may be calculated by the virus detection entity 1440, for example derived from the "correct" definitions. The sets of definitions may alternatively be provided by a virus detection entity 1440 in another platform at another access node 800 or gateway node 802. The definitions may also be provided by the core 1460 or by the third party application 1470. The sets of definitions may be provided by a combination of these sources.

When the virus detection entity 1440 compiles the definition sets itself based on measurements/information received, these sets of definitions may be updated continuously or periodically using recent measurements/information, so that the sets of definitions correspond to recent usage patents, and adapt to changes of use over time.

If the virus detection entity 1440 calculates a set of definitions, it may push these other platforms 700 for use by the virus detection entities of those other platforms.

The virus detection entity 1440 may automatically detect the need for new sets of definitions. For example, if it receives measurement information relating to a device type for which it does not have appropriate definitions, it may automatically recognise that a new set of definitions appropriate for that device type is required. In response to this, the virus detection entity 1440 may request an appropriate set of definitions from an appropriate source (such as another virus detection entity, the core 1460 or the third party application 1470).

Figure 14:
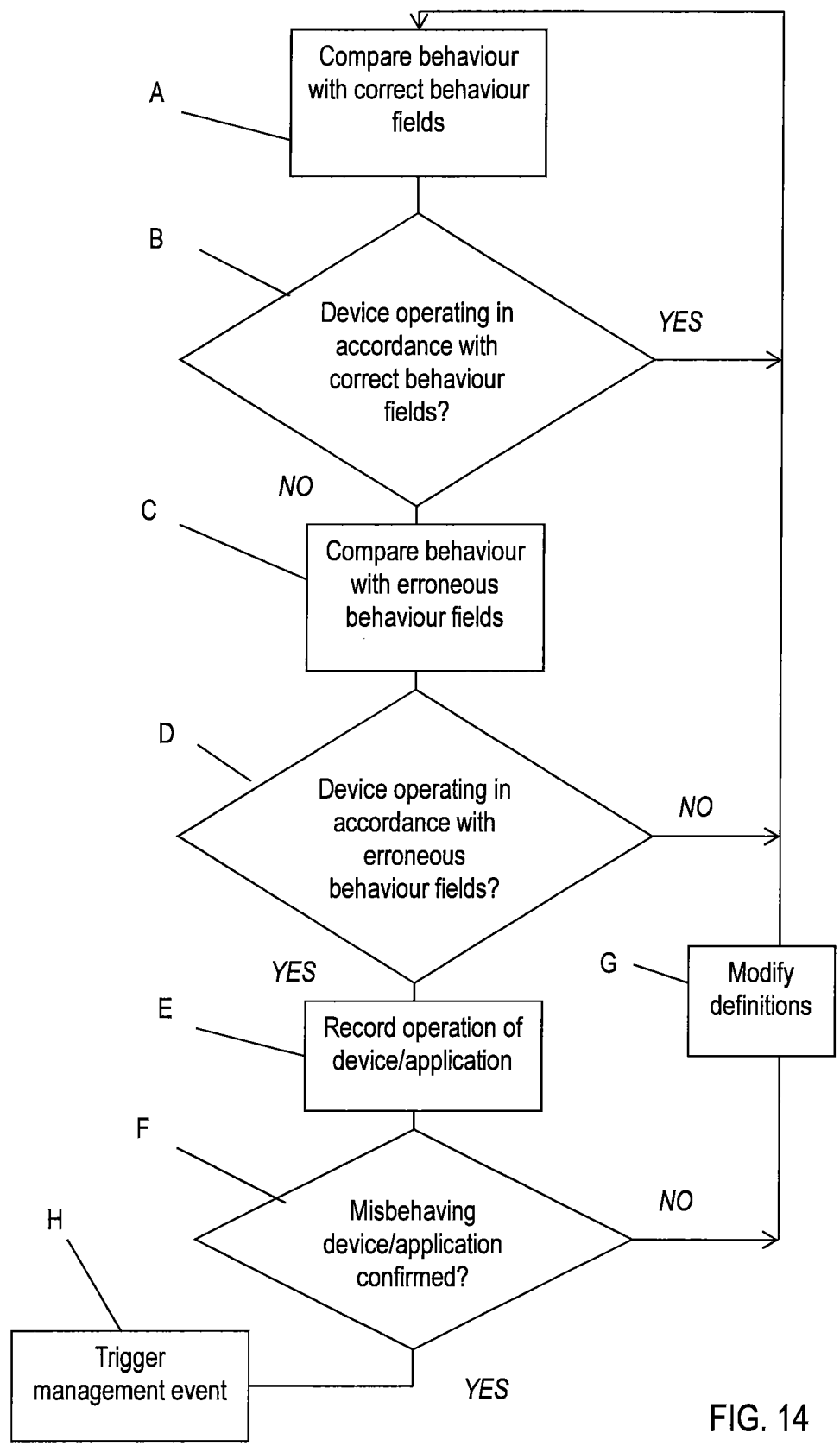
FIG. 14 is a flowchart showing the steps performed by the virus detection entity according to an embodiment of the system described herein.

The operation of the virus detection entity 1440 will now be described with reference to the flowchart of FIG. 14.

At step A the virus detection entity 1440 receives data relating to a particular terminal, group of terminals or terminal/application combination. The virus detection entity 1440 determines the appropriate set of definitions for the device or devices. At step A if the virus detection entity 1440 determines that it does not have an appropriate set of definitions for the device or devices, the virus detection entity 1440 may contact another virus detection entity, the network core 1460 or the third party application 1470 to attempt to obtain a suitable set of definitions. The virus detection entity 1440 then compares the information/measurements received for the device or devices with the "correct" behaviour fields.

Information/measurements relating to a particular device or devices may be accumulated over a period of time (such as one hour or twenty four hours) by the virus detection entity 1440, and the measurements/information over this period may be compared to the appropriate sets of definitions. As new measurements/information are received by the virus detection entity 1440 for the device or devices, these may be included in the comparison, and the oldest information/measurement for the device or devices may be removed from the comparison. In this way, the most up to date information/measurements for the relevant time period (e.g., one hour or twenty four hours) is compared to the relevant sets of definitions.

If at step B it is determined that the device or devices are operating in accordance with the "correct" behaviour fields, then the virus detection entity 1440 concludes that the device is operating correctly and the procedure returns to step A.

On the other hand, if at step B it is determined that the device or devices are not operating in accordance with the "correct" behaviour fields, then at step C the information/measurements are compared with the "erroneous" behaviour fields.

If at step D it is determined that the device or devices are not operating in accordance with the "erroneous" behaviour definitions, then the procedure returns to step A because the behaviour of the device or devices is not sufficiently outside the normal range to be sure the device or devices are malfunctioning.

On the other hand, if at step D it is determined that the device or devices are operating in accordance with the "erroneous" behaviour fields, then appropriate action is taken by the virus detection entity 1440. This action may be to, at step E, record details of the operation of the device (and relevant application or applications if applicable) in detail. This detailed information may be analysed by the virus detection entity 1440 to confirm device malfunction (or group of devices acting abnormally), or may be sent to the core 1460 to perform such a determination. Such a determination may involve manual review of the recorded information by a person.

If at step F it is not confirmed that the device/application is malfunctioning, then, optionally, at step G the definitions may be modified so that, if the same measurements/information is gathered again for the device, it is not determined that the device is not operating correctly (step B) and that the device is operating erroneously (step D). In this way, the virus detection entity 1440 may include artificial intelligence to allow it to adapt the definitions according to new information learnt. After the optional step G of modifying the definitions, the procedure returns to step A.

On the other hand, if at step F it is confirmed that the device/application is malfunctioning, then at step H the virus detection entity 1440 triggers an appropriate management event to reduce the impact of the malfunctioning device/application. Appropriate actions that may be taken by the virus detection entity 1440 are described above under the heading "Action by the Virus Detection Entity".

Steps E, F and G are optional. If at step D it is determined that the device or devices are operating in accordance with the "erroneous" behaviour fields, then step H may be performed without any intermediate steps, and the virus detection entity 1440 may immediately trigger an appropriate management event to reduce the impact of the malfunctioning device/application Whilst the preferred embodiment is particularly useful in detecting terminals which have a virus, the invention is also applicable to detect terminals malfunctioning or misbehaving for other reasons.

Security Protection (P100940-GB-PSP)

As broadband connectivity becomes ubiquitous existing standalone services may move to "the cloud". One example of this is processing and management of Home Security systems.

When a secure link is required the fixed infrastructure has the deficiency that the line can be severed; it would therefore in some situations be beneficial to use the mobile network as connection resiliency.

The mobile network relies on reception of radio communications between the two parties. This communication link could be severed by use of a jammer.

Jammers are illegal for use by the public, however, but are used by Government agencies to maintain national security. Use of jammers, in these cases, is typically in static locations or follow normal patterns.

Figure 15:
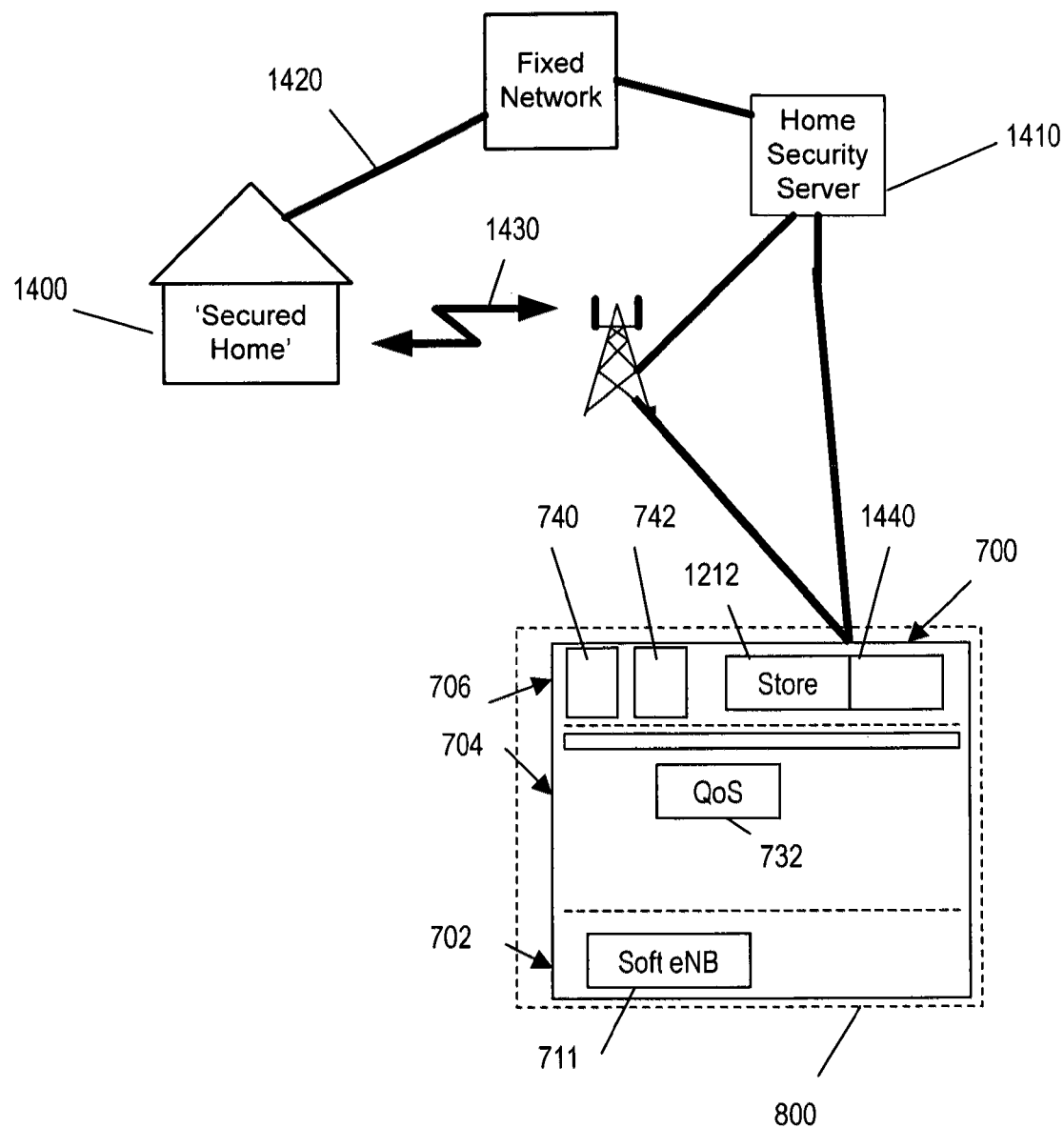
FIG. 15 shows a security arrangement for a premises according to an embodiment of the system described herein.

The system of FIG. 15 may be used for the support of a Home security service, the principles of which will now be briefly described.

The 'Secured Home' 1400 is managed by a Home Security Server 1410 in the Network through both Fixed 1420 and Mobile (wireless) 1430 connections.

Identification that the Network has been Jammed

The probability that connectivity of both the radio and the fixed networks is lost at the same time for a home security system can be made small, as both systems are typically, and in future can be, designed to be independent.

The loss of connectivity of both the fixed and mobile network can be used to determine that there is a high probability that Home security is being compromised. Detection of loss of connectivity in a fixed network is relatively straightforward (e.g., by loss of "heart-beat" transmissions over the medium), and are not described further. Detection of suspicious loss of connectivity in a mobile network is more difficult as, due to variations in radio quality across the network, the quality and availability of connectivity may naturally vary.

As discussed above, the platform 700 allows application environments to move closer to the radio site. This enables more complex functions to be moved to the Radio Access Network and for them to be hosted on the platform 700. That is, the services part 706 of the platform 700 may host applications (e.g., 740 and 742). The applications may be hosted by a platform 700 at access node 800 at the NodeB, or at the Femto or at the AP site, or at the gateway 802 at the RNC or BRAS site of the network Also, as devices such as telephones and laptops become increasingly more advanced, additional functionality can be implemented in the application and operating system environment of these devices, allowing the devices to play a greater role in the end-to-end data pipe.

The platform 700, in the services part 706, hosts the home security application 1440. The home security application 1440 has an associated electronic store (memory) 1212.

The platform 700 may:
Make measurements of the radio load;
Identify the frequency and technology layer each terminal is currently using;
Make measurements of 2G/3G/4G user coverage/distance from the site per technology, and the overlapped coverage areas;
Makes measurements of Quality of the radio link to the subscriber;
Identifies the terminal type used;
Assess the properties of that technology/frequency in a specific cell/location.

These measurements may be received at the soft nodes 702 (e.g., eNodeB 711) and passed to functions part 704 (e.g., QoS function 732).

The functions part 704 (e.g., QoS function 732) may then pass required parts of this information to the home security application 1440 hosted on the platform 700.

The home security application 1440 is shown in FIG. 15 provided in the services part 706 of the platform 700 of an access node 800, but could also be provided in the platform 700 of a gateway 802.

Briefly, the home security application 1440 records measurements of the interference experienced or dropped call rates on the cell it serves, to determine whether the network performance is diverging outside normal levels; and triggers an alarm to the Home Security Server 1410, which may be located at the network core.

The following network performance metrics can be used by the application 1440 to determine that it is being jammed:
Dropped Calls
Uplink Noise Rise
Neighbour cell measurements
C/1 measurements from other devices in the cell
Etc.

Service and Platform Interaction

The application 1440 may capture information on radio and initiate radio procedures to improve statistical network measurements.

Identifying the Location of the Jammer

One advantage of a mobile network is that there are large numbers of devices that are connected through a single base station at any one time; these devices currently provide measurements to the network of the radio conditions they experience, and thereby act as an array of remote sensors. When an interference source is turned on, the power that the Jammer device is transmitting can be measured at a number of locations; using these measurements the network can triangulate to determine the location of the interference source.

When other devices are in calls and these fail, the location of these devices before their call drop can be used in the calculation, along with information on their power budget to determine the interference level that is needed to block this device from accessing the network.

In HSPA and LTE devices can remain in a sub-state of connected mode where they are idle but the location on a Cell or URA area basis is known by the radio network. When the network gauges that there may be an attack in progress the radio network can bring some of these devices back into active state to provide additional network measurements.

Such analysis may be performed by an application at gateway 802.

Use of other mobile technologies and operators during an attack

If an attack targets purely the uplink, the device may not know that its use of the network is being blocked by a third party. The current normal operating procedure for the device would be to repeat its attempt to access the cell it is currently camped on, and wait for ever extending periods until the network "fault" gets rectified.

It is proposed that these special Security devices would after attempting to access the camped cell and failing; move quickly onto different carriers of the same technology; before shifting to different frequency bands.

In this way the attacker would need to jam the network across a wide range of frequencies and technologies.

In most countries national roaming is prohibited in much of the network, and as such a device cannot just access another network when it falls off coverage of its own operator. In occasions where there is an attack, national roaming can be enabled. If the Home Security Application 1440 indicates that there is a radio problem on this site then the national roaming is permitted.

Actions after Connectivity is Restored

When the Home Security server 1410 restores connectivity to the premises 1400, it initiates a procedure to pull all the buffered information at the sensors and video cameras at the premises 1400 to the network for processing, such that they can be analysed.

An embodiment of the invention, useful for providing home security, will now be described in more detail. However, it should be appreciated that the embodiment is applicable to identify interruption of the radio access network in general. Identifying such interruption is particularly useful in security applications, such as the home security application described above, because it can indicate security has been compromised at a premises. However, it is also often useful to detect interruption of the radio access network for other reasons. For example, a person or organisation may try to interrupt the radio access network to cause general inconvenience to users or to help perpetrate a crime, such as a terrorist attack. Further, the network may be interrupted not by a special jamming device, but by a malfunctioning terminal. For example, a malfunctioning terminal may continuously transmit at very high power which interrupts the service available to other terminals.

As mentioned above, the platform 700 receives data from the terminals that it serves. This data is made available to the security application 1440. The data may relate to the radio access network performance in the uplink between the terminals and the base station to which the platform 700 is connected. The network performance in the uplink may be assessed by determining the receive interference (the interference present in signals received from the terminals), the transmit power of the terminals (a high transmit power being an indication of high interference), the cell throughput (for example, the rate at which transmitted data packets are acknowledged as received by each of the terminals, the aggregated cell/site throughput, the dropped call rate and/or the H-ARQ rate).

The platform 700 is operable to communicate with other platforms associated with other base stations. This communication between platforms 700 may be used to retrieve from the other platforms the data relating to communications between those other platforms and the terminals that they serve.

The data obtained from the terminals may include an indication of the location of the terminals. For example, the location of the terminals may be provided directly by GPS information transmitted from the terminals. The location may also be calculated from other data received from the mobile terminals—for example, by detecting how long it takes for a transmitted data packet to be acknowledged. Various methods of determining the location of mobile terminals in cellular networks are known to those skilled in the art, and any of these may be used. The radio quality information and the location information may be used to build a database which indicates the radio quality of different locations within the cell served by the base station associated with the platform 700. The radio quality may vary at different times, and this may also be represented in the database.

The information obtained from neighbouring platforms advantageously also includes location/geographical information relating to the mobile terminals from which the performance data is derived. This allows the controller 700 to include in the database radio performance measurements for not only its own cell but also for neighbouring cells (and cells further afield). The area served by the cells of respective platforms may overlap, and this provides greater detail about the radio conditions in such an area. Further, one platform or multiple platforms, may provide multiple radio access technologies (e.g., 2G and 3G) in the same geographical area, and this information too is included in the database to provide more detailed radio performance information in such geographical areas.

The radio quality and geographical information from the platform 700 and the neighbouring platforms is passed to security application 1440 to create the database, which is stored in the store 1212. The application 1440 may aggregate and analyse the radio performance across a geographical area. The database in store 1212 may therefore give an indication of the historic radio quality over a geographical area. The database may indicate the historic radio quality over the geographical area at different times (such as at different times of day). Typically, the radio quality may follow a similar pattern over a particular time period (such as a day).

At any given time, the radio quality information (e.g., mobile terminal measurement of serving and neighbour cells, Network measurements of mobile terminals) currently being obtained from terminals served by the platform 700 may be passed to the security application 1440 and analysed. The application 1440 compares this current radio quality data with historical radio quality data taking into account the current time and the location of the mobile terminals making the current measurements. The security application 1440 determines whether the current measurements are significantly different from those that would be expected based on the historical information in the database. If there is a significant difference, then this is an indication that an interruption of radio access network may be occurring.

The store 1212 may also store details of radio quality patterns that indicate that an interruption is occurring, such as deliberate jamming of the radio access network (or part thereof). These criteria may be pre-stored in the store 1212 and may be based on known interruption/jamming patterns, and not based on the historical data mentioned above. The security application 1440 is operable to compare the current radio quality measurements with these criteria to determine whether it is likely that interruption or jamming is being attempted.

Comparison by the security application 1440 of the current radio quality measurements with the historical measurement and the interruption/jamming criteria may be performed, or one other of those comparisons only may be performed.

When the security application 1440 determines that it is likely that interruption or jamming of the radio access network is occurring, the application may then take steps to obtain further information in order to confirm that interruption/jamming is indeed occurring by performing analysis of the further information. Whether or not this confirming step is performed may depend upon the result of the initial analysis step. Analysis of some radio quality data may indicate a very high probability that interruption/jamming is occurring, whereas other radio quality data may indicate that there is a small possibility that interruption/jamming is occurring.

If it is desired to perform the confirming step, then the application 1440 may send commands to terminals served by the platform 700, for example via the soft eNodeB 711, to instruct the terminals to provide further performance measurements. These performance measurements may result in the gathering of further types of radio quality data (in addition to the types of radio quality data mentioned above). The terminals may be instructed to transmit the radio quality information of the types mentioned above, but with greater frequency. The application 1440 may also instruct the platform 700 to trigger a dummy paging procedure which causes mobile terminals that are in the idle/inactive state to move to the active/connected state, so that radio quality information may be obtained from those terminals. Such a dummy paging procedure may "trick" the terminals into expecting that a call or data session is to take place.

The application 1440 may instruct terminals to provide performance measurements at their geographical location. For example, the terminals may be instructed to gather the information about the radio conditions at the geographical location similar to information that may be collected to determine whether to perform a handover to a different cell. This data is then transmitted to the platform 700 for analysis by the application 1440.

The application 1440 may contact further platforms 700 to obtain radio performance data from these platforms as part of the interruption/jamming confirmation step, so that the radio quality is known over a larger geographical area.

The security application 1440 may also instruct neighbouring platforms to acquire additional radio quality information like that mentioned above, for the terminals registered with those other platforms.

The additional information obtained by the confirmation step may be used to perform a further analysis so that the presence of an interruption/jamming source can be verified with greater accuracy.

The gathering of additional information in the confirmation step may optionally be performed without the initial analysis step.

If it is determined by the application 1440 that interruption/jamming is occurring (whether using the confirmation step in addition to the initial analysis or not), then appropriate steps may be taken.

The application 1440 is operable to interpret the radio quality data to determine the location of the interruption/jamming source.

The application 1440 may use the information provided about the geographical location of each of the mobile terminals for which it has radio quality data to determine which mobile terminals are in the location where the source of the interruption/jamming is determined to be.

If the source of the interference/jamming is determined to be in a location that is served by a different platform to the platform 700 which hosts the security application 1440, then the data relating to the interruption/jamming may be passed to the appropriate platform for processing by an associated security application on that platform.

The application 1440 may instruct the platform 700, for example by soft eNodeB 711, to instruct the mobile terminals in the location that is the source of the interruption/jamming to operate in a predetermined manner for a period of time.

The instruction to the terminal may be to reduce the data rate used, to limit the maximum transmit power, to adopt a predefined scheduling pattern, and/or to set predetermined times and durations during which the terminal must not transmit or receive.

During the period of time when the identified terminals are operating in a manner specified by the application 1440, diagnostic activities may be performed. Because the terminals in the location of the interruption/jamming are operating in a predefined manner, the application 1440 can calculate what radio quality measurements should be received during the period. If radio quality measurements actually received differ considerably from the expected results, then this is a further indication that interruption/jamming is occurring.

The analysis performed by the security application 1440 may identify a particular terminal or group of terminals that are likely to be the source of the interruption/jamming. The security application 1440 may then instruct the identified terminal (or terminals) to operate in a predetermined manner like that mentioned above for a predetermined time during which diagnostics can be performed to confirm whether or not that terminal (or terminals) are indeed the source of the interruption/jamming.

If a particular terminal (or terminals) is identified as being the source (or likely source) of the interruption/jamming, then details of that terminal may be put on a network performance "blacklist". The details may be the IMSI and/or the IMSI or a combination of these. The security application 1440 may instruct that the service to the terminals included on the blacklist is restricted, or that no service is provided at all. The security application 1440 may further notify the network operator or customer service function of the identity of the interrupting/jamming terminal (or terminals) and its (or their) location. The network operator may restrict or stop services provided to the terminal. For example the terminal may be restricted to SMS messaging only.

The security application 1440 may notify the terminal that is the source of the interrupting/jamming by any suitable mechanism, such as SMS, email, that its services being restricted and/or that it is a source of interruption/jamming.

The interruption/jamming source may be a terminal registered with the network—for example that has been modified in an authorised manner or that is malfunctioning. Alternatively, the source of interruption/jamming may be a device that is not registered with the network but which, nevertheless, affects the network operation.

If the interrupting/jamming source is not a terminal that is registered with the network, then the security application 1440 triggers an alarm to indicate that the source of the degraded network performance is not a terminal registered with the network. A different alarm may be triggered if the source of the interrupting/jamming is a terminal registered with a network.

The alarm triggered may have a criticality dependent upon the size of the impacted geographical region, as determined by the analysis performed by the security application 1440. The criticality of the alarm may be dependent upon the assessed impact by the application 1440 to the network performance. The criticality of the alarm may additionally or alternatively be dependent upon the predicted number of terminals that may be impacted by the interrupting/jamming, as determined by the application 1440.

The alarm may instruct a network function part 704 of the platform 700 to modify the cell reselection and/or handover criteria used by the mobile terminals served by the platform 700 to change the mobility and selection processes so that the terminals are more likely to move to a radio access technology or frequency layer that is unaffected or less affected by the interruption/jamming. The cell reselection criteria may be modified by sending system information to the terminals.

Terminals may be configured to automatically change reselection parameters to a different radio access technology or frequency layer, or network operator, if the terminal cannot use the network.

As mentioned above, movement between network operators in the home country of a mobile terminal (national roaming) is not normally permitted. This restriction may be temporally removed when interruption/jamming is detected.

The detection of interruption/jamming discussed above has many applications. It is useful for performing network diagnostics and for identifying modified or malfunctioning terminals.

It is also useful, as discussed above, in security applications, where the security of a premises 1400 (or other entity) is monitored by a device (such as a camera) which transmits data (such as images) to a home security server 1410 via the cellular (wireless) network connection 1430 and/or a fixed (wired) network connection 1420. If it is detected that interruption/jamming is occurring at the secured location 1400, then an alert may be given to security personnel so that the secured premises 1400 can be visited and checked for a security breach. If it is detected that there is interruption/jamming of the radio access network, the status of the fixed network 1420 at the secured premises 1400 may also be checked. If the fixed network 1420 is operating correctly, it may be sufficient to review the security data provided via that network to verify whether or not a security breach is indeed occurring, without requiring to visit the secured premises 1400. However, if the fixed network 1420 at the secured premises 1400 is also detected to be non-operational, then this is an indication that security breach is very likely to have occurred, making a visit from security personnel more urgent. The security application 1440 may be provided with data relating to the status of a fixed network 1420 by the home security server 1410 (e.g., by a fixed (wired) connection), in addition to the radio quality information received from the base stations served by the platform 700 on which the security application 1440 is hosted. Dynamic Radio Resource Management (P100934-GB-PSP)

According to network statistics, utilisation in the "Busy Hour" (BH) is considerably higher than at other times of the day, which means that access nodes are over-dimensioned during a good part of the day to make sure that enough resources are available to handle the BH traffic.

Further, different access nodes are likely to experience the BH at different times, which indicates that it should be possible to share resources between different access nodes to make the best use of overall network resources.

A more efficient resource utilisation would allow the reduction of carbon footprint and achieve savings.

In the known implementation of the Access Network architecture there is no intelligence at the access edge (base station) to allow monitoring of local resources and a more dynamic allocation.

The novel architecture described above provides additional intelligence at the access edge and allows real-time monitoring of radio resource utilisation and radio resource sharing between different Access Nodes/Gateways. This enables:

Sharing of baseband resources between different nodes. Access nodes that are under-utilised are able to make use of spare baseband resources from other access nodes or from a central pool of baseband resources (at a gateway). This leads to more efficient network dimensioning as access nodes are able to draw from unused resources in other nodes when they reach high utilisation. This may limit network over-dimensioning to cope with BH traffic.

"Switching off" of unused baseband resources. This provides a reduction in OPEX and CO2 emissions. A more dynamic resource management allows to draw resources from other under-utilised access nodes or from a central pool of resources (at a gateway) and to switch off baseband resources in the access nodes in periods of low utilization.

As discussed above, a nodeB or Femto can be considered to comprise two main parts; a radio frequency part and a baseband part. The radio frequency part may handle the transmission of radio frequency signals between the antenna of the nodeB or Femto and the mobile terminal, and for converting radio frequency signals into digital baseband signals (and vice versa). The baseband part may be responsible for controlling and managing the transmission of the baseband signals to other components of the mobile telecommunications network.

The platform 700 communicates with the radio frequency (RF) part of a base station, such as a NodeB 1. The soft nodes 702 of the platform 700 comprise components such as a soft NodeB 708, soft BTS 710, soft eNodeB 711 and soft RNC 712 and soft SGSN/GGSN 714. The soft nodeB 708 provides functions equivalent to the baseband part of a conventional NodeB in a 3G telecommunications network. The soft BTS 710 provides baseband functions equivalent to the baseband functions of a BTS in a conventional 2G mobile telecommunications network. The soft enodeB 711 provides baseband functions equivalent to the baseband functions provided by a conventional enodeB in a 4G mobile telecommunications network. The platform 700 may therefore communicate with the radio frequency part of a 2G, 3G or 4G base station and provide appropriate baseband services for 2G, 3G or 4G technologies (or indeed for other technologies). A 3G mobile terminal that wishes to obtain telecommunication services from the mobile telecommunications networks connects wirelessly to the radio frequency part of a NodeB. Baseband functions may be provided either by a baseband part of the conventional NodeB or by the soft NodeB 708 forming an element of the soft node part of the platform 700. For example, the soft NodeB 708 may receive radio measurements from the radio frequency part of the NodeB to which it is connected, and may provide these radio measurements to other elements of the platform 700.

In this embodiment, the soft nodes 702 provide baseband resources (and the capability to manage these resources according to a set of rules), rather than the baseband parts of conventional base stations. The base stations provide radio frequency connections between the soft nodes 702 and the terminals.

The baseband resources include those provided by soft BTS 710 (2G), soft NodeB 708 (3G) and soft NodeB 711 (4G), referred to as the BaseBand Unit (BBU).

By enabling a more effective use of our radio resources energy savings may be realised, CO2 emissions may be decreased and over-dimensioning of access network resources may be prevented.

Figure 16:
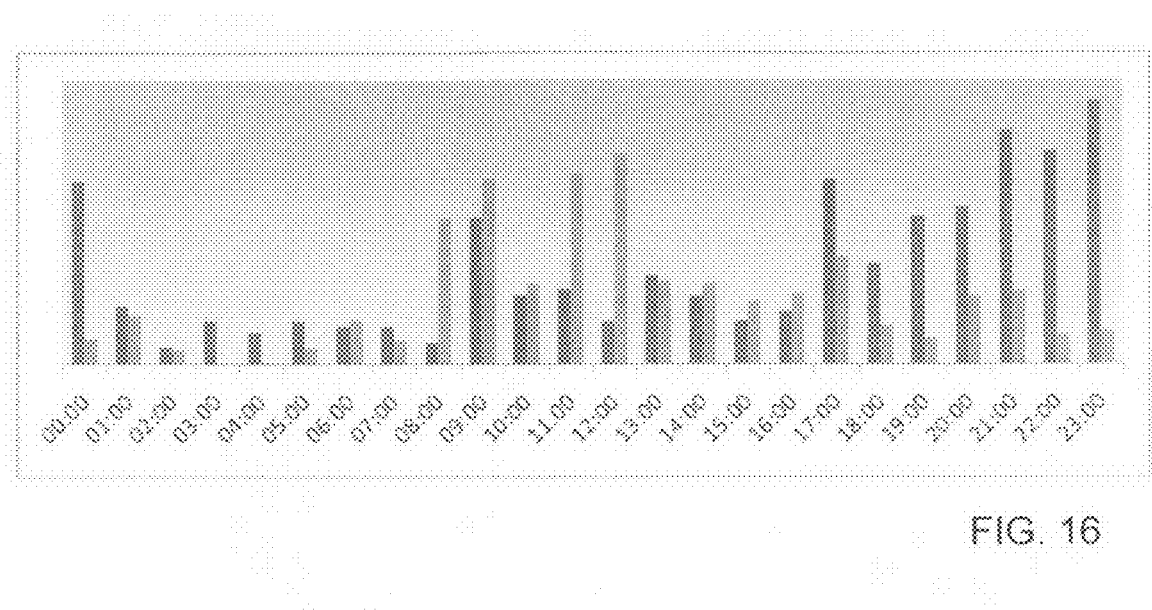
FIG. 16 shows daily data traffic profile in example cells of a UK mobile network according to an embodiment of the system described herein.

FIG. 16 shows an example of the data volume carried across a day in two sites within the same area in a UK mobile network. The chart of FIG. 16 shows that during a high percentage of the day, resources in both sites are underutilised, highlighting the potential to share resources and improve resource utilisation. Potential for resource sharing is even more evident when looking at a higher number of sites under the same controller.

Figure 17:
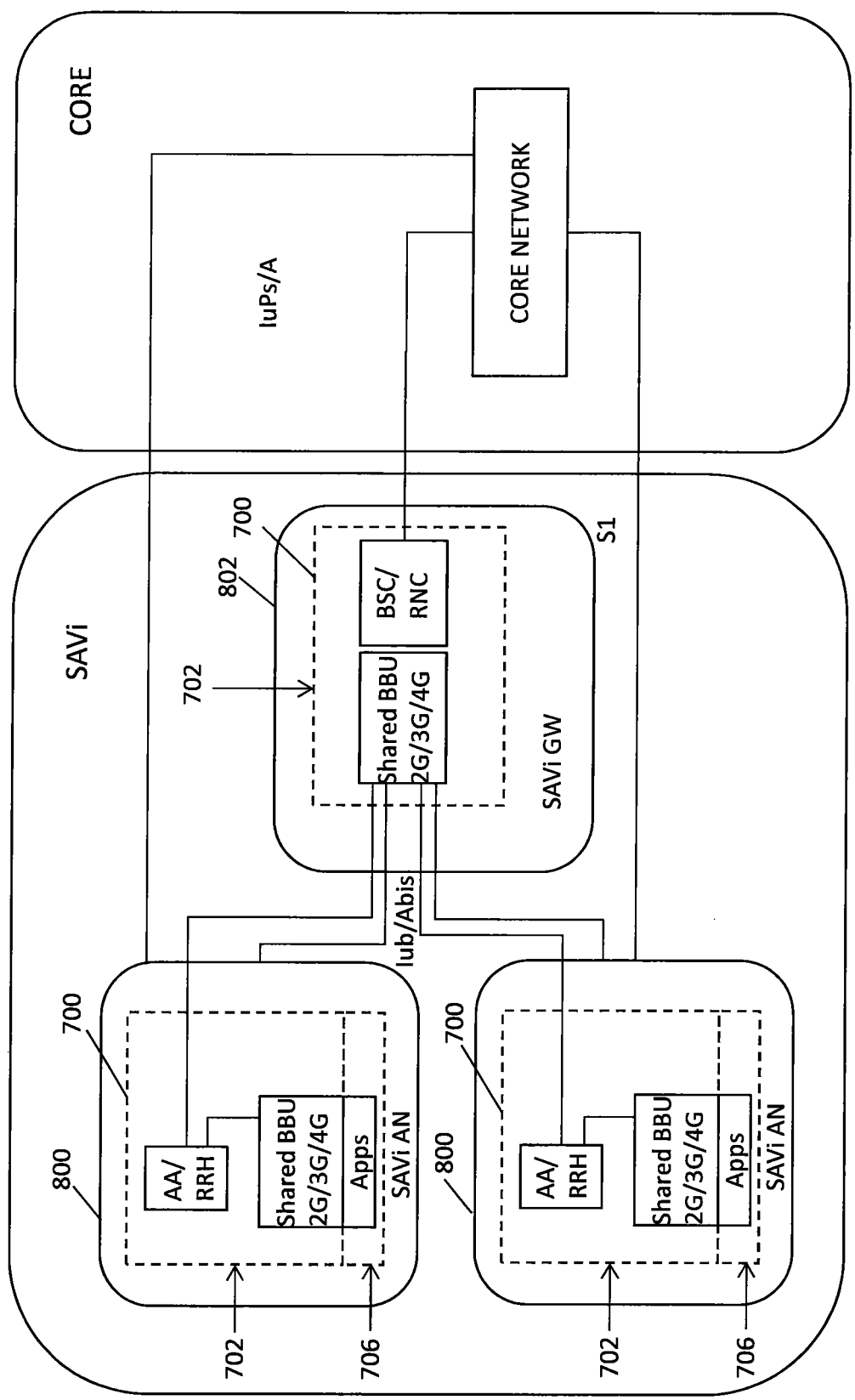
FIG. 17 shows the architecture for performing radio resource management according to an embodiment of the system described herein.

FIG. 17 shows a high level architecture illustration of this embodiment deployed on the on a 2G, 3G & 4G macro network.

The radio components of the architecture include the Access Node (AN) 800 and Gateway 802 which in turn contains a list of new capabilities with added intelligence.

A pool of baseband resources provided by soft nodes 702 from each of the connected Access Nodes 800 are made available in the Gateway 802. The Gateway 802 allows Access Nodes 800 to make use of this pool of resources in periods of low utilisation. This in turn allows switching off the baseband resources in selected Access Nodes, keeping only the RF part of the associated base station switched-on, with the consequent reduction in energy consumption. It is also possible to share baseband resources between different access nodes 800, without supervision of the gateway 802.

The embodiment may be implemented in the network architecture as follows:

2G: the resources are monitored periodically per time-slot per TRX (uplink/downlink channel); if total number of occupied timeslots across all the BBU's TRXs goes below a predefined threshold, the local TRXs/BBU is switched off until the remote BBU resources trigger another load threshold that may force the local TRX/BBU to be activated again for new connections. Equation:

voice connection: Utilisation [%] is proportional to the total number of the available time slots GPRS connections: Utilisation [%] is proportional to the number of used timeslots, the number of users and the target throughput per user.

3G: The local BBU resources monitored per 5 MHz,

R99 (Release 99) traffic: utilisation [%] is proportional to the number of DCH (Dedicated Channels), the code-tree number and the control channels HSPA (High Speed Packet Access) traffic: utilisation [%] is proportional to the number of users and the offered throughput per active users. If the number of bit/HZ/user goes below or exceed predefined thresholds, the local BBU might be activated/deactivated 4G: The local BBU occupancy is monitored by the averaged Resource Blocks (RBs). The used RB and the number of active users per sector.

In the above examples, the radio load is monitored, although other efficiency characteristics may alternatively or additionally be monitored.

The decision to activate/de-activate local BBU or share external BBUs can be made at the Gateway 802 or at a Self Organised Network.

To recap, the access nodes 800 each include a platform 700. Each platform 700 includes a soft nodes part 702 which provides a baseband part that is used in conjunction with a radio frequency part of the base station associated with the access node 800 in order to provide cellular telecommunication services to terminals registered with the access node 800. The baseband part may perform a plurality of baseband functions.

The platform 700, for example by means of an application hosted by the services part 706 of the platform, is operable to determine at least one efficiency characteristic of the baseband part, and preferably determines an efficiency characteristic of each baseband function.

Such an efficiency characteristic may be the level of utilisation of 2G, 3G or 4 G communication capacity (load), as described above. 2 G communication, 3 G communication and 4 G communication may be considered to be respective baseband functions, for example. Additionally, or alternatively, the efficiency characteristic may be power consumption, bandwidth, radio outage, hardware resilience, heat production, power source type, radio spectrum efficiency, number of supported terminals, number of connected terminals or the location of the terminals, for the baseband part or for each of the baseband functions of the baseband part.

According to a feature of the embodiment, baseband parts/functions may be shared between the different access nodes 800.

By way of a first example, if the efficiency characteristics of a baseband function indicate that it is operating inefficiently, then a decision may be made to shut down that baseband function and to instead use another platform 700 to provide that baseband function. In this way, the radio frequency part associated with the access node 800 does not have baseband functions provided by the associated access node 800, but rather by a different access node. For example, if one determined efficiency characteristic of a baseband function is the load or utilisation in 3G and another determined efficiency characteristic is the power consumption, a decision may be made to shut down the baseband function if it is determined that the load/usage is below a threshold and the power consumption is above a threshold. Such a baseband function is inefficient because it has a low usage level and consumes a relatively large amount of power.

Each platform 700 shares the efficiency characteristics of its baseband functions with other platforms 700. This allows an informed decision to be made as to which other platforms 700 might be able to share one or more of their baseband functions with another platform in an efficient manner. The efficiency characteristics are transmitted between respective platforms 700. If a platform determines that one of its baseband functions has efficiency characteristics indicating that it is inefficient, then the efficiency characteristics corresponding baseband functions of other platforms 700 are compared. If the efficiency characteristics of one of the other platform 700 is such that the other platform can provide the baseband function more efficiently (and the communication utilisation/load efficiency characteristic indicates that there is sufficient capacity), the baseband function of the platform 700 is disabled temporarily and instead requests for such baseband functionality are routed to the appropriate platform 700 that can provide the baseband function more efficiently.

Each platform is operable to receive such requests for sharing its baseband functions. The platform 700, on receipt of such a request, may verify from its efficiency characteristics that it does have the capacity to provide the requested baseband functions. If the platform 700 determines that it does not have the capability to provide the functions, then it may reject their request.

If the communication utilisation/load efficiency characteristic of a platform 700 indicates that the platform 700 is being very heavily used and is at or near its maximum utilisation/load, then the platform 700 may request that another platform provides baseband functions so that the handling of the communications may be shared between the platforms 700.

Respective access node platforms 700 may communicate efficiency characteristic data between themselves and may organise the sharing of baseband functions between themselves. In an alternative arrangement, a gateway node 802 platform 700 may receive efficiency characteristics from the platforms 700 of a plurality of access nodes 800, and may use these efficiency characteristics to determine which baseband functions of which platforms should be disabled and which baseband functions of the platforms should be shared. The platform 700 of the gateway node 702 instructs the relevant platforms 700 of the access nodes 800 to disable or share their baseband functions as appropriate.

Thus, the control of baseband functions can be performed in a distributed manner (by cooperation between the platform 700 of access nodes 800, or centrally, by the platform 700 of a gateway node 802.

If the platform 700 controls the allocation of communication resources within its baseband part between different radio access technologies, such as 2G, 3G and 4G (LTE) technologies. The platform 700 may select/disable a radio access technology. The platform 700 may reconfigure the baseband part controlling a specific spectrum allocation so that a different radio access technology is provided on that spectrum. Such actions may be taken in response to a decision being made to disable the baseband function of a platform 700 corresponding to a particular radio access technology.

Figure 18:
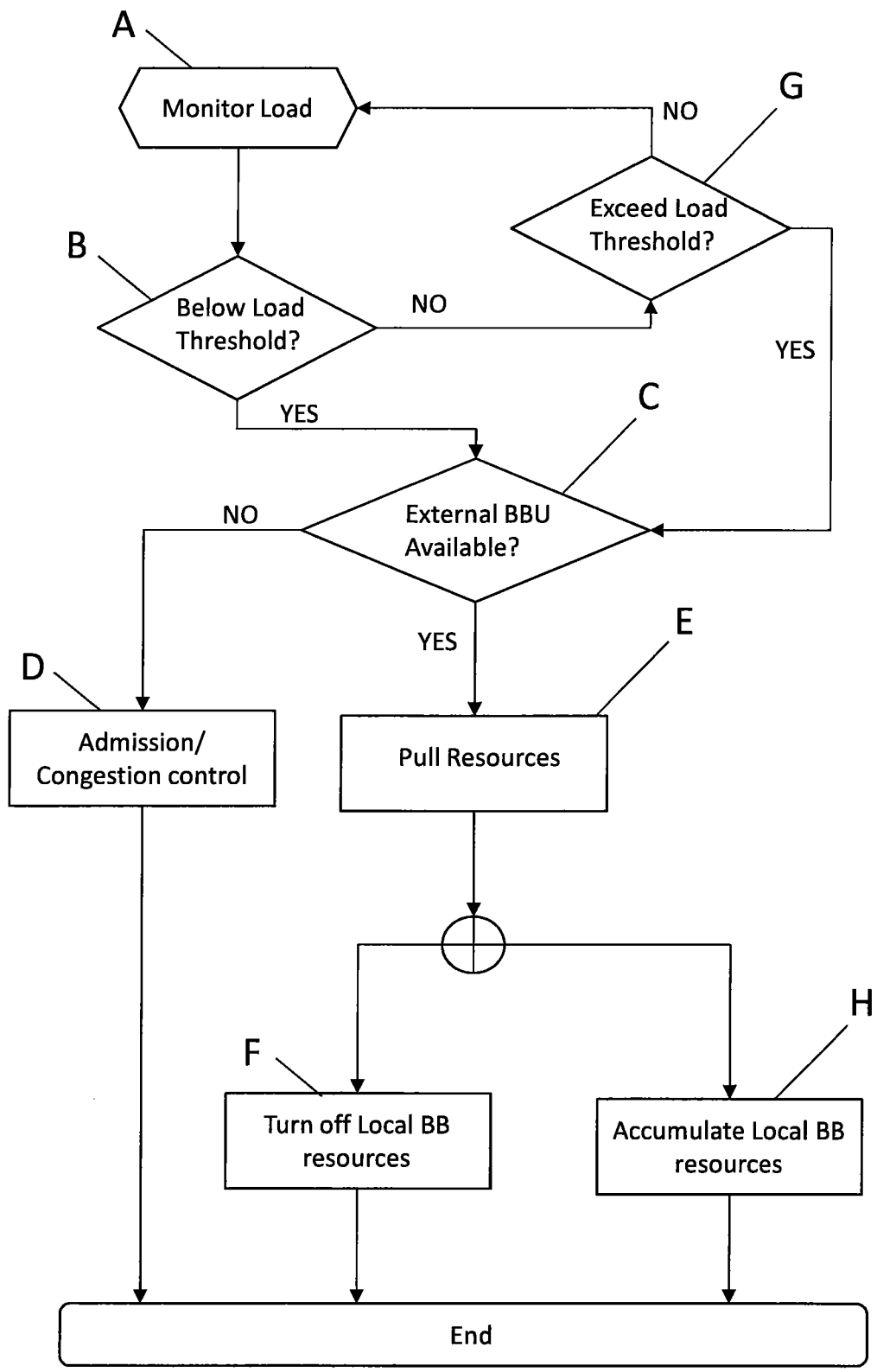
FIG. 18 is a flow chart showing the decision steps to perform baseband unit resource pulling according to an embodiment of the system described herein.

The flow chart of FIG. 18 shows the steps taken to control efficient use of baseband resources in accordance with the embodiment.

For the sake of simplicity, the procedure of FIG. 18 is only concerned with communication utilisation level (load), but the principles could equally be applied to other of the efficiency characteristics described above. The procedure of FIG. 18 is performed by each platform 700, for example by an application hosted in the services part 706 of that platform 700.

At step A the load is monitored on a platform 700 (monitoring platform). This load may be the utilisation of a particular radio access technology (2G, 3G, 4G, etc).

At step B it is determined whether the load is below a low utilisation threshold.

If at step B it is determined that the load is below the low utilisation threshold, this indicates inefficient use of the relevant baseband function. The baseband function may be consuming power but only providing minimal radio resources. When this occurs, at step C, it is determined whether another platform 700 may be able to provide a corresponding baseband function.

If at step C it is determined that another platform 700 (assisting platform) cannot provide a corresponding baseband function, then at step D admission/congestion control characteristics of the monitoring platform 700 may be adjusted so that greater use is likely to be made of the baseband function.

On the other hand, if at step C it is determined that another platform 700 (assisting platform) can provide the baseband function, then at step E the monitoring platform 700 arranges for the baseband function of the assisting platform 700 to provide the baseband function. At step F the monitoring platform 700 disables the baseband function and instead routes requests for the baseband function to the assisting platform 700.

After a baseband function is deactivated by the monitoring platform 700, the monitoring platform 700 may continue to monitor the load, and if this increases above the low usage threshold, the monitoring platform 700 may reactivate the baseband function and cease using the baseband function of the assisting platform 700.

Returning to step B, if at this step it is instead determined that the load is not below the low load threshold, step G is performed.

At step G it is determined if the load exceeds a high load threshold.

If at step G it is determined that the load does not exceed the high usage threshold, then it can be concluded that the load is within a normal range, so that the baseband function is operating efficiently. The procedure then returns to step A.

On the other hand, if at step G it is determined that the load exceeds a high usage threshold, then the procedure next performs step C. At step C it is determined whether any other platform (assisting platform) 700 can provide assistance with the baseband function. In this instance, the purpose of identifying a suitable assisting platform 700 is not to improve efficiency by disabling an underused baseband function in the monitoring platform 700 but is to improve service by maintaining the baseband function of the monitoring platform 700 whilst obtaining assistance in performing that baseband function from an assisting platform 700 due to the high usage of that baseband function at the monitoring platform 700.

If at step C it is determined that an assisting platform 700 cannot assist with the baseband function, then admission/congestion control is performed at step D. In this instance, because the load is high, the assignment/congestion control may take action that tends to reduce the load.

On the other hand, if at step C it is determined that a assisting platform 700 can provide the baseband function, then at step E the baseband function of the assisting platform 700 is used to assist in providing the baseband function for terminals registered with the monitoring platform.

After step E is performed in this circumstance, the monitoring platform 700 then uses the baseband function of the monitoring platform 700 and also the assisting platform 700 to provide a better service under the high load conditions.

After a baseband function is assisted by the assisting platform 700, the monitoring platform 700 may continue to monitor the load, and if this decreases below the high usage threshold, the monitoring platform 700 may cease using the baseband function of the assisting platform 700.

Smart Control (P100941-GB-PSP)

Mobile terminals are becoming increasingly common. In many developed countries nearly all adults carry with them and use a mobile terminal. Further, it is increasingly common to incorporate mobile terminals within other devices, such as vehicles and portable computers.

Information obtained from the mobile terminals or network measurements of mobile terminal transmissions allows their location, speed, direction of travel to be ascertained as well determining whether they are indoors/outdoors and predicting future device density; these can be used in conjunction with customer information known by the network (e.g., subscription type, terminal type, ARPU, demographics, historic usage characteristics) for controlling external resources, such as street furniture, including street lights, display signs and CCTV cameras—because, the presence of specific mobile terminals at a particular location is indicative of the presence of a person (and possibly an associated device) at the location. This potentially allows street furniture to be controlled in dependence upon the presence of a mobile terminal at a particular location.

There is a drive to improve energy efficiency and to decrease $CO_2$ emissions. The challenge to meet the $CO_2$ emission reduction target of 10 to 20% by 2020 may be difficult to meet without considerable changes in the way that energy is used. Currently, street lights are switched off only during the daylight, and are turned back on again (at maximum capacity of the illumination) during the hours of darkness regardless of the needs/usefulness of the street lights. For example, in some areas during the late night or early hours of the morning, there may be no, or very few, people or vehicles using the illuminated area, and so street lighting is not required. A more dynamic energy management would allow the realisation of energy savings, decreasing $CO_2$ emissions and preventing over-dimensioning the power stations for winter/night use.

In a conventional mobile telecommunications network, it is not practical to control external resources (such as street lights) based on information about the location of users of mobile terminals. In a conventional telecommunications network, access measurement data relating to individual mobile terminals is not available to the service environment without specific reporting from clients in terminals.

The novel platform 700 allows application environments to move closer to the network edge/radio site/base station, and also allows a proper interaction between applications and the network layers/functions, due to the open APIs. This enables more complex functions to be moved closer to the network edge.

Figure 19:
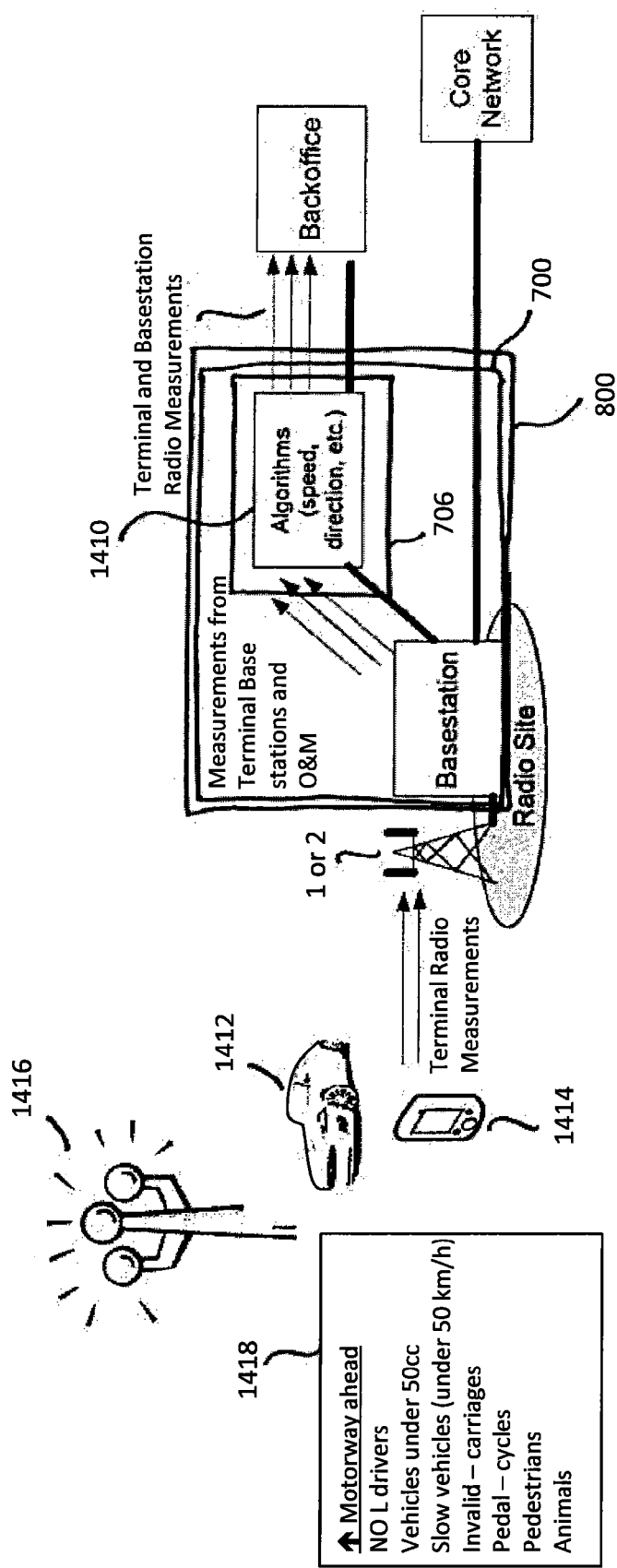
FIG. 19 shows a an arrangement for control of street furniture according to an embodiment of the system described herein.

As shown in FIG. 19, in this embodiment a new application 1410 is introduced into the services/application/network environment 706 of access node 800 platform, to monitor the speed and direction of mobile device(s) 1412 and 1414, to control street light 1416 as well as street signs/panels 1418 according to the mobile device locations, densities and velocity.

The attained information may be used by the new application 1410 in real time to control the:
- Illuminated power for each lamp & number of illuminated street lights
- The contents of the electronic signs (congestion, diversions in place, etc.); including selecting advertising content and font size displayed on the electronic panels
- Direction and Focus of security cameras
- Measurement and reporting of environmental sensors (e.g., weather, atmospheric pollution, chemical/nuclear radiation)
- Human resources such as street cleaners, police and security personnel
- Assess shared movements of customer devices and vehicular devices, allowing relationships to be determined, and future location to be predicted based on routing information of road map or bus/train route Generally speaking, the radio measurements performed by the platform 700 and the moving devices 1412, 1414 are used by the application 1410 to build an underlying trend of control such that a moving vehicle 1412 can active/illuminate street light(s) 1416 based on the device 1412 speed and direction. In addition, fast moving device(s) 1412 can control side road signs/panels 1418 font and its contents.

Figure 20:
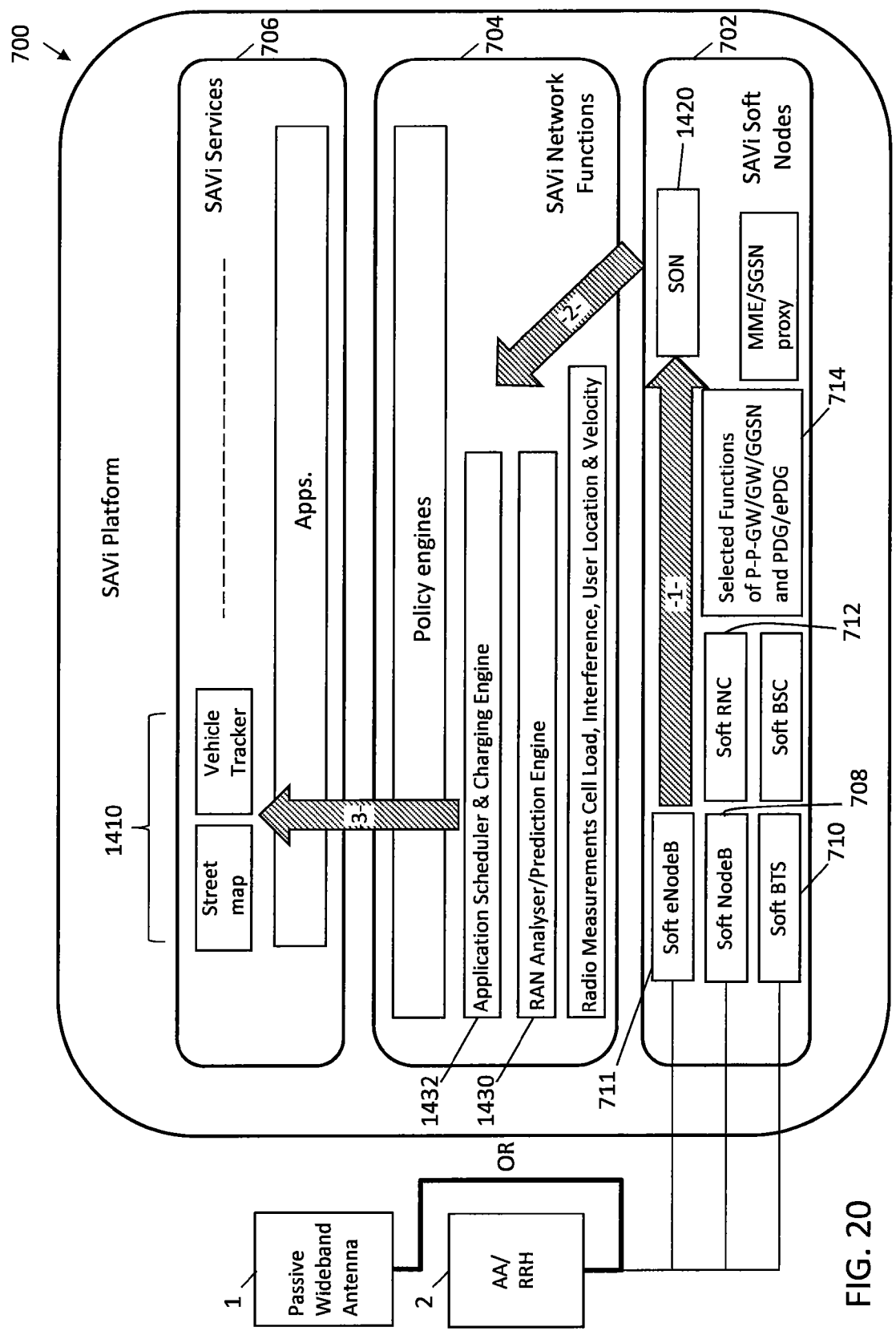
FIG. 20 shows the "platform" provided in the Radio Access Network in accordance with the FIG. 19 embodiment according to an embodiment of the system described herein.

The platform 700, shown in FIG. 20, provides additional intelligence at the access edge and may allow real-time monitoring of radio resources and the attached electronic devices 1416, 1418. This enables:
- Communicating application information between platforms 700. Access node 800 is able to pass the information related to the moving terminals 1412, 1414 and the attached electronic devices 1416, 1418 to another connected node 800, 802
- The information collected by the soft node 702, e.g., neighbouring cells, Time Advance, pathloss/signal quality, the application type name/characteristics, are used by Network Functions 704 to calculate device 1412, 1414 speed, direction and the whether indoor/outdoor as well as device proximity. Device location and speed may determine the radius of the controlled area.
- The output of the Network Functions 704 are used by the application layers 706 to control the power of the street lights 1416, the number that are required to be illuminated, as well as the electronic signs/panels, 1418.

The tasks to calculate the speed and the direction of moving terminal(s) 1412, 1414 may be performed by the SON 1420 incorporated into the platform 700.

These tasks are may be conducted by collecting historic data from the terminals 1412, 1414 and the neighbouring cells, and by calculating the time difference for particular packet data being sent and for the acknowledgement being received.

Furthermore, different streets are likely to experience different traffic levels, which indicates that it should be possible to "dim" or turn off street light during quiet time of the dark in an a particular geographical area or be able to define the radius in which the lambs/panels need controlling. This is implemented by the application 1410.

Summary of high level benefits:
- CAPEX savings: Efficient energy utilisation may enable less over-dimensioning of the power stations.
- Reduction in energy consumption, which may lead to a lower carbon footprint.

As discussed above, because the platform 700 includes a novel standardised API, a consistent interface, defining communication protocols, ports etc, is available to application developments, and the applications are able to use information from the network function part 704 and the soft nodes part 702 of the platform 700.

In this way, the application 1410 may be an application to control the illumination of street lights 1416. The application 1410 on the platform 700 controls street lights 1416 in the vicinity of the platform 700. The application 1410 receives information relating to the mobile terminals served by the platform 700 from the network functions part 704 of the platform 700. The open API allows interaction between the application 1410 and the network layers. For example, the application 1410 may be provided with information about the location of each of the mobile terminals served by the platform 700. The application 1410 may include a street map and may identify the position of the mobile terminals on the street map. The application 1410 also includes details of the fixed locations of the street lights. The application 1410 then detects which street lights require illumination based on the presence or absence of mobile terminals in the area illuminated by each street light. Control of the street lights (or other external resource) can be performed by the application 1410 by any suitable mechanism. For example, the application 1410 may use the base station function 708, 710, 711 of the platform 700 to communication with the street light (or other external resource) by wireless communication via a base station (e.g., NodeB or femto). The street light (or other external resource) may be provided with a wireless receiver to receive such communications.

In addition to the application 1410 of the platform 700 being aware of the location of mobile devices served by the platform 700 on which the application 1410 is hosted, the application 1410 may also be made aware of information regarding mobile devices that are served by other platforms 700, by signalling between the platforms.

If the location of a mobile terminal is known at two spaced apart time intervals, this information can be used to calculate the speed and direction of the terminal—and this may be performed by SON (Self Organising Network) 1420. This information from the SON 1420 may be passed to the network functions part 704 of the platform 700, together with radio measurement data, cell load data, interference data etc. The network functions part 704 of the platform 700 may include a radio access network analyser/prediction engine 1430. This may predict future movement and speed of a mobile device based on historical location, speed and direction information.

An application scheduler and charging engine 1432 may also be provided in the network functions part 704 of the platform 700 to schedule the transmission of information to the application 1410 and to provide information that allows charging for provision of this information as appropriate. For example, a local authority responsible for street lighting may be charged for providing this information.

The information relating to mobile terminals that is collected by the platform may, as discussed above, be information which indicates the location of each mobile terminal. As mentioned above, if the location of a mobile terminal is measured at two spaced apart time intervals it is possible to determine the speed and direction (velocity) of the mobile terminals. The information about the mobile terminals may further include subscription information, the terminal type and the content and application that the terminals regularly use.

As mentioned above, mobile terminals have an idle state and an active/connected state. When a mobile terminal is in the idle state, it may be difficult or impossible to determine its location. The platform 700 may therefore be operable to instruct selected mobile terminals to move from the idle to the active/connected state. This advantageously may allow their location to be determined. A terminal that is in the idle state may be moved to the active/connected state periodically so that its location may be determined periodically. This may be done to all or a selected proportion of the mobile terminals served by the platform 700. Movement of a mobile terminal from the idle to the active/connected state may be performed through modification of network measurement parameters, for example, the measurement period. Alternatively, this may be performed by transmitting dummy paging messages to a paging group. Further alternatively, this may be performed by modification of cell identification parameters, for example location area identifier, routing area identifier or tracking area identifier. These techniques may also be used to in combination.

The location data of the mobile devices may be used to determine the density of mobile terminals at a particular location. For example, the number of mobile terminals in a particular street may be determined. The street lights (or other external resource) may be operated in dependence upon this density. For example, if the mobile terminal density in the street is very low, then the street lights in that street may be instructed by the application 1410 to be extinguished. The platform 700 may further be operable to predict the future density of mobile terminals at a particular location, and to provide this information to application 1410 for controlling street lights or other external resources based on the predicted mobile terminal density.

The platform 700 may further be operable to obtain information about selected characteristics associated with mobile terminals, such as the average ARPU (Average Revenue Per User), terminal price etc.

The platform 700 may further be operable to assess the future location of the mobile terminals.

The analysis performed by the platform 700 may be directed to a specific mobile terminal or selected mobile terminals.

The platform 700 may communicate with the external resource to provide statistical or analytical information to the external device. The external resources are known to the platform 700. The platform 700 may retrieve profile information specific to an external resource, and may filter or select relevant mobile terminal groups that meet criteria related to the specific profile information of the external resource. Using the location and other information of the mobile terminals served by the platform 700, the application 1410 is operable to modify the operation characteristics of external resources. In the example given above of the external resource being street lights, the modified operation characteristic may include powering up or powering down the street lights or groups of street lights. Other external resources may be powered up or powered down by the application 1410.

In a further example, the application 1410 may modify the output characteristics of an electronic device. For example, the electronic device may be a street sign with an electronic display. The text size of this display may be changed. For example, if it is determined that a mobile terminal approaching the sign is travelling at inappropriately high speed (likely to be a fast travelling vehicle) then the text size of a street sign may be increased so that the user can read the street sign despite their high speed. The message display by the street sign may also be modified. In the example of the inappropriately fast vehicle, the street sign may display enlarged text the message "slow down".

The application 1410 may push new content to be displayed by the electronic device. For example if the electronic device is an advertising a display, an advertisement targeted at a particular mobile terminal or group of mobile terminals may be displayed. Information about the preferences of a mobile terminal user may be obtained from the core network by the platform 700. For example, if it is known to the core network that the user frequents a particular fast food restaurant, and the mobile terminal is approaching an outlet of that fast food restaurant, an appropriate advertisement may be displayed.

The application 1410 may instruct the external resource to move to a new location. For example, the external resource may be a street cleaner or neighbourhood security patrol. If it is detected that there is a low density of mobile terminals at the current position of the external resource, and a high density of mobile terminals at a different location, then the street cleaner or neighbourhood security patrol may be instructed to move to the location with a higher density of mobile terminals as it is more likely that their services may be required.

The platform 700 may further be operable to instruct the external resource to alter its physical direction to focus on a specific geographic area or space. For example, the external resource may be a security camera or other monitoring apparatus, and the area monitored may be varied in dependence upon the location, density etc of mobile terminals.

Figure 21:
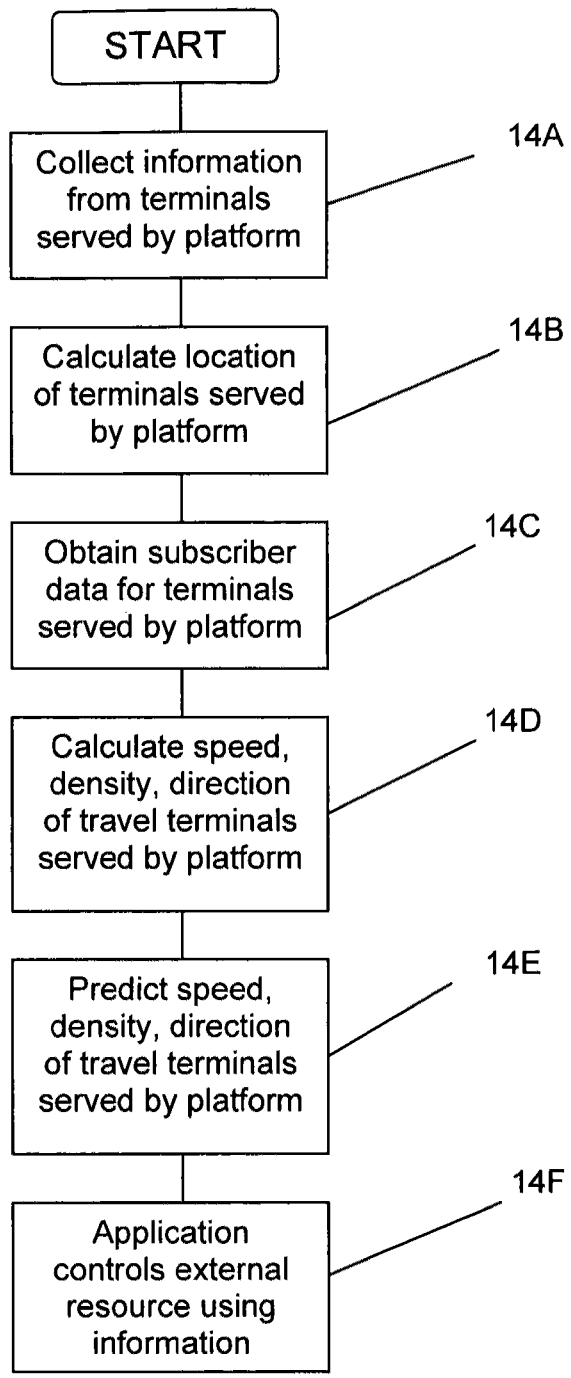
FIG. 21 is a flow chart showing the procedures for performing the control according to an embodiment of the system described herein.

An example of the processes performed at the platform 700 may now be given with reference to the flow chart of FIG. 21.

At step 14A the soft nodes part 702 of the platform 700 collects information from the mobile terminals served by the platform 700. This information includes signal strength measurements from base stations, time advance information, etc. The information may also include the time between a particular packet of data being sent to a mobile terminal and the acknowledgement of receipt of that packet from the terminal. The information may also include information such as GPS data from the mobile terminals.

At step 14B the platform 700 calculates the location of the mobile terminals served by the platform. This can be done using the information collected at step 14A. If necessary to calculate the location of a mobile terminal, that mobile terminal may be instructed to move from the idle communication state to the active/connected communication state by one of the mechanisms mentioned above. When the mobile terminal is in the active/connected communication state, the time that it takes for a particular packet of data to be sent and acknowledged can be determined, and this may be used to estimate the location of the mobile terminal.

At step 14C the platform may obtain subscriber data for the terminals served by the platform from the core network (or from a store within the platform 700 if this information has previously been obtained). This information may include the terminal type, ARPU, etc. For example, it may be indicated whether the terminal is a hand held mobile device, a terminal fixed to a vehicle or a terminal forming part of a portable computer.

At step 14D the speed, density and direction of travel of terminal served by the platform are calculated. If the location of a particular terminal is calculated at two spaced apart time intervals, then the speed and direction of travel can be calculated. If the location of each terminal (or a selection of the terminals) served by the platform 700 can be detected, then the density of mobile terminals at particular locations served by the platform 700 can be calculated.

At step 14E the platform may predict the future speed, density and direction of travel of terminals served by the platform.

At step 14F the application hosted by the platform 700 may control the external resource using the information connected to a calculated in steps 14A to 14E.

Mobile CCTV (P100939-GB-PSP)

Increasingly we live in a surveillance society where our safety is being monitored by the government through CCTV. In some deployments the cameras can be accessed in real time; in others the video is stored for use later in determining what happened or what caused an event.

This analysis after the event is useful for learning lessons and to try to stop a situation happening again by introducing safeguards/guidelines; but it does not stop the situation happening in the first place. For this to happen all the information recorded needs to be analysed in real time; but when a CCTV camera is mobile; the information needs to be transmitted over a radio network.

If a mobile operator were to support this service from the buses in London: if each camera captures video at 512 kbps, each bus has 4 cameras; and there are approximately 7000 buses; which would mean that the mobile network would need to carry 14 Gbps of data for this service alone. If an operator has approximately 2000 cells in the area it would equate to 7 Mbps per cell. However, buses congregate in areas, e.g., bus stations or central locations, which would create much high congestion in areas of the network potentially impacting the experience of other network users.

This embodiment introduces functionality into the services/application environment 706 of the platform 700 which enables the radio resources to be used more effectively. The new application controls when and where the recorded material is sent to the network, and what bandwidth should be used to transfer the information. Although the embodiment mainly refers to the transmission of video data, it should be appreciated that the invention is generally applicable to optimising the transmission of data.

Some examples will now be briefly described.

Infrared

The new application instructs the camera to periodically take images using infrared to understand whether there are any new heat sources within the picture; and these images are passed to the network for analysis.

Adaptation of Content

The content of the video can be analysed in the services/application environment 706 at the platform; and if it is determined that there is risk then the quality of the images are increased, e.g., moving from IR to Visible light. If it is determined to be a lower risk then the quality is decreased.

The adaptation of the content may take into account cell specific information on load and information on the quality of the radio link between the mobile device and the network.

Storage at the Device

The camera stores the captured images at a high quality. If the application at the platform 700 determines there has been a change to a higher perceived risk, the application requests the camera send a higher quality version of the last minutes of content for further analysis.

Reference Library

When the perspective of the CCTV is fixed, the picture that the camera detects may vary dramatically dependent purely based on the lighting conditions, e.g., as a bus moves between areas in sunlight to areas of shade; to times when internal lighting provides the only luminance. The application at the platform 700 can understand this variance and indicate that the image is within normal error margins of one of reference images. When the application selects which images to return to the network, it selects the images which differ the most from the reference.

The use of face recognition information may be used by the application to determine which images are best to return to the network; if there is a big variation from the reference but no facial recognition was possible then this can be treated as a trigger to raise the risk, and therefore the application may recall higher quality information from the camera for analysis.

As discussed above, the platform 700 allows application environments to move closer to the radio site. This enables more complex functions to be moved to the Radio Access Network and for them to be hosted on the platform 700. That is, the services part 706 of the platform 700 may host applications (e.g., 740 and 742). The applications may be hosted by a platform 700 at access node 800 at the NodeB or at the Femto, or at the AP site or at the gateway 802 at the RNC or BRAS site of the network Also, as devices such as telephones and laptops become increasingly more advanced, additional functionality can be implemented in the application and operating system environment of these devices, allowing the devices to play a greater role in the end-to-end data pipe.

Figure 22:
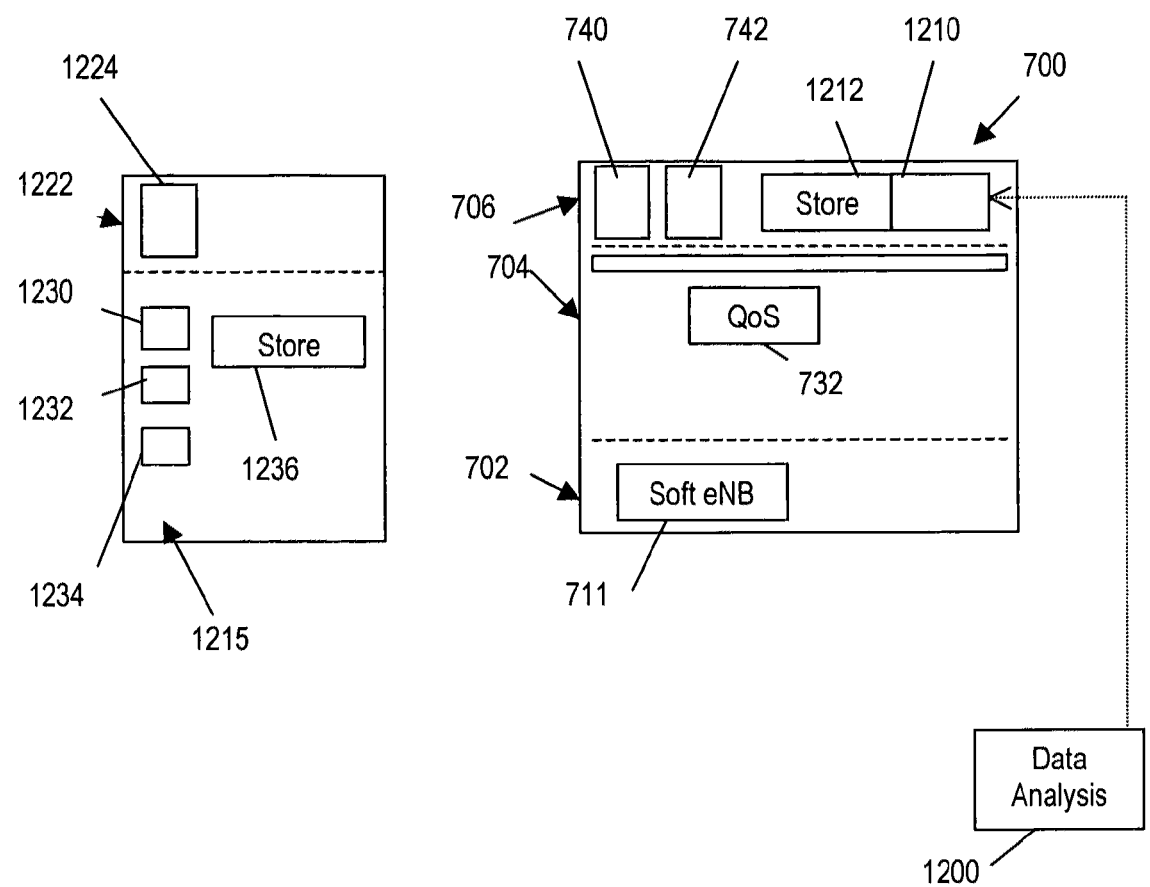
FIG. 22 shows a mobile terminal and platform which host applications, and for providing data to a data analyser according to an embodiment of the system described herein.

The platform 700, in the services part 706, hosts data receiving and forwarding application 1210 (FIG. 22). The data receiving and forwarding application 1210 has an associated electronic store (memory 1212). The data receiving and forwarding application 1210 forwards data to a data analyser 1200.

The platform 700:

Makes measurements of the radio load;

Identifies the frequency and technology layer the subscriber is currently using;

Makes measurements of 2G/3G/4G user coverage/distance from the site per technology, and the overlapped coverage areas;

Makes measurements of Quality of the radio link to the subscriber;

Identifies the device type used by the subscriber/client;

Assesses the properties of that technology/frequency in a specific cell/location.

These measurements may be received at the soft nodes 702 (e.g., eNodeB 711) and passed to functions part 704 (e.g., QoS function 732).

The functions part 704 (e.g., QoS function 732) may then pass this information to the data receiving and forwarding application 1210 hosted on the platform 700.

The terminal 1215 includes services part 1222 (application layer) which hosts on-terminal application 1224. The application 1224 controls sensors 1230, 1232 and 1234 provided on the terminal 1215, and also controls the electronic data store (memory) 1236. A first sensor 1230 may be a camera sensitive to visible light. The second sensor 1232 may be a camera sensitive to infra red radiation. The third sensor 1234 may be a location detection sensor, for example using GPS. Further sensors may be provided in dependence upon the circumstances. Also, any of the aforementioned sensors may be omitted, in dependence upon the circumstances.

The terminal 1215 may be a conventional mobile terminal that is carried by a user and is hand-held. Alternatively, the terminal may be mounted on a vehicle, and so moves when the vehicle moves. Further alternatively, the terminal 1215 may be substantially fixed in position. For example, the terminal 1215 may be mounted on a building or on an item of street furniture such as a lamp post. If the terminal 1215 is fixed, then the sensors may be large items and therefore capable of generally producing higher quality output (for example, generally larger cameras produce higher quality images). Further, if the terminal 1215 is substantially fixed, it can be connected to the mains power supply, and so battery depletion is no longer a concern.

The application 1212 on the platform 700 controls the on-terminal application 1224 on the terminal 1215. The on-terminal application 1224 controls when outputs from the sensors 1230, 1232 and 1234 are recorded, and when they are stored in the store 1236.

In general, the sensors 1230, 1232 and 1234 may measure the environment local to the terminal 1215. The visible light camera 1230 and infra red camera 1232 capture images or sequences of images of the locality of the terminal 1215. The images obtained from the cameras 1230 and 1232 may be used to detect movement. Movement may also be detected by any other suitable form of movement sensor. The cameras 1230 and 1232 may capture variations of lighting in the locality of the terminal 1215. Other sensors for capturing variation in lighting in the locality of the terminal may also be provided. The infra red camera 1232 may capture variations in temperature in the locality of the terminal 1215. Other sensors for measuring temperature may be provided additionally or alternatively to the infra red camera 1232.

If the terminal 1215 is in a fixed position, then the location sensor 1234 may be superfluous, as the location of the terminal 1215 may be provided in a database accessible by the data analyser 1200 and/or platform 700.

The data analyser 1200 receives data from various terminals (such as terminal 1215) and performs analysis of the data. For example, if image data is captured by the terminals, this image data may be analysed automatically by the data analyser 1200, or may be displayed for manual review by an operator. The data analyser 1200 works in a generally conventional way to allow surveillance to be performed.

Providing data to the data analyser 1200 conventionally is problematical when the source of the data provides the data over a wireless network. As discussed above, this would require very significant bandwidth in the wireless network. This is particularly a problem because conventionally the wireless network acts as a bit-pipe and simply passes data (such as CCTV) images via the radio access network and the core network to the data analyser 1200.

The novel platform 700 allows the data receiving and forwarding application 1210 to be provided close to the radio site/network edge. The data receiving and forwarding application 1210 allows the control of the mobile terminal 1215, via the on-terminal application 1224, and the intelligent management of data transfer between the terminal 1215 and the platform 700, and between the platform 700 and the data analyser 1200 (via the core network or optionally via the off load path—e.g., via direct links 806, 808 to Internet 8).

The on-terminal application 1224 of the terminal 1215 controls the transmission of data from the store 1236 via the radio access network to the platform 700. The data in this store 1236 is obtained from the sensors 1230, 1232 and 1234 under control of the on-terminal application 1224.

When the data is received from the terminal 1215 by the platform 700, it is passed to the data receiving and forwarding application 1210. The data receiving and forwarding application 1210 also receives data about the quality of the radio link to the terminal 1215 (for example from the QoS function 732) of the network functions part 704 of the platform 700. The data receiving and forwarding application 1210 further receives information from the data analyser 1200, such as the available resources of the data analyser 1200. The data receiving and forwarding application 1210 further receives information from the telecommunications network, such as subscription for information relating to the mobile terminal 1215. For example, the terminal 1215 (and other similar terminals) may be administered by an authority which has a subscription with the network operator to provide data from the terminals 1215 to the data analyser 1200. The network may provide to the data receiving and forwarding application 1210 information such as the subscription priority, the charging rate and the associated Service Level Agreement between the network operator and the subscriber. Additionally, the data receiving and forwarding application 1210 may receive information about the status of the store 1212 (such as the spare capacity available).

Based on the various information provided to the data receiving and forwarding application 1210, the application controls 1210 the operation of the on-terminal application 1224 on the terminal 1215. For example, the data receiving and forwarding application 1210 may instruct the on-terminal application 1224 to modify resolution of images transmitted in the data to the platform 700.

The cameras 1230 and 1232 generally capture images at high resolution. The high resolution images are stored in the store 1236. The on-terminal application 1224 is operable to modify the resolution (or other form) of the images from the store 1236 before they are transmitted.

The data receiving and forwarding application 1210 may instruct the on-terminal application 1224 to adjust the resolution of images transmitted in dependence upon the circumstances. For example, the data receiving and forwarding application 1210 may determine from images previously delivered that there is a significant change to the images captured (indicating significant activity in the region of the terminal 1215). Also, the data receiving and forwarding application 1210 may include face recognition software which may identify the presence of a known criminal (or other person that it is desired to detect). In response to an event of this type, the data receiving and forwarding application 1210 may instruct the on-terminal application 1224 to transmit higher resolution images than would normally be transmitted. These higher resolution images may of course use greater bandwidth, but this may be justified because the images are likely to be highly relevant.

The data receiving and forwarding application 1210 may also instruct the on-terminal application 1224 to vary the resolution of images transmitted in dependence upon other factors (external resource availability), such as the radio quality/capacity, spare capacity in the store 1212 and resources of the data analyser 1200. For example, if the radio quality/capacity is poor, then the on-terminal application 1224 may be instructed to transmit images at a lower resolution.

In addition to instructing a variation of the resolution of the image, the data receiving and forwarding application 1210 may also instruct the on-terminal application 1224 to change the form or format of the images transmitted. For example, the images may be transmitted with a higher or lower level of compression, in dependence upon the circumstances.

The data receiving and forwarding application 1210 may also instruct the on-terminal application 1224 to prioritise data from particular ones of the sensors 1230, 1232 and 1234. For example, the data receiving and forwarding application 1210 may request that the on-terminal application 1224 transmits images from the visible light camera 1230 during day light hours and from the infra red camera 1232 during night time (or in other special circumstances). The frequency with which data sensors is transmitted may be controlled by the application 1212 sending an appropriate control command to the on-terminal application 1224. The data receiving and forwarding application 1210 may also instruct the on-terminal application 1224 to control how frequently outputs from the sensors 1230, 1232 and 1234 are stored in the store 1236 of the terminal 1215. The data receiving and forwarding application 1210 may instruct the on-terminal application 1224 to vary the quality and compression of data from the sensors 1230, 1232 and 1234 stored in the store 1236. As mentioned above, generally the store 1236 may store higher resolution and uncompressed data from the sensors 1230, 1232 and 1234. This is generally advantageous, even if the on-terminal application 1224 is instructed by the data receiving and forwarding application 1210 to transmit the data in a lower resolution or more compressed form, because, at a later time, it may be determined that such data is significant, and it may then be re-transmitted in a higher resolution, uncompress form for more detailed analysis.

The resolution/compression of data transmission may also be varied by the data receiving and forwarding application 1210 in dependence upon not just current factors, but also predicted future factors. For example, the congestion in the area of the cell served by the platform 700 may follow a particular pattern over a 24 hour period. The data receiving and forwarding application 1210 may instruct the on-terminal application 1224 to reduce the resolution/increase the compression of data at particular times on the basis of predicted congestion.

The on-terminal application 1224 may provide the data receiving and forwarding application 1210 with information about the available capacity of the store 1236 of the terminal 1215. If the store 1236 is becoming full, the data receiving and forwarding application 1210 instruct the on-terminal application 1224 to reduce the resolution/increase the compression of data from the sensors 1230, 1232 and 1234 stored in the store 1236.

In addition to controlling the frequency with which the sensors 1230, 1232 and 1234 capture data and store this in the store 1236, the data receiving and forwarding application 1210 may also control the frequency with which the data is retrieved from the store 1236 and transmitted by the on-terminal application 1224 to the platform 700. The data receiving and forwarding application 1210 may instruct the on-terminal application 1224 to optimise the data before transmission to the platform 700. This optimisation may be performed by the on-terminal application 1224 on the basis of information provided by the data receiving and forwarding application 1210, or on the basis of other information available to the on-terminal application 1224, such as radio measurements taken by the terminal 1215.

Another input to the data receiving and forwarding application 1210 is availability of resources on the backhaul connection between the data receiving and forwarding application 1210 and the data analyser 1200. If the data are transmitted through the core network, then the available resources may be less than if the offload path is used.

The data receiving and forwarding application 1210 adjust the resolution/quality/compression of data sent to the data analyser 1200 in dependence upon the backhaul quality.

The data receiving and forwarding application 1210 may also adjust the quality/resolution/compression of data sent to the data analyser 1200 in dependence upon the resources of the data analyser 1200. For example, if the data analyser has low available processing power or low available memory, then a lower quality/resolution/higher compression of data may be implemented by the data receiving and forwarding application 1210 before transmitting that data to the data analyser 1200.

When the application 1210 receives data from the on-terminal application 1224 this is stored in the associated store 1212. The data receiving and forwarding application 1210 is operable to analyse the data to determine how important that data is. For example, the data receiving and forwarding application 1210 may compare captured images to reference images for the location of the terminal 1215. If there is a significant difference between the captured image and reference image, then the captured image may be determined to be important, and therefore it may be more important to deliver this data promptly to the data analyser 1200. The data receiving and forwarding application 1210 may also include facial recognition functionality and may have a database of faces of known criminals or other persons whose location is to be tracked. If the data receiving and forwarding application 1210 determines that a wanted person is present in an image, then it is of high importance that this image is delivered promptly to the data analyser 1200. The application 1210 may detect other patterns, such as vehicle registration marks.

The data receiving and forwarding application 1210 may also examine the data in the store 1212 to determine whether this can be further optimised or subject to further transcoding before transmission to the data analyser 1200.

The data receiving and forwarding application 1210 may receive data from a plurality of terminals 1215 which are served by the platform 700 (and possibly which are served by other platforms). The data receiving and forwarding application 1210 may aggregate the data from the multiple terminals prior to transmitting this to the data analyser 1200.

As mentioned above, this embodiment makes particular reference to the sensors capturing images. However, it should be appreciated that the invention is not restricted to imaging. The invention is concerned with managing when and how data from a terminal are transmitted. The platform allows data from the terminal to be transmitted in an intelligent manner and in real time but optimises use of network resources.

Evolved Femto Architecture (P100938-GB-PSP)

The current Femto Architecture (e.g., as shown in FIG. 1) was designed in a manner to maintain the existing architecture of the mobile network whilst removing cost. This cost reduction was achieved by implementing a low power base station on consumer grade hardware.

The challenge this architecture introduces is that the femto architecture is difficult to integrate into the existing telecoms network; handovers between the femto and the operator's macro network are problematic to configure and it is a challenge to maintain quality.

The platform 700 allows application environments to move closer to the network edge/radio site. This enables more complex functions to be moved to the network edge/radio site and for them to be hosted at the site, i.e. within the Radio Access Network.

As discussed above, the platform 700 allows application environments to move closer to the radio site. This enables more complex functions to be moved to the Radio Access Network and for them to be hosted on the platform 700. That is, the services part 706 of the platform 700 may host applications. The applications may be hosted by a platform 700 at access node 800 at the NodeB or at the Femto/AP (access point) site or at the gateway 802 at the RNC or BRAS site of the network.

The platform 700, in the services part 706, hosts an access point concentrator application 1410.

The platform 700:
Makes measurements of the radio load;
Identifies the frequency and technology layer the subscriber is currently using;
Makes measurements of 2G/3G/4G user coverage/distance from the site per technology, and the overlapped coverage areas;
Makes measurements of Quality of the radio link to the subscriber;
Identifies the device type used by the subscriber/client;
Assesses the properties of that technology/frequency in a specific cell/location.

These measurements (and other information) may be received at the soft nodes 702 (e.g., eNodeB 711) and passed to functions part 704 (e.g., QoS function 732).

The functions part 704 (e.g., QoS function 732) may then pass all or selected parts of this information to the concentrator application 1410 hosted on the platform 700.

Because the access node associated with the base station with which the terminal 1440 is registered is in the radio access network close to the terminal 1440, the concentrator application 1410 is able to receive from soft nodes 702 and network functions 704 parts of the platform 700 information relating to the quality of connection and or radio conditions (from QoS function 732) and terminal 1440 location (from location function 722). The location data may be calculated from GPS data provided by the terminal 1440, or may be calculated by another suitable mechanism, such as cell triangulation or calculating the time that it takes for a transmitted data packet to be acknowledged by the terminal 1440. Various other location determining the arrangements are known to those skilled in the art that may be suitable for implementation.

As mentioned above, mobile networks such as 2G (GSM), 3G (UMTS) and 4G (LTE) telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal), which calculates an average (mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Handover and cell reselection are performed in the same way for APs. It is desirable for mobile terminals to provide continuous service when moving within an SAE/LTE coverage area and between an SAE/LTE and a UMTS coverage area/2G coverage area, and to/from APs.

In a mobile network operating in accordance with the 3G (UMTS) Standards, a mobile terminal device (UE) has a so-called "RRC (Radio Resource Control) state" which depends on its state of activity. In the respective RRC states different functions for mobility are executed. These functions are described in technical specification 3GPP TS 25.304/25.331.

For 2G and 3G, a mobile terminal is in active communication when it has a CS (Circuit Switched) connection established.

In 2.5G, GPRS PS (Packet Switched), active communication can be defined as the GPRS Ready state. In 3G UMTS PS, active communication can be defined as the RRC connected mode state that is CELL-DCH.

In 3G UMTS PS, CELL/URA_PCH and CELL_FACH can be defined as inactive states. In GPRS, the Standby state can be regarded as an inactive state.

Either one or both of the CS and PS active communications may occur in the mobile terminal.

For a 3G mobile terminal, in the active mode the terminal is in the RRC connected mode. The RRC connected mode includes the following states:
CELL_DCH state is characterized by:
A dedicated physical channel is allocated to the UE in uplink and downlink.
The UE is known on cell level according to its current active set
Dedicated transport channels, downlink and uplink (TDD) shared transport channels and a combination of these transport channels can be used by the UE.
CELL_FACH state is characterized by:
No dedicated physical channel is allocated to the UE.
The UE continuously monitors a FACH (forward access channel) in the downlink.
The UE is assigned a default common or shared transport channel in the uplink (e.g., RACH) that it can use anytime according to the access procedure for that transport channel.
The position of the UE is known by UTRAN on cell level according to the cell where the UE last made a cell update.
In TDD mode, one or several USCH or DSCH transport channels may have been established.
CELL_PCH state is characterized by:
No dedicated physical channel is allocated to the UE. The UE selects a PCH (paging channel) with the algorithm, and uses DRX for monitoring the selected PCH via an associated PCH.
No uplink activity is possible.
The position of the UE is known by UTRAN on cell level according to the cell where the UE last made a cell update in CELL_FACH state.

URA_PCH state is characterized by:
No dedicated channel is allocated to the UE. The UE selects a PCH, and uses DRX for monitoring the selected PCH via an associated PCH.
No uplink activity is possible.
The location of the UE is known on UTRAN routing area level according to the URA assigned to the UE during the last URA update in CELL-FACH state.

In the CELL_DCH state a network-driven handover is performed when necessary, as described in 3GPP TS 25-331, which is incorporated by reference herein. In this state a mobile terminal scans the pilot channels of up to 32 intra-frequency cells neighbouring its current cell. The mobile terminal forms a list of the best cells for possible handover based on the received signal strength and/or quality (i.e. the error rate in the received signal). The information in this list is passed to the UTRAN RNC on an event-driven basis, e.g., when the signal strength or signal-to-noise ratio of one of the cells exceeds a threshold. The information list is used by a handover algorithm implemented in the UTRAN RNC. The algorithm that determines when handover occurs is not specified in the GSM or UMTS Standards. The algorithms essentially trigger a handover when the mobile terminal provides a measurement of a neighbour cell received signal at the mobile terminal below a predetermined quality received threshold, which typically has a relation to the quality of the received signal from the serving cell (e.g., better quality by some margin).

In the "CELL_FACH", "CELL_PCH", "URA_PCH" or "idle mode" the mobile terminal controls its own mobility independently and starts a cell switch (reselection) when a neighbouring cell has a better quality than the current cell, as described in 3GPP TS 25.304, which is incorporated by reference herein. A similar procedure is also used in GSM/GPRS mobile networks, as described in technical specification 3GPP TS 05.08 (UE-based cell reselection), which is incorporated by reference herein.

In general, a mobile terminal in "idle mode" states and in RRC connected mode (inactive) states "CELL_FACH", "CELL_PCH" and "URA_PCH" performs periodic measurements of its own as well as of a series of neighbouring cells. Information from the neighbouring cells is broadcast in the system information block 11 (SIB11) or system information block 12 (SIB12) of the broadcast channel (BCH) as described in 3GPP TS 25.304 and 3GPP TS 25.331, which are both incorporated by reference herein.

In order to avoid a cell switch based on short-term changes in the radio field conditions, so-called "fading", and the subsequent return to the original cell, a UMTS system mainly uses two parameters that are emitted in the Broadcast Channel (BCH) in the system information block 3 (SIB3) or system information block 4 (SIB4). Notably, these are the time interval "Treselection" and the hysteresis value "Qhyst". In order to avoid too fast a switch between cells based on quickly changing network conditions, a switch from the original cell to the neighbouring cell only takes place if the neighbouring cell was better than the original cell by the factor "Qhyst" for the time "Treselection". This behaviour of a mobile end device is described in detail on the technical specification 3GPP TS 25.304. Multiple frequency layers and mobility state determination are provided in a similar manner for LTE/SAE networks.

If the power and/or quality of the radio signal received at the mobile terminal 1440 registered with an AP becomes relatively low then the cell reselection process is triggered. In this process the power and/or quality of the neighbouring base stations (including base station 1) is evaluated in the manner described above. If a neighbouring base station provides improved radio quality, then the reselection process can be completed in a conventional manner.

The following parameters used to control the reselection process may now be described in more detail:

Sintersearch

The Sintersearch information element is described in 3GPP TS 25.331 and 3GPP TS 25.304, and is sent in SIB3. Sintersearch controls whether the mobile device 1440 must make measurements of inter-frequency cells while camped on a particular "serving cell". If the quality of the serving cell is above Sintersearch, then the UE may not measure other inter-frequency cells while camped.

The Sintersearch value is conventionally the same for all base stations (including APs) in a network.

Sintrasearch

The Sintrasearch information element is described in 3GPP TS 25.331 and 3GPP TS 25.304, and is sent in SIB3. Sintrasearch controls whether the mobile terminal 1440 must make measurements of intra-frequency cells while camped. If the quality of the serving cell is above Sintrasearch, then the UE may not measure other intra-frequency cells while camped.

The Sintrasearch value is conventionally the same for all base stations (including APs) in a network.

Quality Measure

The 3GPP TS 25.331, "Cell selection and reselection quality measure" information element may be RSCP (Received Signal Code Power) and/or the ratio Ec/No (the ratio of the energy per chip, Ec, received by the mobile terminal to the spectral noise power density, No, received by the mobile terminal 1440, with allowance made for non-orthognobility).

Hysteresis 1 (Qhyst1 or Qoffset1)

Qhyst1 (see 3GPP TS 25.331) specifies the hysteresis value to be used by the mobile device 1440 if the Quality Measure is CPICH RSCP. Reselection of a neighbouring cell only takes place if the neighbouring cell is better in coverage than home AP by the factor Qoffset1 for a predetermined time ("Treselection").

Hysteresis 2 (Qhyst2 or Qoffset 2)

Qhyst2 (see 3GPP TS 25.331) specifies the hysteresis value to be used by the mobile device 1440 if the Quality Measure is CPICH Ec/Io. Reselection of a neighbouring cell only takes place if the neighbouring cell is better in quality than the home AP20 by the factor Qoffset2 for a predetermined time ("Treselection").

In accordance with a feature of the embodiment, Sintersearch, Sintrasearch, Qoffset 1 and Qoffset 2, or any other reselection parameter may be varied by the concentrator 1410. These changes are communicated by the concentrator 1410 to the mobile terminals.

The effect of varying these values is as follows: —

Sintrasearch

When this value is increased by the concentrator 1410, the mobile terminal 1440 starts intra-frequency cell reselection earlier (i.e. when the quality of the serving cell is higher than conventionally).

When this value is decreased by the concentrator 1410, the mobile terminal 1440 starts infra-frequency cell reselection later (i.e. when the quality of the serving cell is lower than conventionally).

Sintersearch

When this value is increased by the concentrator 1410, the mobile terminal 1440 starts inter-frequency cell reselection earlier (i.e. when the quality of the serving cell is higher than conventionally).

When this value is decreased by the serving cell, the mobile terminal starts inter-frequency cell reselection later (i.e. when the quality of the serving cell is lower than conventionally)

Qoffset 1(s,n); applies to R (reselection) rule with CPICH RSCP

When this value is increased by the concentrator 1410, the mobile terminal 1440 has a lower probability of selecting a neighbouring cell.

When this value is decreased by the concentrator 1410, the mobile terminal 1440 has a higher probability of selecting a neighbouring cell.

Qoffset2(s,n): applies to R (reselection) rule with CPICH Ec/Io

When this value is increased by the concentrator 1410, the mobile terminal 1440 has a lower probability of selecting a neighbouring cell.

When this value is decreased by the concentrator 1410, the mobile terminal 1440 has a higher probability of selecting a neighbouring cell.

Offset 1 and 2 are only used together with the Sintersearch parameter for the interfrequency mobility. The parameters Qoffset 1 and 2 are unchanged for the infrafrequency case. However, the concentrator 1410 may choose to change these parameters to ease the idle mode mobility from the femto cell to neighbouring 3G macro base station on the different carrier in case of high interference.

The concentrator 1410 includes a detector module for measuring RSCP and/or Ec/Io of the neighbouring base stations (including macro base stations and other APs) which use the same carrier or a different carrier when the Sintersearch and Sintrasearch parameters so indicated.

The concentrator 1410 is also aware of the RSCP and/or Ec/Io between itself and mobile terminal 1440. The concentrator 1410 is therefore able to characterise its RSCP and/or Ec/Io with respect to the mobile terminal as "high" or "low". The concentrator 1410 is also able to characterise the RSCP and/or Ec/Io of the neighbouring base stations on the same carrier and on a different carrier as "high" or "low" (at the location of the AP). The concentrator 1410 may include software that, in dependence upon the high or low characterization, provides instructions to the mobile terminal 1440 to adjust the parameters Sintersearch, Sintrasearch, Qoffset1 and Qoffset2 (or any other reselection parameter).

The modification of reselection parameters has been described above. Handover parameters may be amended by the concentrator 1410 to vary under what conditions a handover may occur.

Figure 23:
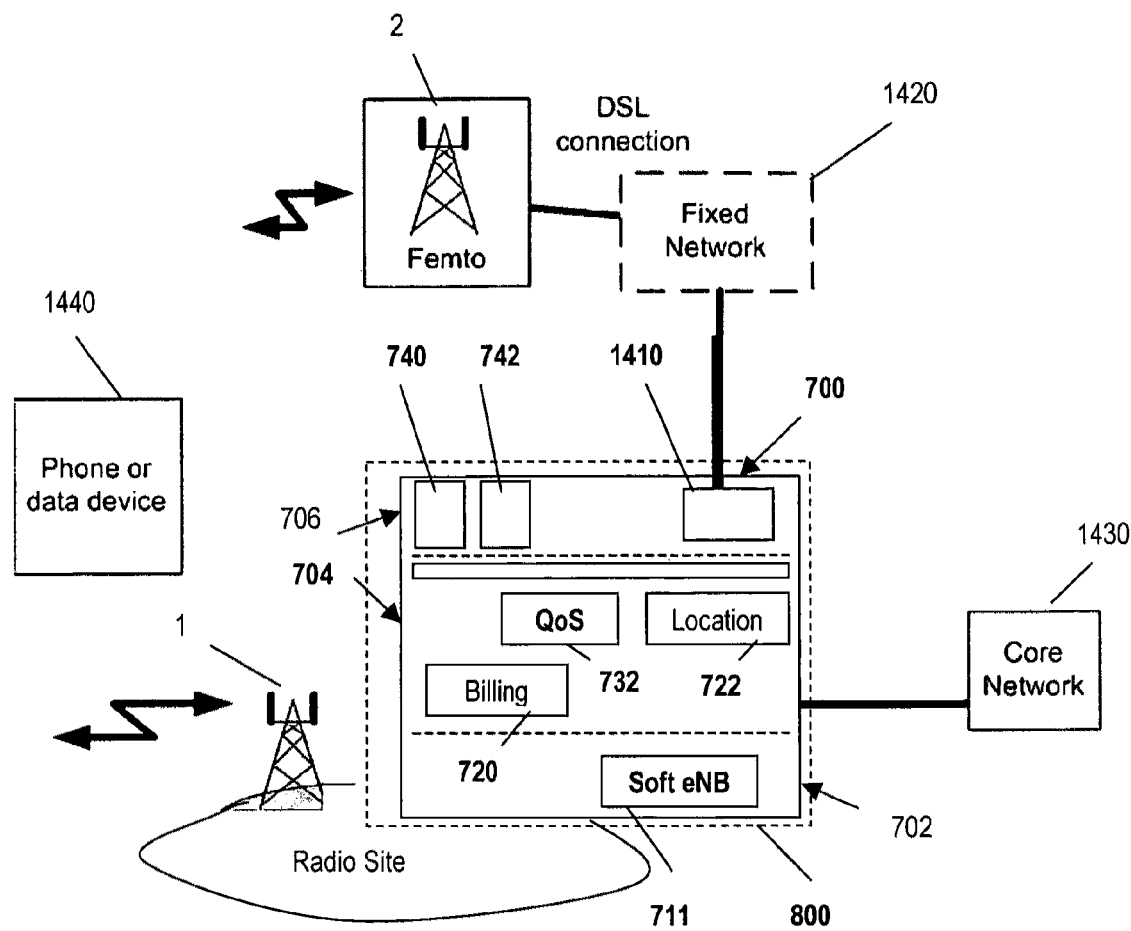
FIG. 23 shows an improved femto architecture in accordance with according to an embodiment of the system described herein.

In this embodiment, as shown in FIG. 23, the femto architecture is modified such that APs (femtos) connect to the services/application environment 706 of the nearest platform 700 allowing them to be incorporated tighter into the network.

The services/Application environment 706 of the platform 700 can then serve common applications to the mobile device independently of whether it is on the macro 1 or AP/femto 2 cells, providing a more seamless experience across the accesses.

The platform 700 controls the movement of the mobile devices in a more seamless manner, using the femto site as a capacity layer; as the load information of the femto and macro networks are readily available at one location. When the DSL network used by the femto 2 becomes congested the mobile device can be pushed to the macro network to maintain user experience.

The services/application environment 702 of the platform may include the AP/femto concentrator 1410. When the mobile device is creating too much interference to a neighbouring femto this can be managed by the femto concentrator 1410 in the platform 700 as it is likely to also be controlling the adjacent AP/femto.

When the AP/femto is powered on it takes measurements of its radio environment to determine whether it can see any macro cells; these would be used with the registered address information to determine the most suitable platform 700 to use as a AP/femto concentrator.

Typically the platform 700 providing these functions to femtos may be provided at an access node 800. In areas where there is no macro coverage a centralised femto concentrator 1410 can be used, which may be provided at the gateway 802.

The embodiment may now be described in more detail. As discussed above, the services part 706 of the platform includes a concentrator 1410, in addition to other applications 740,742. A platform of this type may be provided at an access node 800, at a gateway node 802 or at the base station or at the RNC.

The soft nodes part 702 of the platform 700 provides baseband functions. Corresponding radio frequency functions are provided by a macro base station 1 and one or more access points 2. The access points 2 may be connected to the platform 700 via a DSL connection and a fixed network 1420 as shown in FIG. 23, or may be connected by a different arrangement. The platform 700 is connected to the core network 1430 by an appropriate backhaul connection.

The access point 2 is connected to the core network via an IP link (such as the DSL connection) that links the access point 2 to the platform 700.

Macro base station 1 is generally associated with a particular platform in order to provide radio frequency functions for that platform. The relationship between an access point 2 and the platform 700 is not necessarily so predetermined. The access point 2 may potentially be connected to any platform within the network via an appropriate IP link. When the access point 2 is initiated it measures its radio environment to identify macro cells within its radio coverage area. The access point 2 obtains identification information from the macro base stations (such as macro base station 1), and sends this to the core network 1430 via the IP link. The core network 1430 has a database of the location of each of the macro base stations and also a database of the location of each of the platforms 700. The core network uses the macro base station information provided by the femto 2 to determine the most appropriate platform for the access point 2 to register with. Once the access point 2 is registered with a platform 700, radio frequency communications received from mobile terminals such as terminal 1440 are routed to the platform 700 via the IP link.

If the access point 2 is unable to identify any macro base station within its radio coverage area, then the access point 2 may register with the platform provided at a gateway location 802, rather than an access node location 800.

The concentrator 1410 of the platform 700 controls and facilitates communication with one or more access points 2. The platform 700 provides a common interface for access points 2 and macro base stations 1 to the core network 1430. Communications between the platform 700 and the core network 1430 are in the same format irrespective of whether they originate from an access point 2 or a macro base station 1.

The concentrator 1410 controls each of the access points 2 registered with the platform 700 and may control which mobile terminals 1440 are registered with each access point 2.

The platform 700 provides service and network functions to mobile terminals 1440 connected to the platform 700 via the access points 2. Services may be provided by one or more applications 740,742 hosted in the services part 706 of the platform 700.

The platform 700 is aware of whether the mobile terminal 1440 is connected thereto via the macro base station 1 or the access point 2. The platform 700 is configured to provide service to the mobile terminal 1440 irrespective of whether the mobile terminal 1440 communicates via the macro base station 1 or one or more of the access points 2.

As discussed above, the platform 700 receives information relating to the radio conditions for each of the mobile terminals 1440. The radio conditions may be radio conditions experienced by the mobile terminal 1440 communicating with the macro base station 1 or with the access point 2. The platform 700 is also aware of the quality and capacity of the backhaul link to the core network 1430. As discussed above, instead of this conventional backhaul link, data may be selectively offloaded from the core network where appropriate. The quality of this offloaded link is also monitored by the platform 700.

The platform 700 is operable to control the handover or reselection of the mobile terminal 1440 between the macro base station 1 and one or more access points 2 in dependence upon the radio quality/communication capacity information.

The platform 700 may modify the handover parameters and/or cell reselection parameters for the mobile terminal 1440 (as described above) based on the radio quality measurements received from mobile terminal (via its current link with the macro base station 1 or access point 2 with which it is currently registered). By modifying the handover parameters and/or cell reselection parameters of the mobile terminal 1440, the likelihood that the mobile terminal 1440 hands over to or reselects a different macro base station 1 or access point 2 may be increased or decreased. The parameters that may be varied may include the "Sintersearch", "Sintrasearch", "Quality measure", "hysteresis 1", "hysteresis 2" etc discussed above. In this way the concentrator 1410 of the platform 700 have make it more or less likely that the mobile terminal 1440 moves from a macro base station 1 to an access point 2, from an access point 2 to a macro base station 1, or between an access points 2. By varying the parameters significantly, the concentrator 1410 of the platform 700 can almost certainly cause the mobile terminal 1440 to handover/reselect.

The handover and/or cell reselection parameters may be varied in dependence upon the location or speed of the mobile terminal 1440, for example, as determined by the location function 722. The location or speed information may be used to determine the current or predicted future location of the mobile terminal, and to determine whether there is an appropriate access point 2 at that location. The handover/reselection parameters may then be varied to favour handover to or reselection of that access point.

The platform 700 may also vary the handover parameters and/or cell reselection parameters in dependence upon other factors, such as the type of subscription that the user of the mobile terminal 1440 has with the network (which subscription information may be obtained by a platform 700 from the core network 1430). The parameters may also be varied in dependence upon historic measurements of the quality and reliability of a particular access point (with an access point 2 that has historically a low quality or low reliability being less favoured by the variation in the parameters, for example). The platform 700 may also be operable to predict the user experience that the user of the mobile terminal 1440 is likely to receive from the access point 2 or the macro base station 1, and may vary the parameters to favour the one of these that may provide the best user experience.

The cell reselection and/or handover parameters may be modified in dependence upon the service requirement of services and applications 740,742 being used by the mobile terminal 1440.

The cell reselection and/or handover parameters of each access point 2 may be varied in real time by the platform 700 so that the network can respond quickly to changes in radio conditions and the other criteria mentioned above.

The platform 700 may be aware of the location of each of the mobile terminals 1440 that is served by means of the location function 722. The platform 700 may be operable to detect when there are no mobile terminals in the coverage area of a particular access point 2, and may power down the access point in dependence thereon. Likewise, the platform 700 may detect whether a mobile terminal 1440 is (or is predicted to) enter the radio coverage area of an access point, and may power up/activate that radio access point 2 in dependence thereon.

The platform may also control the powering up/powering down of an access point 2, the handover/reselection parameters, or other configuration aspect of an access point 2 based on detected power or interference at the macro base station 1 or at mobile terminals connected to the macro base station 1.

The platform 700 may reconfigure the spectrum allocation (frequency bands and/or frequency bandwidth) and the radio access technology (such as GSM, HSPA, or LTE) of the access nodes 2 in dependence upon the measured location of the mobile terminals in the coverage area of the macro base station 1, the radio coverage/quality of the access point 2 and/or the capability of the mobile terminals.

The platform 700 may also be operable to adjust the system information parameters broadcast by the access points 2 in dependence upon interference measured on the macro base station 1 and/or the mobile terminals connected through the macro base station 1 and/or the access point 2.

The platform 700 may configure the broadcast system information parameters of the macro base station 1 in dependence upon the measured performance of the access point 2 within the radio coverage area of the macro base station 1. The platform 700 may determine the access point 2 performance across a cluster of access points within the radio coverage area of the base station 1. The platform 700 may adjust the system information parameters in dependence upon the interference load of the macro base station 1 on the access point or points 2.

The billing function 720 of the platform 700 may record whether each communication with the mobile terminal 1440 occurs via the macro base station 1 or one of the access points 2, and may provide appropriate information to the core network 1430 in order to allow differential charging to the user of the mobile terminal 1440 in dependence upon whether access is provided by the macro base station 1 or one or other of the access points 2.

The section headings in this patent specification are provided for ease of reference and should not affect the interpretation of any part of the patent specification.
(P100940-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with terminals using the network, wherein the radio access network includes a controller operable to control the use of network resources by the terminals, wherein the controller is operable to monitor data received from the terminals to identify interruption of the radio access network.

2. The network of clause 1, wherein the controller is operable to monitor and analyse data received from other controller relating to other terminals.

3. The network of clause 1 or 2, wherein the controller is operable to measure characteristics of the radio link between the radio access network and the terminals.

4. The network of clauses 1, 2 or 3, wherein the controller is operable to compare the data with interruption criteria to identify the interruption of the radio access network.

5. The network of clauses 1, 2, 3 or 4, wherein the controller is operable to provisionally identify interruption of the radio access network, and, in response thereto, to control the collection of further data from the terminals.

6. The network of clause 1, 2, 3, 4 or 5, wherein the controller is operable to identify the terminals in the location of the interruption source.

7. The network of clause 6, wherein the controller is operable to take action in response to any of the terminals causing the interruption.

8. A method of operating a mobile telecommunications network including a core and a radio access network having a radio for wireless communication with terminals using the network, the radio access network including controller operable to control the use of network resources by the terminals, the method including the controller monitoring data received from the terminals to identify interruption of the radio access network.

9. The method of clause 8, wherein the controller monitors and analyses data received from other controller relating to other terminals.

10. The method of clause 8 or 9, wherein the controller measures a characteristics of the radio link between the radio access network and the terminals.

11. The method of clauses 8, 9 or 10, wherein the controller compares the data with interruption criteria to identify the interruption of the radio access network.

12. The method of clauses 8, 9, 10 or 11, wherein the controller provisionally identifies interruption of the radio access network, and, in response thereto, controls the collection of further data from the terminals.

13. The method of clause 8, 9, 10, 11 or 12, wherein the controller identifies the terminals in the location of the interruption source.

14. The method of clause 13, wherein the controller takes action in response to any of the terminals causing the interruption.

15. The network or method of any one of the preceding clauses, wherein some of the terminals are security terminals arranged to monitor security.

16. The network or method of any one of the preceding clauses, wherein the controller is operable to additionally use measurements from a fixed telecommunications network to identify interruption.

17. A mobile telecommunications network substantially as hereinbefore described with reference to and/or as illustrated FIG. 15 of the accompanying drawings.

18. A method of operating a mobile telecommunications network, substantially as hereinbefore described with reference to and/or as illustrated FIG. 15 of the accompanying drawings.

(P100934-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with mobile terminals registered with the network, the radio including a plurality of radio frequency parts and a plurality of baseband parts, and wherein the network includes a controller operable to control the use of the baseband parts.

2. The network of clause 1, wherein each of the baseband parts corresponds to a respective one of the radio frequency parts, and wherein a respective one of the controller is provided in the radio access network for each of the baseband parts.

3. The network of clause 1 or 2, wherein the controller is operable to determine at least one efficiency characteristic of the associated baseband part.

4. The network of clause 3, wherein the efficiency characteristic comprises at least one of load, power consumption, bandwidth, radio outage, hardware resilience, heat production, power sources, spectrum efficiency, number of supported terminals, number of connected terminals and the location of the terminals.

5. The network of clause 1, 2, 3 or 4 wherein each of the baseband parts is operable to provide a plurality of baseband functions.

6. The network of clause 5, wherein the controller is operable to temporarily disable selected baseband functions of its associated baseband part that are underused and to enable equivalent baseband functions of the disabled baseband functions to be provided by alternative ones of the baseband parts that are associated with other controller.

7. The network of clause 5 or 6, including a gateway node operable to control the sharing of baseband functions between respective baseband parts, or wherein the controller are operable to control the sharing of baseband functions between respective baseband parts.

8. The network of clause 7, wherein the gateway node or the controller is operable to disable selected baseband functions.

9. The network of clause 7 or 8, when dependent of clause 3 or 4, wherein the gateway node or controller is operable to share or disable baseband functions in dependence upon the efficiency characteristic thereof.

10. A method of operating a mobile telecommunications network including a core and a radio access network having a radio for wireless communication with mobile terminals registered with the network, the radio including a plurality of radio frequency parts and a plurality of baseband parts, the method including using controller to control the use of the baseband parts.

11. The method of clause 10, wherein each of the baseband parts corresponds to a respective one of the radio frequency parts, and wherein a respective one of the controller is provided in the radio access network for each of the baseband parts.

12. The method of clause 10 or 11, wherein the controller determines at least one efficiency characteristic of the associated baseband part.

13. The method of clause 12, wherein the efficiency characteristic comprises at least one of load, power consumption, bandwidth, radio outage, hardware resilience, heat production, power sources, spectrum efficiency, number of supported terminals, number of connected terminals and the location of the terminals.

14. The method of clause 10, 11, 12 or 13 wherein each of the baseband parts provides a plurality of baseband functions.

15. The method of clause 14, wherein the controller temporarily disables selected baseband functions of its associated baseband part that are underused and enables equivalent baseband functions of the disabled baseband functions to be provided by alternative ones of the baseband parts that are associated with other controller.

16. The method of clause 14 or 15, wherein a gateway node is provided to control the sharing of baseband functions between respective baseband parts, or wherein the controller controls the sharing of baseband functions between respective baseband parts.

17. The method of clause 16, wherein the gateway node or the controller disables selected baseband functions.

18. The method of clause 16 or 17, when dependent of clause 12 or 13, wherein the gateway node or controller shares or disables baseband functions in dependence upon the efficiency characteristic thereof.

19. A mobile telecommunications network substantially as hereinbefore described with reference to and/or as illustrated in any one of or any combination of FIGS. 16 to 18 of the accompanying drawings.

20. A method of operating a mobile telecommunications network, substantially as hereinbefore described with reference to and/or as illustrated in any one of or any combination of FIGS. 16 to 18 of the accompanying drawings.
(P100941-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with mobile terminals registered with the network, wherein the radio access network includes a controller operable to control the use of network resources by the mobile terminals, wherein the controller is operable to collect information relating to the mobile terminals and to control the operation of an external resource in dependence on the information.

2. The network of clause 1, wherein the information collected by the controller provides an indication of the location of the mobile terminals.

3. The network of clause 2, wherein the controller is operable to instruct the mobile terminals to move from an idle communication state to an active communication state in order to obtain the indication of the location of the mobile terminals.

4. The network of clause 1, 2 or 3, wherein the controller is operable to analyse the collected information to determine at least one of the speed, direction, velocity and indoor/outdoor status of at least one of the mobile terminals.

5. The network of clause 1, 2, 3 or 4, wherein the controller is operable to analyse the collected information to determine the density of the mobile terminals at a particular location.

6. The network of any one of clauses 1 to 5, wherein the controller is operable to provide the information to the external resource.

7. The network of any one of clauses 1 to 6, wherein the external resource comprises at least one of street furniture, street lights, electronic displays, security cameras, street cleaners and security personnel.

8. A method of operating a mobile telecommunications network including a core and a radio access network having a radio for wireless communication with mobile terminals registered with the network, wherein the radio access network includes a controller operable to control the use of network resources by the mobile terminals, the method including operating the controller to collect information relating to the mobile terminals and to control the operation of an external resource in dependence on the information.

9. The method of clause 8, wherein the information collected by the controller provides an indication of the location of the mobile terminals.

10. The method of clause 9, wherein the controller instructs the mobile terminals to move from an idle communication state to an active communication state in order to obtain the indication of the location of the mobile terminals.

11. The method of clause 8, 9 or 10, wherein the controller analyses the collected information to determine at least one of the speed, direction and velocity of at least one of the mobile terminals.

12. The method of clause 8, 9, 10 or 11, wherein the controller analyses the collected information to determine the density of the mobile terminals at a particular location.

13. The method of any one of clauses 8 to 12, wherein the controller provides the information to the external resource.

14. The method of any one of clauses 1 to 6, wherein the external resource comprises at least one of street furniture, street lights, electronic display, security cameras, street cleaners and security personnel.

15. A mobile telecommunications network substantially as hereinbefore described with reference to and/or as illustrated FIGS. 19, 20 and/or 21 of the accompanying drawings.

16. A method of operating a mobile telecommunications network substantially as hereinbefore described with reference to and/or as illustrated FIGS. 19, 20 and/or 21 of the accompanying drawings.
(P100939-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with terminals registered with the network, wherein the radio access network includes a controller operable to control the use of network resources by the terminals, wherein the terminals include at least one application, and wherein the controller is operable to control the application, and to control transmission of data.

2. The network of clause 1, wherein the controller is operable to analyse the data and to control the application in dependence thereon.

3. The network of clause 1 or 2, wherein the application is operable to control the capture of information relating to the area around the terminal, the data being derived from the information.

4. The network of clause 3, wherein the information is obtained from a sensor, such as a visible light sensor, an infrared sensor, an accelerometer and/or proximity sensor.

5. The network of clause 4, wherein the controller is operable to modify the resolution or type of information obtained from the sensor(s).

6. The network of clause 1, 2, 3, 4 or 5, wherein the controller is operable to analyse external resource availability, or predicated availability, and to control the application in dependence thereon.

7. The network of clause 6, wherein the controller is operable to control the form in which the application transmits the data.

8. A method of operating a mobile telecommunications network that includes a core and a radio access network having a radio for wireless communication with terminals registered with the network, wherein the radio access network includes a controller operable to control the use of network resources by the terminals, and wherein the terminals include at least one application, the method including operating the controller to control the application, and to control transmission of data relating to the application.

9. The method of clause 8, wherein the controller analyses the data and controls the application in dependence thereon.

10. The method of clause 8 or 9, wherein the application controls the capture of information relating to the area around the terminal, the data being derived from the information.

11. The method of clause 10, wherein the information includes an image, such as a visible light image or an infrared image.

12. The method of clause 11, wherein the controller modifies the resolution of the image or the type of image.

13. The method of clause 8, 9, 10, 11 or 12, wherein the controller analyses external resource availability, or predicated availability, and controls the application in dependence thereon.

14. The method of clause 13, wherein the controller controls the form in which the application transmits the data.

15. A mobile telecommunications network substantially as hereinbefore described with reference to and/or as illustrated in FIG. 22 of the accompanying drawings.

16. A method of operating a mobile telecommunications network, substantially as hereinbefore described with reference to and/or as illustrated in FIG. 22 of the accompanying drawings.
(P100938-GB-PSP)

These numbered clauses are not presently claims in this application but they do provide a non-exhaustive indication of what the applicant considers to be inventive. The applicant hereby gives notice that they intent to, and reserves the right to, claim any of this subject-matter in the present application or in any divisional applications filed in the future.

1. A mobile telecommunications network including a core and a radio access network having a radio for wireless communication with mobile terminals registered with the network, the radio including macro base stations and access points, the latter connecting to the core via an IP link, wherein the radio access network includes a controller operable to control the use of network resources by the mobile terminals, and wherein the controller is operable to provide services to one of the mobile terminals irrespective of whether the mobile terminal communicates via one of the macro base stations or one of the access points.

2. The network of clause 1, wherein the controller is operable to provide services, optionally including applications and/or network functions, to the mobile terminals by controlling communication with the terminals via one of the macro base stations or by one of the access points.

3. The network of clause 1 or 2, wherein the controller is operable to control whether the mobile terminal receives services via one of the base stations or one of the access points.

4. The network of clause 3, wherein the controller is operable to cause the mobile terminal to handover and/or reselect between one of the base stations and one of the access points or between respective ones of the access points.

5. The network of clause 4, wherein the controller is operable to vary handover and/or reselection criteria.

6. The network of clause 5, wherein the controller is operable to vary the handover and/or reselection criteria in dependence upon at least one of:
a measured characteristic of the mobile terminal;
the location and/or speed of the mobile terminal;
the subscription of the mobile terminal user with the network;
historic measurements of quality and reliability of the access point;
current and/or predicted mobile terminal user experience of the macro base station or the access point; and
requirements of the services or applications used by the mobile terminal 7. The network of any one of clauses 1 to 6, wherein the controller is operable to control at least one of:
the variation of handover and/or reselection criteria in real time;
the powering up/down of the access point in dependence upon the position of the mobile terminals;
the configuration of the access point based on detected power or interference at the macro base station or mobile terminal; and
the spectrum allocation and/or radio access technology of the access point.

8. A method of operating a mobile telecommunications network including a core and a radio access network having a radio for wireless communication with mobile terminals registered with the network, the radio including macro base stations and access points, the latter connecting to the core via an IP link, wherein the radio access network includes a controller operable to control the use of network resources by the mobile terminals, the method including operating the controller to provide services to one of the mobile terminals irrespective of whether the mobile terminal communicates via one of the macro base stations or one of the access points.

9. The method of clause 8, wherein the controller provides services, optionally including applications and/or network functions, to the mobile terminals by controlling communication with the terminals via one of the macro base stations or by one of the access points.

10. The method of clause 8 or 9, wherein the controller controls whether the mobile terminal receives services via one of the base stations or one of the access points.

11. The method of clause 10, wherein the controller causes the mobile terminal to handover and/or reselect between one of the base stations and one of the access points or between respective ones of the access points.

12. The method of clause 11, wherein the controller varies handover and/or reselection criteria.

13. The method of clause 12, wherein the controller varies the handover and/or reselection criteria in dependence upon at least one of
a measured characteristic of the mobile terminal;
the location and/or speed of the mobile terminal;
the subscription of the mobile terminal user with the network;
historic measurements of quality and reliability of the access point;
current and/or predicted mobile terminal user experience of the macro base station or the access point; and
requirements of the services or applications used by the mobile terminal 14. The method of any one of clauses 8 to 13, wherein the controller controls at least one of
the variation of handover and/or reselection criteria in real time;
the powering up/down of the access point in dependence upon the position of the mobile terminals;
the configuration of the access point based on detected power or interference at the macro base station or mobile terminal; and
the spectrum allocation and/or radio access technology of the access point.

15. A mobile telecommunications network substantially as hereinbefore described with reference to and/or as illustrated FIG. 23 of the accompanying drawings.

16. A method of operating a mobile telecommunications network, substantially as hereinbefore described with reference to and/or as illustrated FIG. 23 of the accompanying drawings.

Various embodiments discussed herein may be combined with each other in appropriate combinations in connection with the system described herein. In that regard, note that the terms "radio", "controller", and "data analyser" (as well as other terms used herein) may be understood to include one or more components capable of providing the functionality described herein in connection with those components. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions.

Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A mobile telecommunications network, comprising:
a core; and
a cellular radio access network having a radio for wireless cellular communication with mobile terminals registered with the cellular radio access network,
wherein the cellular radio access network includes a controller that controls a use of network resources by the mobile terminals, and
wherein the controller is configured to identify and compensate for malfunctioning mobile terminals by:
acquiring radio quality pattern information;
based at least partially on the radio quality pattern information, determining a probability level that indicates an extent to which a particular mobile terminal is likely to be malfunctioning;
upon a condition in which the probability level is determined to be sufficiently high, acquiring additional information that is usable to confirm whether the particular mobile terminal is actually malfunctioning; and
based on a determination that the particular mobile terminal is malfunctioning, taking action to reduce an effect of the malfunctioning on the cellular radio access network.

2. The network of claim 1, wherein the controller is provided by at least one of: an access node site or a gateway site.

3. The network of claim 1, wherein the malfunctioning of the particular mobile terminal potentially impacts at least one of: an ability of the cellular radio access network to control the mobile terminals or an ability of the cellular radio access network to allow user data to be transmitted.

4. The network of claim 1, wherein the controller obtains reference characteristics that correspond to the radio quality pattern information by using one of: (i) calculations based on previously measured characteristics or (ii) previously measured characteristics obtained from one of: the core or a third party.

5. The network of claim 1, wherein the radio quality pattern information relates to at least one of: (i) a specific one of the mobile terminals, (ii) a specific mobile terminal type, or (iii) a particular application run by one or more of the mobile terminals.

6. The network of claim 1, wherein, based on the determination that the particular mobile terminal is malfunctioning, the controller also triggers a management event to reduce the effect of the malfunctioning on the cellular radio access network.

7. A method of operating a mobile telecommunications network, comprising:
providing a core and a cellular radio access network that includes a radio for wireless cellular communication with mobile terminals registered with the cellular radio access network, wherein the cellular radio access network includes a controller that controls use of network resources by the mobile terminals; and
operating the controller to identify and compensate for malfunctioning mobile terminals by:
acquiring radio quality pattern information;
based at least partially on the radio quality pattern information, determining a probability level that indicates an extent to which a particular mobile terminal is likely to be malfunctioning;

upon a condition in which the probability level is determined to be sufficiently high, acquiring additional information that is usable to confirm whether the particular mobile terminal is actually malfunctioning; and based on a determination that the particular mobile terminal is malfunctioning, taking action to reduce an effect of the malfunctioning on the cellular radio access network.

8. The method of claim 7, wherein the controller is provided by at least one of: an access node site or a gateway site.

9. The method of claim 7, wherein the malfunctioning of the particular mobile terminal impacts at least one of: an ability of the cellular radio access network to control the mobile terminals or an ability of the cellular radio access network to allow user data to be transmitted.

10. The method of claim 7, wherein the controller obtains reference characteristics that correspond to the radio quality pattern information by using one of: (i) calculations based on previously measured characteristics or (ii) previously measured characteristics obtained from one of: the core or a third party.

11. The method of claim 7, wherein the radio quality pattern information relates to at least one of: (i) a specific one of the mobile terminals, (ii) a specific mobile terminal type, or (iii) a particular application run by one or more of the mobile terminals.

12. The method of claim 7, wherein, based on the determination that the particular mobile terminal is malfunctioning, the controller also triggers a management event to reduce the effect of the malfunctioning on the cellular radio access network.

13. The mobile telecommunications network of claim 1, wherein the action taken by the controller to reduce the effect of the malfunctioning on the cellular radio access network includes at least one of the following:
   allocating the particular mobile terminal to a specific network resource;
   modifying reselection parameters of the particular mobile terminal to ensure a next network access attempt occurs on a specific frequency layer;
   limiting network access of the particular mobile terminal to a minimum connectivity level;
   initiating a disinfection process on the particular mobile terminal to remove the virus; or
   using a firewall to block requests from the particular mobile terminal to specific destination port numbers and addresses.

14. The method of claim 7, wherein the action taken by the controller to reduce the effect of the malfunctioning on the cellular radio access network includes at least one of the following:
   allocating the particular mobile terminal to a specific network resource;
   modifying reselection parameters of the particular mobile terminal to ensure a next network access attempt occurs on a specific frequency layer;
   limiting network access of the particular mobile terminal to a minimum connectivity level;
   initiating a disinfection process on the particular mobile terminal to remove the virus; or
   using a firewall to block requests from the particular mobile terminal to specific destination port numbers and addresses.

15. A method of operating a mobile telecommunications network that includes a core and a cellular radio access network, the cellular radio access network including a radio for wireless cellular communication with mobile terminals registered with the cellular radio access network, the cellular radio access network including a controller that controls use of network resources by the mobile terminals, the method being performed by the controller and comprising:
   acquiring radio quality pattern information;
   based at least partially on the radio quality pattern information, determining a probability level that indicates an extent to which a particular mobile terminal is likely to be malfunctioning;
   upon a condition in which the probability level is determined to be sufficiently high, acquiring additional information that is usable to confirm whether the particular mobile terminal is actually malfunctioning, wherein the additional information comprises mobile terminal performance measurements, and wherein the additional information is acquired at least partially in response to the controller instructing the particular mobile terminal to provide information according to a more frequent rate; and
   based on a determination that the particular mobile terminal is malfunctioning, taking action to reduce an effect of the malfunctioning on the cellular radio access network.

16. The method of claim 15, further comprising obtaining reference characteristics that correspond to the radio quality pattern information.

17. The method of claim 16, wherein obtaining the reference characteristics comprises one of:
   calculating the reference characteristics based on previously measured characteristics; or
   receiving previously measured characteristics from one of: the core or a third party.

18. The method of claim 15, wherein the radio quality pattern information relates to at least one of: (i) a specific one of the mobile terminals, (ii) a specific mobile terminal type, or (iii) a particular application run by one or more of the mobile terminals.

19. The method of claim 15, wherein taking action comprises triggering a management event.

20. The method of claim 15, wherein taking action comprises at least one of the following:
   allocating the particular mobile terminal to a specific network resource;
   modifying reselection parameters of the particular mobile terminal to ensure a next network access attempt occurs on a specific frequency layer;
   limiting network access of the particular mobile terminal to a minimum connectivity level;
   initiating a disinfection process on the particular mobile terminal to remove the virus; or
   using a firewall to block requests from the particular mobile terminal to specific destination port numbers and addresses.

21. The method of claim 7, wherein the method further comprises:
   based on the determination that the particular mobile terminal is malfunctioning, triggering an alarm that provides an indication of the malfunctioning and that includes multiple criticality levels, wherein a determination as to which criticality level to use is based on a size of a geographic region that is impacted by the malfunctioning.

* * * * *